3,296,182
ORGANOPOLYSILOXANE ELASTOMERS AND ARTICLES PRODUCED THEREFROM
Frank Fekete, Monroeville, Pa., assignor to Union Carbide Corporation, a corporation of New York
No Drawing. Filed May 5, 1964, Ser. No. 365,131
25 Claims. (Cl. 260—37)

This application is a continuation-in-part of my application Serial No. 127,817, filed on July 31, 1961 and now abandoned, which was in turn an continuation-in-part of applications Serial No. 782,650 and Serial No. 782,651, which were filed on December 24, 1958 and are now abandoned; and of my application Serial No. 115,887, filed on June 9, 1961 and now abandoned, which was in turn a continuation-in-part of applications Serial No. 782,647, Serial No. 782,648, Serial No. 782,649, Serial No. 782,652, Serial No. 782,653, and Serial No. 782,654, which were also filed on December 24, 1958 and are also now abandoned.

This invention relates to improved organopolysiloxane formulations suitable for curing to organopolysiloxane elastomers, and to elastomers produced therefrom. More particularly, this invention is concerned with improved organopolysiloxane formulations comprising a diorgano-substituted polysiloxane gum, an alkoxy-containing silicon compound and/or a hydroxy-containing silicon compound, a titanium-containing compound, an inorganic filler and a curing catalyst as new compositions of matter, with organopolysiloxane formulations which comprise a boron-containing compound in addition to the components mentioned above; with organopolysiloxane elastomers produced by curing or vulcanizing these improved organopolysiloxane formulations, and with composite articles comprising a solid base material and an elastomer of the above-mentioned formulations which contain a boron-containing compound. This invention, also contemplates the provision of processes useful in the production of such organopolysiloxane formulations, elastomers and composite articles, and of methods for effecting bonding between solid materials and elastomers which contain a boron-containing compound as one of their components.

Many of the commercial applications of organopolysiloxane elastomers involve adhering them to various solid materials. For example, composite articles comprising an organopolysiloxane elastomer in combination with a sheet, cloth or fibrous matter made of a natural or synthetic material, have been widely employed in electrical insulation. Likewise, organopolysiloxane elastomers have been employed in combination with various natural and synthetic materials in the form of gaskets, tapes, diaphragms, conveyor belts and like articles for various other applications. However, since organopolysiloxane elastomers heretofore known are characterized by adhesivesness toward another surface of the same elastomer and toward most other materials, considerable difficulty has been experienced in achieving an effective bond between such elastomers and other materials.

To overcome this difficulty, it has been proposed to pretreat the surfaces of such materials with a sizing or bonding agent which is capable of adhering to both the material and elastomer. By way of illustration, composite articles comprising an organopolysiloxane elastomer in combination with a metal have been prepared by coating the metal with a sizing or bonding agent, applying an organopolysiloxane gum compounded with a filler and a curing catalyst, and heating to cure the organopolysiloxane gum to an elastomer and bond said elastomer to the metal. Such procedures, while oftentimes effective in adhering organopolysiloxane elastomers to various materials, require a preliminary pretreating step and therefore have not been found entirely suitable.

Organopolysiloxane elastomers have been successfully bonded to certain woven and matter fabrics by similar procedures without the use of a sizing or bonding agent because of the tendency of the organopolysiloxane gum to flow into the interstices of the fabric. However, the organopolysiloxane elastomer-bonded fabrics formed thereby do not possess as high a crease strength (a measure of organopolysiloxane elastomer to fabrics bond, hereinafter more fully described) as is desirable for many applications. Furthermore, the free elastomer surfaces of such coated fabrics remain adhesive in nature and cannot be made to adhere to other materials, as is desirable in many applications to such fabrics. Another disadvantage of such procedure is that previously cured elastomers cannot be made to adhere to the fabric itself without the use of a sizing or bonding agent.

Another method proposed to overcome the difficulty of achieving an effective bond between an organopolysiloxane elastomer and other materials involves the partial curing or vulcanization of conventional organopolysiloxane gums. The semi-cured elastomers resulting from such partial or under-curing procedures are tacky in nature and will adhere to various materials; however, such elastomers are difficult to handle and do not possess the desirable physical properties which characterize the fully-cured elastomers.

Organopolysiloxane elastomers are generally produced commercially by compounding a diorgano-substituted polysiloxane gum with an inorganic filler and a curing catalyst on a differential mixing roll or mixer of a type employed in compounding synthetic organic rubber stocks, such as a Banbury Mixer, and curing or vulcanizing the resulting formulation by the application of heat. When a boron-containing compound and an alkoxy-containing silicon compound and/or a hydroxy-containing silicon compound are also included in the elastomer formulation, pressure-sensitive adhesive elastomers are obtained from such formulations upon curing (by the term "pressure-sensitive adhesive elastomers" is meant elastomers having the property or ability to adhere to various surfaces upon the application of slight pressure while remaining capable of being removed therefrom by the application of a pulling force). Such pressure-sensitive adhesive elastomers can be effectively bonded to other solid materials to produce composite articles without the necessity of employing an intermediate sizing or bonding agent.

Such organopolysiloxane formulations are, immediately after the compounding procedure described above and before being cured, workable materials which can be readily shaped to a desired form or configuration. When such formulations are cured immediately after compounding, the resulting elastomers possess an optimum combination of hardness and elongation properties for any specific recipe employed. However, upon standing, such formulations tend to increase excessively in structural build (i.e. they become tough and nervy) and become hard and brittle. Consequently, such aged formulations must be remilled for periods of as long as 10 minutes and more in order to provide a workable material suitable for shaping and curing. Upon curing, the the hardness and elongation properties of elastomers prepared from such aged formulations are significantly poorer than the hardness and elongation properties of elastomers prepared from non-aged formulations of the same recipe. According to my experience, the increase in structural build of such aged formulations, and the decrease in the hardness and elongation properties of the resulting elastomers, continues for a period of about two weeks after which further aging does not appear to cause further change in the properties of the formulations or elastomers.

While the incorporation of dihydrocarbon-substituted alkoxy-containing polysiloxane oils or dihydrocarbon-substituted hydroxy-containing polysiloxane oils into such organopolysiloxane formulations eliminates the toughness and nerviness which such formulations tend to develop upon standing in the absence of such oils and also eliminates the difficulty encountered in rendering the aged formulations plastic by usual mechanical working or milling, the formulations containing such oils tend to exhibit poor "green strength" properties. By "green strength" of an organopolysiloxane formulation (i.e. an organopolysiloxane composition which is curable to the solid, elastomeric state) is mean the "build" and elastomeric properties of such composition which enable it to be pulled under reasonable tension (for example, the tension of calender rolls without tearing). Although this property is not expressed in any unit of measure, the term is well-known to those skilled in the rubber-compounding art and is evaluated by observation and comparison.

Organopolysiloxane formulations of the type disclosed which contain a dihydrocarbon-substituted alkoxy-containing polysiloxane oil and/or a dihydrocarbon-substituted hydroxy-containing polysiloxane oil, are usually soft, putty-like materials which fall apart when pulled under tension. Hence, considerable difficulty has been experienced in calandering, sheeting or extruding such formulations.

An object of this invention is to provide a formulation curable to an elastomer, which formulation possesses exceptionally high "green strength."

A further object of this invention is to provide a pressure-sensitive organopolysiloxane elastomer.

A further object of the invention is to provide useful pressure-sensitive adhesive tapes comprising such organopolysiloxane elastomers.

A further object of this invention is to provide a means of bonding an organopolysiloxane elastomer to other solid materials which eliminates the use of sizing or bonding agents in effecting bondage.

A still further object of the invention is to provide composite articles comprising a solid material in combination with a fully cured organopolysiloxane elastomer bonded directly to this material.

A still further object of this invention is to provide composite articles having free elastomer surfaces which can be made to adhere to other materials.

A still further object of this invention is to provide composite articles comprising woven or matted fabrics in combination with a fully cured organopolysiloxane elastomer bonded directly thereto, these articles being characterized by high crease strengths.

Other objects and advantages of this invention are detailed in or will be apparent from the following specification and appended claims.

I have now discovered that the incorporation of titanium-containing compounds into these elastomer formulations imparts improved "green strength" properties thereto. More specifically, the incorporation of titanium-containing compounds into such formulations eliminates the softness of such compositions and imparts increased "build" and elastomeric properties thereto. Thin sections of such titanium-containing formulations are characterized by greater strength and handability, and can be pulled under tension without tearing. Hence, such formulations can be more readily calendered and extruded without falling apart.

Without wishing to be bound by any one particular theory, it is believed that the improved "green strength" properties of such modified organopolysiloxane formulations are caused by recation between the titanium-containing compound employed and the alkoxy groups or hydroxy groups of the polysiloxane oils present in such formulations. The reaction is believed to result in the linking of such oils through titanium, with the consequent impartation of increased hardness, elasticity and "build" to the formulation, thus enabling it to be more easily stretched without tearing. This reaction takes place at any temperature at or above room temperature. However, since the excessive use of titanium-containing compounds will result in excessive hardening and loss of plasticity of the formulation, care must be exerted to add a proper amount of such compounds thereto. The amount of titanium-containing compound employed in preparing the organopolysiloxane formulations and elastomers of this invention will depend to a large extent upon the results desired, upon the particular titanium-containing compound employed, and upon the kinds and amounts of other ingredients present. In general, from as little as 0.1 part by weight to as much as 10 parts by weight of titanium-containing compound per 100 parts by weight of the dihydracarbon-substituted polysiloxane gum present can be advantageously employed; however, titanium-containing compounds are preferably employed in amounts ranging from about 0.5 to about 3 parts by weight per 100 parts by weight of the polysiloxane gum present.

I have also discovered that the adhesive and cohesive properties of elastomers containing a boron-containing compound can be improved, and the bond effected between such pressure-sensitive adhesive elastomers and solid materials can be strengthened by the addition of a titanium-containing compound to the organopolysiloxane formulations from which the elastomers are produced. The increase in strength of the bond between such materials and such pressure-sensitive adhesive elastomers is particularly noticeable when such elastomers are adhered to materials such as metals, metal alloys and cellulosic materials. Thus, these modified elastomers show very good adhesion towards paper and improved adhesion towards metals and metal alloys, such as steel, aluminum, tin, bronze and the like. The improved "green strength" which is also imparted to such formulations by the use of titanium-containing compounds therein permits the easy application of said formulations to the surfaces of other materials in the preparation of the composite articles of this invention, and enables such formulations to be readily shaped into sheets or tapes to be used in the preparation of laminates or other composite articles of this invention.

The improved pressure-sensitive organopolysiloxane elastomers of this invention are permanent pressure-sensitive adhesive materials and can be employed over and over again without losing any of their adhesive characteristics. As far as is known, such elastomers can be bonded to any solid material. However, it has been found that when fluorinated thermoplastic polymers, such as polytetrafluoroethylene, are employed as the materials to be bonded, that the bonds formed between such materials and the elastomers employed are not quite as strong as the bonds capable of being formed between such elastomers and other natural or synthetic materials. Among the materials which can be employed in preparing the composite articles of this invention may be mentioned: metals and metal alloys, such as steel, phosphatized steel, aluminum, anodized aluminum, copper, tin, brass, bronze, and the like; siliceous materials, such as glass, glass cloth, ceramics, porcelain, and the like; organic fibers, such as wool, cotton, and the like, and any of the various synthetic organic fibers such as nylon, Dacron, and the like; cellulosic materials, such as wood, paper, cellophane, cellulose acetate, cellulose butyrate, ethyl cellulose, butyl cellulose, and the like; organic elastomers, such as natural rubber, chloroprene, neoprene, butadiene-styrene copolymers, acrylonitrile-butadiene copolymers, and the like; polymeric substances, including addition-type polymers, such as polyethylene, polypropylene, polyvinyl chloride, polyvinylidene chloride, polyvinyl acetate, polyacrylonitrile, polymeric methyl methacrylate, and the like, the various copolymers of such materials, and condensation-type polymers, such as the solid reaction products of hexamethylenediamine with dibasic acids such as adipic acid and sebacic acid, the solid reaction products of methyl terephthalate and ethylene glycol, and the polycondensation products of caprolactam and the like.

In addition to adhering to other substances, the improved pressure-sensitive organopolysiloxane elastomers of this invention evidence a stronger tendency to cohere with themselves than elastomers which I have previously employed in preparing composite articles. Oftentimes, the bond effected between such improved elastomers is so coherent that said elastomers cannot be separated from themselves without damage thereto. When strips of such elastomers in the form of tapes are superimposed one upon the other so that the weight of the tapes constitutes the only form of pressure, the superimposed elastomer surfaces not only cohere to each other, but appear to flow together and fuse upon standing, with the bond therebetween increasing in strength. When conventional organopolysiloxane elastomers are superimposed one upon the other in a similar manner, no fusion or cohesion between the various elastomer surfaces takes place.

The composite articles of this invention can exist in a wide variety of forms. Thus, the improved pressure-sensitive elastomers employed in this invention can be bonded to various natural or synthetic materials in the shape of slabs, rods, films, sheets, strips, matted fibers, etc., to produce a wide variety of articles such as ducts, gaskets, tapes, diaphragms, conveyor belts, and the like.

One form which the composite articles of this invention can take is that of a laminate in which plies of natural or synthetic materials are bonded to plies of pressure-sensitive organopolysiloxane elastomer. These laminated articles can be comprised of a multiplicity of plies of like or unlike natural or synthetic materials held together by a multiplicity of plies of pressure-sensitive organopolysiloxane elastomer or they can be comprised of a single ply of a natural or synthetic material bonded to a single ply of pressure-sensitive elastomer. Such laminates can also comprise a composite of two plies of like or unlike natural or synthetic materials bonded together by a single ply of pressure-sensitive elastomer, or they can be comprised of two plies of pressure-sensitive elastomer coated on an intermediate ply of a natural or synthetic material. When the pressure-sensitive elastomer forms an outer ply of such laminates, the free elastomer surface thereof can be caused to adhere to other materials, and additional plies of natural or synthetic materials can be bonded thereto. By continually adhering alternate plies of pressure-sensitive elastomer and other materials, laminates of any desired size and thickness can be produced. Such laminates can then be cut into any desired shape and employed as gaskets, tapes, diaphragms, conveyor belts, and in various other applications.

Another form which the composite articles of this invention can take is that of elastomer-coated articles, such as elastomer-coated transformers, electrical cables, and the like, whenever it is desirable to electrically or thermally insulate such articles. As the pressure-sensitive elastomers employed in this invention are resistant to cold and heat and deterioration by the elements, they can be suitably employed in composite articles comprising a metallic window frame, or like object, in combination with weather stripping composed of such elastomers. Such elastomers are also useful in preparing composite articles wherein vacuum-tight and pressure-tight seals are important, for example in the manufacture of electrical discharge devices where they can be employed in sealing the casings containing the anodes and cathodes.

The pressure-sensitive organopolysiloxane elastomers of this invention are uniformly adhesive throughout the cured composition. Thus, for example, a strip of molded pressure-sensitive elastomer one inch in length, one inch in width, and one-half inch in thickness will adhere to other materials upon the application of pressure regardless of which surface is applied thereto, and if such strip be cut in half, each of the newly-formed surfaces of the severed strip will adhere to other materials upon the application of pressure. Since the pressure-sensitive organopolysiloxane elastomers of this invention are cohesive as well as adhesive in nature, the pieces of the severed strip can be reunited along the newly-formed surfaces to once again form the initial strip. Furthermore, when strips of such elastomers in the form of tapes are superimposed one upon the other so that the weight of the tapes constitutes the only form of pressure, the superimposed elastomer surfaces not only adhere to each other, but appear to flow together and fuse upon standing at ordinary room temperature, with the bond therebetween increasing in strength.

The pressure-sensitive adhesive organopolysiloxane elastomers of this invention find use in a wide variety of applications. By way of illustration, such elastomers can be employed as insulating materials for electrical conductors, or as protective coatings for metals. Such elastomers find particular utility in the form of unsupported or supported pressure-sensitive adhesive tapes. Glass cloth, aluminum foil, various natural or synthetic fabrics, and other similar materials may be employed as the supporting base member of such tapes.

Elastomer surfaces of supported or unsupported tapes of pressure-sensitive adhesive elastomers, can be easily wound about conduits, electrical cables, and various other objects to provide thermal and electrical insulation. By the application of heat, a permanent bond can be effected between such objects and the elastomer.

Most improtant in the application of such pressure-sensitive adhesive tapes is the extent to which the pressure-sensitive elastomer tends to cohere with itself. By way of illustration, when unsupported tapes or supported tapes coated on both sides with the improved pressure-sensitive adhesive organopolysiloxane elastomers of this invention are spirally wound about a mandrel, under tension, in an orderly overlapping manner, the wrapping remains in place and does not slip from the mandrel when the applied tension is removed. Instead, a fusion of the overlapped portions of the pressure-sensitive elastomer appears to take place, with the bond therebetween increasing in strength up to a point.

It has been found that the rate of fusion and the strength of the bond between the overlapped elastomer portions of such unsupported or supported pressure-sensitive adhesive tapes increase upon the application of heat. Thus, when heated to temperatures of about 200° F. and higher, the overlapped portions of such tapes fuse together into an essentially homogeneous cylindrical mass, and cannot be separated without damage to the elastomer.

When the pressure-sensitive adhesive tapes of this invention are wound about a mandrel wrapped with a film of polytetrafluoroethylene, the bond formed between the elastomer surface of the tape and the polytetrafluoroethylene film is not quite as strong as the bond capable of being formed between such tapes and other natural or synthetic substances. When the wrapped mandrel is heated, the elastomer surfaces of the tape fuse. The fused cylindrical body resulting therefrom can then be slipped from the polytetrafluoroethylene by the application of pressure to obtain a duct structure which can be employed in a wide variety of applications, such as tubing for high temperature fluids or pipe couplings. (In practice, the fused body and polytetrafluoroethylene film are removed together from the mandrel and if desired, the film can then easily be unraveled from within the duct structure.)

The preferred duct structures are those derived from supported pressure-sensitive tapes coated on both sides with pressure-sensitive elastomer. The spirally wound supporting base member provides a conduit of solid material, to the surfaces of which is bonded the heat-cured elastomer portion of the supported tape.

The elastomers employed in such pressure-sensitive adhesive tapes can be filled with inorganic fillers such as finely-divided silica, with carbon black, or with mixtures of such materials. When inorganic fillers are employed, the elastomer is non-conductive, and the supported tapes prepared therefrom can be employed as electrical insulators. On the other hand, when carbon black fillers are employed the elastomer is conductive, and the supported tapes prepared therefrom can be employed as electrical semi-conductors.

Unsupported pressure-sensitive organopolysiloxane elastomer adhesive tapes can be produced in varying widths and thicknesses. Thus, such tapes can be made in thickness of from about 4 mils to about 100 mils and more; however, such tapes are preferably of a thickness of from about 5 mils to about 40 mils.

Unsupported pressure-sensitive organopolysiloxane elastomer adhesive tapes can be produced by calendering, extruding, molding, or solution casting techniques. Thus, for example, such tapes can be produced by calendering the organopolysiloxane formulations of the instant invention which contain a boron-containing compound into sheets, cutting such sheets into strips, and curing such strips into elastomer tapes. Similarly, pressure-sensitive adhesive organopolysiloxane elastomers in the form of a tape can be produced by extruding the organopolysiloxane formulations of the instant invention which contain a boron-containing compound through an appropriate die, or by molding them in an appropriate mold, prior to curing. When pressure-sensitive organopolysiloxane elastomer adhesive tapes are produced by a solution casting technique, the organopolysiloxane formulation is dispersed in a suitable liquid dispersing agent and the resulting dispersion poured on a metal plate which is heated for a time sufficiently long and at a temperature sufficiently elevated to evaporate the dispersing agent and partially cure the deposited formulation, following which the partially-cured formulation is removed from the metal plate and fully-cured by further heating. Solution casting is particularly suitable for preparing extremely thin films of elastomer.

The supported or unsupported pressure-sensitive elastomer adhesive tapes described are preferably prepared in the form of a roll. Thus, after curing the elastomer or the elastomer in combination with a suitable supporting member, the newly-formed pressure-sensitive adhesive tape can be fed to winding reels and wrapped about a core (preferably a core in the shape of a right circular cylinder) in overlapping fashion to produce a roll of tape of any desired size. Because of the pressure-sensitive adhesive surfaces of such tapes, it is preferred that the tape be wound upon itself with an interlayer such as paper or plastic film between the overlapping surfaces. While the elastomer exhibits a tendency to adhere to such surfaces, this tendency is not sufficient to prevent removal of the tape from the interlayer when occasion for its use arises. That is, due to the limited degree of adhesion which the elastomer exhibits toward the interlayer material, the concentric layers of tape can be easily unwound and the tape can thereafter be readily stripped away or removed from the interlayer material. Typical materials which can be employed as an interlayer in the production of rolls of supported organopolysiloxane elastomer adhesive tapes are paper, nylon, cellophane, and plastic materials such as the polymers and copolymers of vinyl chloride and polyvinylidene chloride, Mylar (polyethylene terephthalate resin) and polyolefins, such as polyethylene and polypropylene. When paper is employed as the interlayer, it is preferred that it be treated or coated with wax, such as paraffin wax, or other material to limit the degree of adhesion that the elastomer exhibits toward the paper.

The interlayer materials described above can also be used to separate unrolled strips or flat sheets of pressure sensitive elastomers of this invention. This combination of a layer of pressure sensitive elastomer (either supported or unsupported) having at least one surface in contact with a layer of one of the materials toward which the elastomer exhibits a limited degree of adhesion provides an efficient means for storing or transporting the elastomer. The elastomer can be easily stripped away from such materials when desired.

The composite articles of this invention can be prepared in various ways. For example, a cured or post-cured pressure-sensitive organopolysiloxane elastomer of the type employed in this invention can be applied to the surface of a natural or synthetic material and adhesion effected between the elastomer and such material by the simple application of pressure. If it be desirable to form a multi-ply laminate, alternate layers of pressure-sensitive elastomer and natural or synthetic material can be superimposed one upon the other until the desired number of plies is obtained, and pressure applied to the outer surfaces of the laminate in order to effect adhesion. When the composite articles of this invention are prepared by such procedure, comparatively strong bonds are effected by the application of relatively slight pressure.

In order to effect a more durable (permanent) bond between a pressure-sensitive organopolysiloxane elastomer of the type employed in this invention and a natural or synthetic material, it is necessary to heat the composite in addition to applying pressure. Temperatures ranging up to 480° F. and higher have been employed for such purpose with good results. Thus, when a pressure-sensitive elastomer of the type employed in this invention is applied to a base member under pressure at a temperature of about 480° F., the resulting bond is often so adherent that the elastomer cannot be removed without damage thereto.

Another method of preparing the composite articles of this invention comprises applying to the surface of a natural or synthetic material an improved organopolysiloxane formulation comprising a diorgano-substituted polysiloxane gum, a combination of an alkoxy-containing silicon compound and/or a hydroxy-containing silicon compound, a boron-containing compound, a titanium-containing compound, a filler and a curing catalyst, and subsequently heating the comopsite to a temperature elevated to cure the organopolysiloxane formulation to an elastomer while at the same time firmly adhering the vulcanized elastomer to said natural or synthetic material. In order to effect a more durable bond between the cured elastomer and said natural or synthetic material, it is preferable to apply pressure to the composite both prior to and during the curing of the organopolysiloxane formulation. Pressures of from about 5 to 1000 pounds per square inch and higher have been employed for such purpose with good results. Again, when adhesion is effected in this maner the resulting bond is often so adherent that the elastomer cannot be removed without damage thereto.

Still another method of preparing the composite articles of this invention comprises coating a natural or synthetic material with a mixture or dispersion comprising a diorgano-substituted polysiloxane gum, a combination of an alkoxy-containing silicon compound and/or a hydroxy-containing silicon compound, a boron-containing compound, a titanium-containing compound, a filler, a curing catalyst and a suitable liquid dispersing agent, such as an aromatic hydrocarbon, including toluene, benzene, xylene, and the like. Such dispersions can be readily applied to the surface of a natural or synthetic material by conventional methods, such as by dipping, spraying, brushing, and the like. The liquid dispersing agent is then evaporated and the coated material heated to a temperature sufficiently elevated to cure the deposited formulation to an elastomer while at the same time affecting adhesion of said elastomer to said material. If desired, additional coats may be applied by repeating this process.

While it is not necessary to use bonding agents in order to prepare the composite articles of this invention, it is desirable that the surface of the natural or synthetic material employed be clean. Cleaning can be accomplished by any means known in the particular arts relating to such materials.

The improved organopolysiloxane formulations of this invention comprise a diorgano-substituted polysiloxane gum, an alkoxy-containing silicon compound and/or a hydroxy-containing silicon compound, titanium-containing compound, a filler and a curing catalyst, and can be prepared by adding the ingredients thereof to a two-roll mill and milling said ingredients until the filler, catalyst, alkoxy-containing silicon compound and/or hydroxy-containing silicon compound, and titanium-containing compound are thoroughly dispersed within the polysiloxane gum. By way of illustration, an organopolysiloxane formulation curable to a highly-reinforced elastomer suitable for use as a general purpose stock can be produced by milling together on a two-roll mill, 15 parts by weight of an ethoxy-endblocked dimethylpolysiloxane oil having an average of one ethoxy group bonded to each of the terminal silicon atoms (or 15 parts by weight of a hydroxy-endblocked dimethylpolysiloxane oil having an average of one hydroxyl group bonded to each of the terminal silicon atoms, or a mixture of 7.5 parts by weight such ethoxy-endblocked oil and 7.5 parts by weight of such hydroxy-endblocked oil), 1 part by weight of tetraisopropyl titanate, 45 parts by weight of finely-divided silica, 1 part by weight of di-tertiary-butyl peroxide, and 100 parts by weight of a linear polysiloxane gum containing 99.75 percent by weight dimethylsiloxane units and 0.25 percent by weight ethylvinylsiloxane units for a period of about fifteen minutes. The organopolysiloxane formulation so produced can then be removed from the mill and cured by heating at a temperature of about 340° F. for a period of about 20 minutes to produce an organopolysiloxane elastomer. Elastomers of any desired shape may be prepared by the use of suitable molds. The cured elastomers possess essentially the same physical and electrical characteristics as elastomers prepared from the same formulation free of a hydrolyzable titanium-containing compound, including comparable tensile strength, dielectric strength, elongation, and tear-resistance properties. When such elastomers are subjected to postcure treatments, they retain essentially all their desirable physical and electrical characteristics.

The improved organopolysiloxane formulations of this invention which are curable to pressure-sensitive elastomers comprise a diorgano-substituted polysiloxane gum, an alkoxy-containing silicon compound and/or a hydroxy-containing silicon compound, a boron-containing compound, a titanium-containing compound, a filler and a curing catalyst. Such organopolysiloxane formulations can be prepared by adding the ingredients thereof to a two-roll mill and milling the ingredients until the filler catalyst, titanium-containing compound, boron-containing compound, alkoxy-containing silicon compound and/or hydroxy-containing silicon compound are thoroughly dispersed within the polysiloxane gum. By way of illustration, an organopolysiloxane formulation curable to a highly-reinforced, pressure-sensitive elastomer suitable for use as a general purpose stock can be produced by milling together on a two-roll mill, 6 parts by weight of an ethoxy-endblocked dimethylpolysiloxane oil having an average of one ethoxy group bonded to each of the terminal silicon atoms, 6 parts by weight of a hydroxy-endblocked dimethylpolysiloxane oil having an average of one hydroxyl group bonded to each of the terminal silicon atoms, 4 parts by weight of trimethyl borate, 1 part of tetraisopropyl titanate, 45 parts by weight of finely-divided silica, 1 part by weight of di-tertiarybutyl peroxide, and 100 parts by weight of a linear polysiloxane gum containing 99.75 percent by weight dimethylsiloxane units and 0.25 percent by weight ethylvinylsiloxane units for a period of about fifteen minutes. The organopolysiloxane formulation so produced can then be removed from the mill and cured to an elastomer by heating to a temperature of about 340° F. for a period of about 20 minutes. Elastomers of any desired shape can be prepared by the use of suitable molds. The cured elastomers possess essentially the same physical and electrical characteristics as elastomers prepared from the same formulation free of a titanium-containing compound, including comparable tensile strength, dielectric strength, elongation, and tear-resistance properties. However, when a titanium-containing compound is incorporated therein, the resulting elastomers are more adhesive in nature and upon the application of pressure will adhere to themselves and a wide variety of natural and synthetic materials. When such elastomers are subjected to postcure treatments, they retain essentially all their desirable physical and electrical characteristics, including their adhesive and cohesive properties.

The polysiloxane gums employed in preparing the improved formulations and elastomers of this invention are diorgano-substituted polysiloxanes containing hydrocarbon groups of one or more types. Such polysiloxanes can contain one or more types of substituents taken from the class of hydrogen atoms, hydrocarbon groups free of aliphatic unsaturation, olefinically-unsaturated hydrocarbon groups, halosubstituted hydrocarbon groups and cyanoalkyl groups. Preferably, the organo substituents of such polysiloxanes are composed of either: (a) hydrocarbon groups of one or more types that are free of aliphatic unsaturation; (b) hydrocarbon groups of one or more types that are free of aliphatic unsaturation, and olefinically-unsaturated hydrocarbon groups of one or more types; (c) hydrocarbon groups of one or more types that are free of aliphatic unsaturation, and halo-substituted hydrocarbon groups of one or more types; or (d) hydrocarbon groups of one or more types that are free of aliphatic unsaturation, and cyanoalkyl groups of one or more types.

Preferably, when hydrocarbon groups free of aliphatic unsaturation are present in such polysiloxanes, they are selected from the class consisting of methyl, ethyl, amyl and phenyl groups; the olefinically-unsaturated hydrocarbon groups, when present, are selected from the class consisting of vinyl, allyl, and cyclohexenyl groups; the halo-substituted hydrocarbon groups, when present, are selected from the class consisting of chloro- and fluoro-substituted methyl, propyl, butyl and phenyl groups, including polychloro- and polyfluoro-substituted methyl, propyl, butyl and phenyl groups; and the cyanoalkyl groups, when present, are selected from the class consisting of beta-cyanoethyl, gamma-cyanopropyl and delta-cyanobutyl groups.

The diorganopolysiloxane gums employed in preparing the improved formulations and elastomers of this invention can be employed entirely as linear polysiloxane gums, or as linear polysiloxane gums modified with lower molecular weight polysiloxane oils. The linear polysiloxane gums can be employed as relatively short chain, low molecular weight polysiloxanes of such viscosity that the gums remain pourable liquids, or they can be employed as relatively long chain, high molecular weight polysiloxanes of such viscosity that the gum approaches the solid state and will barely flow when unconfined.

The linear diorganopolysiloxane gums employed in preparing the improved formulations and elastomers of this invention can be employed either alone or as a blend of two or more different gums. By suitably selecting and blending polysiloxane gums having differing organic substituents it is possible to achieve the effect of utilizing a single polysiloxane having two or more types of organic substituents. Blending may be effected in any suitable manner. For example, blending may be effected on or in rubber stock compounding rolls and mixers, either prior to or during the mixing and compounding of the other ingredients of the organopolysiloxane formulation. Blending may also be effected through the use of solutions of dispersions of the ingredients to be mixed. When the linear diorganopolysiloxane gums employed in preparing the improved formulations and elastomers of this invention are modified with lower molecular weight polysiloxane oils, blending of the gums and oils may be effected in the manner described above, or in any other suitable manner.

The lower molecular weight polylsiloxane oils used to modifiy such gums can be prepared by known hydrolysis methods. Thus, for example, dihydrocarbon-substituted polysiloxane oils can be prepared by the hydrolysis or co-hydrolysis of one or more dihydrocarbon-substituted di-halo- or dialkoxy- silanes in which the hydrocarbon groups attached to silicon may be the same or different.

Linear diorganopolysiloxane gums containing one or more types of organo substituents can be prepared by known hydrolysis or equilibration methods. For example, linear dihydrocarbon-substituted polysiloxane gums can be prepared: (1) by the hydrolysis or cohydrolysis of one or more dihydrocarbon-substituted dihalo-or dialkoxysilanes in which the hydrocarbon groups attached to silicon may be the same or different; or (2) by the equilibration or coequilibration of one or more low molecular weight cyclic dihydrocarbon substituted polysiloxanes in which the hydrocarbon groups attached to silicon may be the same or different. Blending to achieve the effect of utilizing a linear polysiloxane gum containing both hydrocarbon groups that are free of aliphatic unsaturation and olefinically-unsaturated hydrocarbon groups may be effected by mechanically mixing one or more linear dihydrocarbon-substituted polysiloxane gums containing only hydrocarbon groups that are free of aliphatic unsaturation with one or more linear dihydrocarbon-substituted polysiloxane gums containing hydrocarbon groups that are free of aliphatic unsaturation and olefinically-unsaturated hydrocarbon groups. Likewise, linear polysiloxane gums containing halo-substituted hydrocarbon groups of one or more types and/or cyanoalkyl groups of one or more types can be prepared and blended by methods similar to those described above.

When olefinically-unsaturated hydrocarbon groups are present in the linear polysiloxane gums employed in preparing the improved formulations and elastomers of this invention, they are preferably present in limited predetermined numbers, and are disposed at spaced intervals along the linear polysiloxane chains. Thus, when such gums consist of dihydrocarbon-substituted polylsiloxanes having substituents composed of hydrocarbon groups free of aliphatic unsaturation and olefinically-unsaturated hydrocarbon groups, it is preferred that from 0.037 to 0.70 percent of the silicon atoms disposed along the linear polysiloxane chains be bonded to olefinically-unsaturated hydrocarbon groups (equivalent to about 0.05 to 1.0 percent by weight of olefinically-unsaturated hydrocarbon groups). In like manner, when such gums contain organo substituents in addition to hydrocarbon groups free of aliphatic unsaturation and olefinically-unsaturated hydrocarbon groups, as for example, halo-substituted hydrocarbon groups and/or cyanoalkyl groups, it is again preferred that from 0.037 to 0.70 percent of the silicon atoms present be bonded to olefinically-unsaturated hydrocarbon substituents. The introduction of such number of olefinically-unsaturated hydrocarbon groups into the polysiloxane contemplates the provision of from five to twenty crosslinks per molecule through such groups upon curing, but such groups may be present in greater or lesser amounts to provide cured elastomers of modified properties.

Oftentimes it may be desirable to effect crosslinking of such polysiloxane gums through groups in addition to or in place of olefinically-unsaturated hydrocarbon groups. Such can be accomplished by the use of curing agents which do not exhibit a tendency to selectively and preferentially effect crosslinking through olefinically-unsaturated hydrocarbon groups. Catalysts suitable for use in curing organopolysiloxane gums to the improved elastomers useful in this invention are hereinafter more fully described.

When the linear diorganopolysiloxane gums employed in preparing the improved formulations and elastomers of this invention consist of organo-substituted polysiloxanes having organo substitutents composed of hydrocarbon groups and halo-substituted hydrocarbon groups, it is preferred that such gums contain an average of from about 0.1 to about 1, preferably from about 0.25 to about 0.75, halo-sustituted hydrocarbon groups per silicon atom. When such gums consist of organo-substituted polylsiloxanes having organo substituents composed of hydrocarbon groups and cyanalkyl groups, it is preferred that such gums contain an average of from about 0.1 to about 1, preferably from about 0.25 to about 0.75, cyanoalkyl groups per silicon atom.

The alkoxy-containing silicon compounds employed in preparing the improved organopolysiloxane formulations and elastomers of this invention includes alkoxy-containing silicates and polysilicates, and organo-substituted alkoxy-containing silanes and polysiloxanes. Such compounds are preferably of relatively low molecular weight and contain silicon-bonded alkoxy groups in limited predetermined numbers. Preferably the compounds employed are alkoxy-endblocked. When silanes and polysiloxanes are employed, as is preferred, such compounds also contain organo groups of one or more types bonded to the silicon or silicon atoms thereof through a carbon-to-silicon bond.

While the alkoxy-containing silanes and silicates employed in preparing the improved formulations and elastomers of this invention usually contain only a single silicon atom, the alkoxy-containing polysiloxanes employed, wherein the silicon atoms are joined by oxygen atoms, can contain from two up to thirty-five, and more, silicon atoms per molecule. When polysiloxanes are employed, it is preferred that they be linear in structure (although they can be crosslinked) and contain not more than about twenty silicon atoms per molecule.

The alkoxy-containing silicon compounds employed in preparing the improved formulations and elastomers of this invention contain at least one, and preferably at least two, silicon-bonded alkoxy groups per molecule. When polysiloxanes and polysilicates are employed, such compounds can contain up to six, and more, silicon-bonded alkoxy groups per molecule. Preferably the alkoxy groups present in such alkoxy-containing silicon compounds are taken from the class consisting of methoxy, ethoxy, propoxy and butoxy groups.

Among the organo groups which can be present in the alkoxy-containing silanes and polysiloxanes employed in preparing the improved formulations and elastomers of this invention are hydrocarbon groups free of aliphatic unsaturation, olefinically-unsaturated hydrocarbon groups, halo-substituted hydrocarbon groups, aminoalkyl groups, cyanoalkyl groups, carbalkoxyalkyl groups, and the like. Preferably, the organo groups present in such compounds are taken from the class consisting of: (a) hydrocarbon groups free of aliphatic unsaturation selected from the class consisting of methyl, ethyl and phenyl groups; (b) olefinically-unsaturated hydrocarbon groups selected from the class consisting of vinyl, allyl, and cyclohexenyl groups; (c) halo-substituted hydrocarbon groups selected from the class consisting of chloro- and fluoro-substituted methyl, propyl, butyl and phenyl groups, including polychloro- and polyfluoro-substituted methyl, propyl, butyl and phenyl groups; (d) cyano-alkyl groups selected from the class consisting of beta-cyano-ethyl, gamma-cyanopropyl, delta-cyanobutyl, and epsilon-cyano-pentyl groups; (e) aminoalkyl groups selected from the class consisting of gamma-aminopropyl, delta-aminobutyl and epsilon-aminopentyl groups, and (f) carbalkoxyalkyl groups selected from the class consisting of beta-carbalkoxyethyl, beta-carbalkoxypropyl and gamma-carbalkoxy groups.

Illustrative of the alkoxy-containing silicates and polysilicates which can be employed in preparing the improved formulations and elastomers of this invention are tetraethylsilicate, as well as the condensed polysilicates thereof, and such silicates as diethoxy-di-(2-ethylhexanediol-1,3)silicate,
diethoxy-di-(triethanolamine)silicate-n,n-dioleate,
diethoxy-o,o-di-(2-ethylhexanediol-1,3)silicate,
diethoxy-o,o-di-(triethanolamine)silicate-n,n-dioleate,
and the like.

Illustrative of the alkoxy-containing silanes which can be employed in preparing the improved formulations and elastomers of this invention are trimethylethoxysilane,
dimethyldiethoxysilane,
methyltriethoxysilane,
ethyltriethoxysilane,
diethyldimethoxysilane,
triethylpropoxysilane,
phenyltriethoxysilane,
diphenyldiethoxysilane,
triphenylethoxysilane,
methylethyldipropoxysilane,
methylphenyldiethoxysilane,
vinyltriethoxysilane,
ethylvinyldiethoxysilane,
phenylvinyldiethoxysilane,
divinyldipropoxysilane,
allyltriethoxysilane,
methylallyldiethoxysilane,
ethylcyclohexenyldiethoxysilane,
chloromethyltriethoxysilane,
gamma-chloropropyltriethoxysilane,
gamma-chloropropylmethyldiethoxysilane,
gamma-delta-dichlorobutyltriethoxysilane,
para-chlorophenyltriethoxysilane,
ortho-para-dichlorophenyltriethoxysilane,
beta-cyanoethyltriethoxysilane,
gamma-cyanopropylmethyldiethoxysilane,
delta-cyanobutylphenyldipropoxysilane,
gamma-aminopropyltriethoxysilane,
gamma-aminopropylmethyldiethoxysilane,
delta-aminobutyltripropoxysilane,
delta-aminobutylmethyldiethoxysilane,
epsilon-aminopentylphenyldiethoxysilane,
beta-carbethoxyethyltriethoxysilane,
beta-carbethoxyethylphenyldipropoxysilane,
beta-carbethoxypropyltriethoxysilane,
beta-carbethoxypropylmethyldiethoxysilane,
gamma-carbethoxypropyltriethoxysilane,
gamma-carbopropoxypropyltripropoxysilane, and the like.

These alkoxy-containing silanes can be used to prepare organo-substituted alkoxy-containing polysiloxanes by known hydrolysis or equilibration methods. For example, dihydrocarbon-substituted alkoxy-containing polysiloxanes can be prepared: (1) by the controlled hydrolysis or cohydrolysis of one or more dihydrocarbon-substituted dialkoxysilanes in which the hydrocarbon groups attached to silicon may be the same or different; or (2) by the coequilibration of one or more low molecular weight cyclic dihydrocarbon-substituted polysiloxanes in which the hydrocarbon groups attached to silicon may be the same or different with one or more dihydrocarbon-substituted dialkoxysilanes in which the hydrocarbon groups attached to silicon may be the same or different under controlled conditions of heat and pressure whereby a linear dihydrocarbon-substituted alkoxy endblocked polysiloxane oil is obtained.

More specifically, a low molecular weight linear ethoxy-endblocked dimethylpolysiloxane oil having an average of one ethoxy group bonded to each of the terminal silicon atoms of the polysiloxane chains thereof can be produced by admixing one mole of the cyclic tetramer of dimethylsiloxane with one mole of dimethyldiethoxysilane and a suitable catalyst, and heating the resulting mixture in a sealed pressure vessel at a temperature of about 200° C. for a period of about 2 hours.

Processes for producing alkoxy-endblocked dihydrocarbon-substituted polysiloxane oil are disclosed and claimed in United States Patent 2,909,549.

By utilizing similar procedures, alkoxy-containing polysiloxanes having organo substituents other than, or in addition to, hydrocarbon groups can also be prepared. Alkoxy-containing silicon compounds having organo substituents other than hydrocarbon and halo-substituted hydrocarbon groups, such as aminoalkyl groups, cyanoalkyl groups and carbalkoxyalkyl groups are new compositions of matter and are disclosed and claimed in copending United States applications Serial Numbers 615,-481 (now abandoned) 615,483 (now abandoned) and 615,492 all filed October 16, 1956.

Generally, ethoxy-endblocked dimethylpolysiloxane oils have molecular weights ranging from about 400 to about 2700 and above, preferably from about 600 to about 1500, and contain ethoxy groups in an amount by weight of from about 5 percent to about 25 percent, preferably from about 8 percent to about 20 percent. When ethoxy-endblocked polysiloxane oils contain hydrocarbon substitutents other than, or in addition to, methyl groups, the molecular weight of the oils will, of course, be in a range above that described for dimethylpolysiloxane oils. In like manner, the ethoxy content of such polysiloxane oils will be relatively lower in value when the hydrocarbon substituents comprise groups other than, or in addition to, methyl groups.

The relative amounts of the various organic groups which can be present in the alkoxy-containing polysiloxanes employed in preparing the improved organopolysiloxane formulations and elastomers of this invention can vary over a wide range without materially affecting the properties of said formulations and elastomers. Preferably, the alkoxy-containing polysiloxanes employed are dihydrocarbon-substituted alkoxy-endblocked polysiloxane oils having hydrocarbon substituents consisting of one or more groups taken from the class consisting of methyl, ethyl, phenyl, vinyl alkyl and cyclohexenyl groups.

The hydroxy-containing silicon compounds employed in preparing the improved organopolysiloxane formulations and elastomers of this invention include hydroxy-containing silicates and partially-condensed polysilicates thereof, and organo-substituted hydroxy-containing silanes and polysiloxanes. Such compounds are preferably of relatively low molecular weight and contain silicon-bonded hydroxyl groups in limited predetermined numbers. Preferably the compounds employed are hydroxy-endblocked. When silanes and polysiloxanes are employed, as is preferred, such compounds also contain organo groups of one or more types bonded to the silicon or silicon atoms thereof through a carbon-to-silicon bond. The organo groups which can be present in such compounds are the same as those which can be present in the alkoxy-containing silicon compounds described above.

While the hydroxy-containing silanes and silicates employed in preparing the improved formulations and elastomers of this invention usually contain only a single silicon atom, the hydroxy-containing polysiloxanes employed, wherein the silicon atoms are joined by oxygen atoms, can contain from four up to twenty, and more, silicon atoms per molecule. When polysiloxanes are employed, it is preferred that they be linear in structure (although they can be crosslinked) and contain from twelve to seventeen silicon atoms per molecule.

The hydroxy-containing silicon compounds employed in preparing the improved formulations and elastomers of this invention contain at least one, and preferably at least two, silicon-bonded hydroxyl groups per molecule. When polysiloxanes and partially condensed polysilicates are employed, such compounds can contain up to six, and more, silicon-bonded hydroxyl groups per molecule.

Illustrative of the hydroxy-containing silicates and partially-condensed polysilicates thereof which can be employed in preparing the improved formulations and elastomers of this invention are partially-hydrolyzed tetraethylsilicate, as well as the partially-condensed polysilicates thereof, and such silicates as diethoxy-di-(2-ethylhexanediol-1,3)silicate, diethoxy-o,o-di-(2 - ethylhexanediol-1,3)silicate, and the like.

Illustrative of the hydroxy-containing silanes which can be employed in preparing the improved formulations and elastomers of this invention are diphenyldihydroxysilane, trimethylhydroxysilane, phenyldimethylhydroxysilane, phenyltrihydroxysilane, methyltrihydroxysilane, and the like.

Organo-substituted hydroxy-containing polysiloxanes can be prepared by known hydrolysis or equilibration methods. For example, dihydrocarbon-substituted hydroxy-containing polysiloxanes can be prepared: (1) by the controlled hydrolysis or cohydrolysis of one or more dihydrocarbon-substituted dihalo- or dialkoxysilanes in which the hydrocarbon groups attached to silicon may be the same or different; or (2) by the coequilibration of one or more low molecular weight cyclic dihydrocarbon-substituted polysiloxanes in which the hydrocarbon groups attached to silicon may be the same or different with water under controlled conditions of heat and pressure whereby a linear dihydrocarbon-substituted hydroxy-endblocked polysiloxane oil is obtained.

More specifically, a low molecular weight linear hydroxy-endblocked dimethylpolysiloxane oil having an average of one hydroxyl group bonded to each of the terminal silicon atoms of the polysiloxane chains thereof can be produced by admixing predetermined amounts of the cyclic tetramer of dimethylsiloxane and water, and heating the resulting mixture in a sealed pressure vessel at a temperature of about 300° C. for a period of about 14 hours.

Generally, hydroxy-endblocked dimethylpolysiloxane oils have molecular weights ranging from about 300 to about 1500 and above, preferably from about 900 to about 1300, and contain hydroxyl groups in an amount by weight of from about 1 percent to about 10 percent, preferably from about 2.4 percent to about 3.5 percent. When hydroxy-endblocked polysiloxane oils contain hydrocarbon substituents other than, or in addition to, methyl groups, the molecular weight of the oils will, of course, lie in a range above that described for dimethylpolysiloxane oils. In like manner, the hydroxyl content of such polysiloxane oils will be relatively lower in value when the hydrocarbon substituents comprise groups other than, or in addition to, methyl groups.

The relative amounts of the various organic groups which can be present in the hydroxy-containing polysiloxanes employed in preparing the improved organopolysiloxane formulations and elastomers of this invention can vary over a wide range without materially affecting the properties of said formulations and elastomers. Preferably, the hydroxy-containing polysiloxanes employed are dihydrocarbon-substituted hydroxy-endblocked polysiloxane oils having hydrocarbon substituents consisting of one or more groups taken from the class consisting of methyl, ethyl phenyl, vinyl, allyl, and cyclohexenyl groups.

The amount of alkoxy-containing silicon compound and hydroxy-containing silicon compound employed in preparing the improved organopolysiloxane formulations and elastomers of this invention is not narrowly critical and can vary over a wide range. Generally from as little as 1 part by weight, and less, to as much as 100 parts by weight, and more, of the sum of alkoxy-containing silicon compound and hydroxy-containing silicon compound per 100 parts by weight of the diorgano-substituted polysiloxane gum present can be advantageously employed. Preferably, such compounds are employed in amounts ranging from about 4 parts to about 80 parts by weight per 100 parts by weight of the polysiloxane gum present.

In preparing the improved organopolysiloxane formulations and elastomers of this invention, the alkoxy-containing silicon compound and/or hydroxy-containing silicon compound is most suitably employed partly as monomeric silane from the group consisting of alkoxysilanes and hydroxysilanes, and partly as polymeric siloxane from the group consisting of hydroxy-containing polysiloxanes and alkoxy-containing polysiloxanes. In such case, it is preferred that the monomeric silane be employed in amounts ranging from about 0.5 part to about 30 parts by weight per 100 parts by weight of the diorgano-substituted polysiloxane gum present and the polymeric siloxane be employed in amounts ranging from about 3.5 parts to about 50 parts by weight 100 parts by weight of the polysiloxane gum present. Most preferably, the monomeric silane is employed in amounts ranging from about 1 part to about 10 parts by weight per 100 parts by weight of the diorganopolysiloxane gum present, and the polymeric siloxane is employed in amounts ranging from about 6 parts to about 20 parts by weight per 100 parts by weight of the diorganopolysiloxane gum present. It is to be understood, of course, that such combination can include three, four, or more components as well as two components.

The titanium-containing compounds employed in preparing the improved organopolysiloxane formulations and elastomers of this invention are the hydrolyzable titanium-containing compounds, including, among others, titanium esters, titanium chelates and titanium salts of organic acids. In the esters and organic acid salts, the titanium atom is bonded to monodentate organic groups (that is, only one linkage connects the titanium atom to each organic moiety) while in the chelates the titanium atom is bonded to at least one multidentate organic group (that is, the organic moiety is bonded to the titanium through more than one linkage). Such compounds can be employed either individually or in any suitable combination. Illustrative examples of titanium esters which can be employed include titanium ortho esters (that is, esters where each titanium atom is bonded through titanium-oxygen-carbon bonds to four monodentate organo groups derived from alcohols) such as tetraisopropyl titanate, tetra-n-butyl titanate, tetra-2-ethylhexyl titanate, tetrabenzyl titanate, tetrastearyl titanate and the like, mixed titanium ortho esters such as diisopropyl-di-n-butyl titanate, diisopropyl-di-2-ethylhexyl titanate, diisopropyldistearyl titanate and the like, and the polymers of such compounds. Among the titanium chelates which can be employed may be mentioned octyleneglycol titanates such as tetraoctyleneglycol titanate, triethanolamine titanates such as tetra-triethanolamine titanate, nitrogen salts of triethanolamine titanates such as triethanolamine titanate-N-oleates and triethanolamine titanate-N-stearates, titanium lactates, and titanium acetylacetonates. Suitable organic acid titanium salts include such compounds as titanium stearates, titanium oleates, titanium acetates and the like. Mixed titanium-containing compounds, such as a mixed titanium ester and salt, for example isopropoxy titanium stearates and isopropoxy titanium oleates, and the polymers of such compounds, and chelated titanium esters such as octyleneglycolbutanol titanates and triethanolaminepropanol titanates, and the polymers of such compounds, can also be employed. The titanium-containing compounds employed in preparing the improved organopolysiloxane formulations and elastomers useful in this invention can, of course, contain non-hydrolyzable organic groups in addition to the hydrolyzable groups present, as, for example, in phenyl titanium triacetate and dibutyl titanium diisopropoxide.

The preferred monomeric titanium-containing compounds employed in preparing the improved organopolysiloxane formulations and elastomers of this invention can be depicted by the formula $R_nTi(OR')_{4-n}$, wherein R represents a non-hydrolyzable monovaelnt organic group, R' represents a hydrogen atom, an R group or an

group, and $n$ is an integer having a value of from 0 to 3 inclusive. Preferably R and R' are organic groups containing from 1 to 18 carbon atoms and $n$ is an integer having a value of from 0 to 2 inclusive. The compounds most preferred are the titanium ortho esters, $Ti(OR')_4$, where R' is an alkyl group. The groups attached to titanium can, of course, be the same or different. The formula depicted above is intended to include chelated cyclic structures wherein the titanium atom can have, in addition to four primary valence bonds, two additional secondary bonds formed by the acceptance of electrons from an atom capable of donating them.

The amount of titanium-containing compound employed in preparing the improved organopolysiloxane formulations and elastomers of this invention depends to a large extent upon the results desired, upon the particular titanium-containing compound employed, and upon the kinds and amounts of other ingredients present. Since the excessive use of titanium-containing compounds will result in excessive hardening and loss of plasticity of the formulation, care must be exerted to add a proper amount of such compounds thereto. In general, (as stated above) from as little as 0.1 part by weight to as much as 10 parts by weight of titanium-containing compound per 100 parts by weight of the diorganopolysiloxane gum present can be advantageously employed; however, titanium-containing compounds are preferably employed in amounts ranging from about 0.5 part to about 3 parts by weight per 100 parts by weight of the polysiloxane gum present.

The filters employed in preparing the improved organopolysiloxane formulations and elastomers of this invention are those highly-reinforcing carbon black and inorganic compounds heretofore employed as fillers in organopolysiloxane elastomers in accordance with customary procedures. Such carbon black and inorganic compounds can be employed either alone or in any suitable combination. If desired, such compounds can be treated with modifying agents, such as the hydrolyzable hydrocarbon silanes, to improve their surface characteristics.

When inorganic fillers are employed in preparing the improved formulations and elastomers of this invention, it is preferable that such fillers be finely-divided, silica-base materials having a particle diameter of less than 500 millimicrons and a surface area of greater than 50 square meters per gram. However, inorganic filler materials having a composition, or particle diameter and surface area, other than those preferred can also be employed, either alone or in combination with the preferred fillers. Thus, such filler materials as titania, iron oxide, aluminum oxide, aluminum silicate, zinc oxide, zirconium silicate, barium sulfate-zinc sulfide, diatomaceous earth, calcium carbonate and quartz can be employed either alone or in combination with the finely-divided, silica-base fillers described.

The amount of highly-reinforcing silica employed as filler in preparing the improved formulations and elastomers of this invention depends upon the tensile strength and hardness properties desired in the elastomer. By way of illustration, where high tensile strength and high hardness properties are required, large amounts of highly-reinforcing silica are employed, together with smaller amounts of other type fillers, if such be desired. Where high tensile strength and high hardness properties are not as important, for example when the elastomers are to be employed as coatings or cable compounds, lesser amounts of highly-reinforcing silica can be employed together with larger amounts of other types of fillers.

When the highly-reinforcing silica fillers employed in preparing the improved formulations and elastomers of this invention are highly acidic in nature, such as when they have a pH of 4 or less, it is oftentimes desirable to add materials thereto which tend to neutralize such acidity. In such instances, such buffers as calcium zirconate, barium zirconate, calcium silicate, and other alkaline earth compounds or other type buffers can be added in appropriate amount to the filler or to the curable organopolysiloxane formulation containing such filler.

It has been found that the capacity of an available carbon black product to function effectively as a filler is influenced by its particle size, hydrogen ion concentration and volatile matter content. For example, carbon black products having particles larger than about 850 A. provide low reinforcement. In general, carbon black products having particles larger than 850 A. or smaller than 300 A., or having a volatile matter content higher than about 20 percent by weight, or a hydrogen ion concentration lower than that corresponding to a pH of about 9.0 (as indicated by results obtained in measuring hydrogen ion concentrations of water dispersions of carbon blacks in accordance with the standard procedures employed by carbon black manufacturers) cannot be advantageously employed as fillers without having been subjected to certain preliminary corrective treatments prior to curing. Such treatments include precure heat-aging and/or treatment with an alkaline agent or acid acceptor. Thus, channel blacks, being acid in reaction and having a relatively high volatile matter content, require suitable precure corrective treatments in order to condition them for effective use.

Any carbon black filler conventionally used in the art of elastomer compounding and which meets the requirements as to particle size, percent volatile matter, and pH as described above can be employed. Similarly, any conventional silica or other inorganic filler material for elastomers can be used. A variety of suitable inorganic fillers are listed in my U.S. Patent 2,954,357.

The compounds employed as curing catalysts in preparing the improved organopolysiloxane elastomers of this invention include all the compounds heretofore employed as curing catalysts in preparing organopolysiloxane elastomers in accordance with customary procedures. When curing of the diorganopolysiloxane gum is to be effected through olefinically-unsaturated hydrocarbon groups, the preferred curing agents are those organic peroxides which exhibit a tendency to selectively and preferentially effect crosslinking through such groups. Especially suitable for this purpose are the alkyl peroxides which can be graphically depicted by the structural formulas:

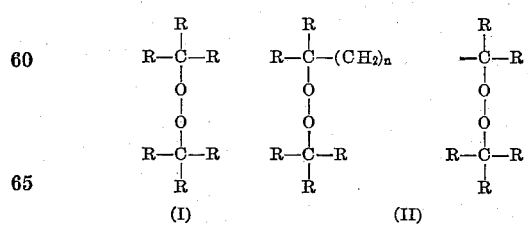

wherein R represents the same or different alkyl or aryl-substituted alkyl groups, and $n$ is zero or a larger integer. Specific examples of such curing catalysts include:

Di-tertiary-butyl peroxide
Tertiary-butyl-triethylmethyl peroxide
Dicumyl peroxide Tertiary-butyl-tertiary-triptyl peroxide, the composition of which is represented by the structural formula:

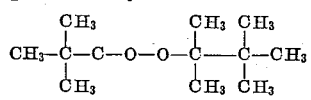

The use of alkyl peroxides in effecting cross-linking of organopolysiloxane gums through olefinically-unsaturated hydrocarbon groups is disclosed and claimed in the copending United States application of D. L. Bailey, W. T. Black, and M. L. Dunham, Serial No. 470,834, filed November 23, 1954.

Organic peroxides which do not exhibit a tendency to selectively and preferentially effect crosslinking through olefinically-unsaturated hydrocarbon groups can also be employed as curing catalysts in preparing the improved organopolysiloxane elastomers of this invention. By employing such peroxides in appropriate amounts it is possible to effect curing solely through groups free of aliphatic unsaturation (for example through methyl groups), or through groups free of aliphatic unsaturation in addition to olefinically-unsaturated hydrocarbon groups. Typical of such peroxides are the aryl peroxides, such as benzoyl peroxide, and the like; mixed alkyl-aryl peroxides, such as tertiary-butyl perbenzoate, and the like; chloroaryl peroxides, such as 1,4-dichlorobenzoyl peroxide, 2,4-dichlorobenzoyl peroxide, monochlorobenzoyl peroxide, and the like.

The choice of catalyst employed in effecting vulcanization of the organopolysiloxane formulations of this invention depends upon the fillers present in such formulations and the manner in which curing is sought to be accomplished, as well as upon the particular group through which curing is sought to be accomplished. Thus, organic peroxides such as benzoyl peroxide, dichlorobenzoyl peroxide, and dicumyl peroxide are particularly suitable as catalyst when curing is to be accomplished by hot air vulcanizing techniques. When the formulation to be cured contains a carbon black filler, it is preferably to employ such peroxides as dicumyl peroxide and di-tertiary-butyl peroxide as curing catalysts.

The amount of curing catalyst employed in preparing the elastomers of this invention can vary over a wide range depending upon the degree of cure desired in the elastomer.

The boron-containing compounds employed in preparing organopolysiloxane formulations of this invention which are curable to pressure-sensitive adhesive elastomers generally include liquid and solid boron compounds which, in addition to boron, contain one or more of the elements oxygen, hydrogen, carbon and nitrogen. Typical of such compounds are: the boric acids, such as pyroboric acid, boric acid, and the like: the esters of the boric acids, such as trimethyl borate, triethyl borate, tri-n-propyl borate, tri-n-butyl borate, triamyl borate, tri-n-dodecyl borate, tri-hexyleneglycol borate, tri-(2-cyclohexylcyclohexyl)borate, tri(di-isobutylcarbinyl)borate, tristearyl borate, trioleyl borate, triphenyl borate, tri-o-cresyl borate, 2,6-di-tertiary-butyl-p-cresyl-di-allyl borate, 2,6-di-tertiary-butyl-p-cresyl-di-2-ethylhexyl borate, 2,6-di-tertiary-butyl-p-cresyl-di-n-butyl borate, and the like; the anhydride of boric acid, namely boron anhydride (boric anhydride, $B_2O_3$); the boron hydrides, such as pentaborane ($B_5H_9$), hexaborane ($B_6H_9$), decaborane ($B_{10}H_{14}$), and the like; the complexes formed by such hydrides with nitrogen compounds, such as triethanolamine borate, triisopropanolamine borate, and the complex formed between diborane and ammonia ($B_2H_6 \cdot 2NH_3$); the complexes formed by such hydrides with hydrocarbon compounds such as diphenyldecaborane, and the like; the alkali metal and alkaline metal (alkaline earth metal) derivatives or complexes of the boric acids, such as sodium meta-borate, potassium penta-borate, magnesium borate, and the like.

The boron-containing compounds employed in preparing the improved formulations and elastomers of this invention preferably contain at least one oxygen atom in addition to at least one boron atom. Illustrative of such compounds are the boric acids, such as pyroboric acid, boric acid, and the like. The most suitable boron-containing compounds are those boron compounds which contain only boron, oxygen and hydrogen atoms, such as the boric acids, or those boron compounds which contain only boron, oxygen, hydrogen and carbon atoms.

The amount of boron-containing compound employed in preparing the improved formulations and elastomers of this invention is not narrowly critical and can vary over a wide range. Generally from as little as 0.05 part by weight, and less, to as much as 10 parts by weight, and more, of boron-containing compound per 100 parts by weight of diorganopolysiloxane gum present can be advantageously employed. Preferably, such compounds are employed in amounts ranging from about 0.1 part to about 4 parts by weight per 100 parts by weight of polysiloxane gum present.

Polysiloxane elastomers of my invention whether in the form of a tape or other article can be cured by conventional curing procedures. Thus, the polysiloxane compounds can be cured to an elastomer by heating the compound in a mold at temperatures of about 250° F. or higher for periods of time of fifteen minutes or longer with the aid of any of the conventional curing catalysts. When polysiloxane compounds are cured by hot air vulcanizing techniques, I prefer to employ as the catalysts such peroxides as dichlorobenzoyl peroxide, benzoyl peroxide, and dicumyl peroxide. Curing by hot air vulcanizing techniques is normally accomplished at temperatures at about 250° C. and higher for periods of about one-half minute and longer. When the improved compounds of my invention contain a carbon black filler, I prefer to employ such peroxides as dicumyl peroxide and di-tertiary-butyl peroxide as the curing agents.

Although the cured elastomers which contain a boron-containing compound are pressure senstive, they can usually be easily stripped from the mold. Some sticking may occur when mold cure is carried out at temperatures of 350° F. or higher. However, sticking can be almost completely eliminated through the use of a conventional mold release agent, such as a dimethylpolysiloxane oil, a diethylpolysiloxane oil, or a dimethylpolysiloxane oil modified with phenylmethylsiloxy units or (beta-phenylethyl)methyl siloxy units.

It is sometimes desirable to age a mixture of a diorgano-substituted polysiloxane gum, alkoxy-containing silicon compound and/or hydroxy-containing silicon compound, hydrolyzable titanium-containing compound, filler, and boron-containing compound, if one is employed, prior to compounding such mixture with a catalyst and curing. Aging for a period of from about one day to one week at room temperature, or heat-aging at an elevated temperature (above about 250° F.) for a period of from about 1 to 2 hours, or more, provide opportunity for better wetting of the filler by the polysiloxane gum. In addition, precure heat-aging effectively eliminates objectionable volatile matter such as water and absorbed bases (carried into the mixture by the filler) as a stage wherein distortion resulting from gas elimination is not harmful, and thus reduced the amount of gas that must be eliminated by postcure heat-aging at a time when density and structural form must be retained. The incorporation of a titanium-containing compound into such mixtures does not adversely affect the physical properties thereof on aging.

At the conclusion of such aging treatments, a curing catalyst can be incorporated into the mixture and the resulting mixture heat-cured to an elastomer. If desired, the elastomer may then be subjected to postcure heat-aging. While such postcure treatments serve to stabilize the physical properties of the elastomer and to improve electrical properties of a pressure-sensitive elastomer they do not have a detrimental effect on the pressure-sensitive adhesive properties of the elastomer. Postcuring can be conducted by heating at a temperature of about 350° F., preferably at a temperature of about 480° F., for a period of about 24 hours.

Pressure-sensitive elastomers can be prepared by curing a formulation of this invention which does not contain a filler, that is, a formulation containing a diorganopolysiloxane gum, an alkoxy-containing silicon compound, a boron-containing compound, a hydrolyzable titanium-containing compound and a curing catalyst. Although such unfilled elastomers are pressure sensitive, their tensile strength is very low (on the order of 100 pounds per square inch).

In the practice of my invention, the titanium-containing compound and alkoxy-containing polysiloxane oil can be mixed together and the mixture added to the elastomer formulation. However, this procedure is not generally satisfactory in the case of hydroxy-containing polysiloxane oils because such oils react very rapidly with hydrolyzable titanium compounds to form viscous gels.

The organopolysiloxane elastomers produced in accordance with this invention can be employed in any conventional use known for organopolysiloxane elastomers, including use as thermal and electrical insulators or vibration damping mounts.

The following examples are illustrative of this invention. The terms and expressions employed in the examples and throughout this specification are to be interpreted as indicated in the Glossary immediately preceding the examples. In the examples, all proportions are in parts by weight and all formulations were compounded on a two-roll mill at room temperature unless specifically stated otherwise.

GLOSSARY (A) *Green strength.*—The "build" and elastomeric properties of an organopolysiloxane formulation (i.e., an organopolysiloxane composition which is curable to the solid, elastomeric state) which enable it to be pulled under tension without tearing. Although this property is not expressed in any unit of measure, the term is well-known to those skilled in the rubber-compounding art and is evaluated by observation and comparison. The characteristics of an organopolysiloxane formulation which are collectively termed "green strength" by those skilled in the rubber-compounding art are more fully described in the examples and throughout the specification.

(B) *Miniature penetrometer.*—The miniature penetrometer used in determining the hardness of organopolysiloxane gums is a modification of the standard miniature penetrometer used in measuring the hardness or viscosity of a plastic substance, such as asphalt, made in accordance with suggestions contained in the article "Miniature Penetrometer for Determining the Consistency of Lubricating Greases" by Kaufman, Gus; Finn, W.J., and Harrington, R. J., Industrial and Engineering Chemistry, Analytical Edition, 11, 108–110, 1939.

In the modified miniature penetrometer, an aluminum plunger and penetrometer cone weighing 20 grams has been substituted for the steel plunger and penetrometer cone, weighing 150 grams, of the standard miniature penetrometer. Otherwise, the modified miniature penetrometer is of the same structure and dimensions as that described in the aforementioned article.

An organopolysiloxane gum is tested for hardness by lowering the penetrometer cone with the plunger into contact with the surface of the gum with the indicator reading zero. Then the penetrometer cone with its plunger is released to permit downward movement under the influence of gravity for a period of 10 seconds, and the depth of penetration is shown in millimeters on an indicator associated with the device. The indicated penetration is identified as the miniature penetrometer reading (MPR).

(C) *Elongation (ASTM D–412–51T).*—Amount of stretch of a sample under a tensile force expressed as a percentage of the original length:

$$\frac{(\text{Stretched length} - \text{original length})}{\text{Original length}} \times 100$$

(D) *Hardness (ASTM D–676–49T).*—Degree of indentation produced by a plunger or indentor under a specific load. Measured with a Shore A Durometer. The values range from 0 to maximum hardness of 100.

(E) *Tensile strength (ASTM D–412–49T).*—The force necessary to rupture a rubber specimen when stretched to the breaking point divided by the original cross sectional area (lb./sq. in.).

(F) *Tear strength (ASTM D–624–54).*—Similar to tensile test, except that a different "right angle" or "C" dumbbell (crescent) shape is used. Sample tears at the right angle. Force required to tear specimen, divided by the thickness of the specimen is the tear strength. (lb./in.)

(G) *Crease strength.*—The tensile force required to break a one-inch wide specimen of a coated fabric which has been deliberately creased by bending the coated fabric against itself through a 180 degree bend, and applying a specified weight along the crease thus formed. This property is expressed in terms of lb./inch. The method used for testing is specified in Navy Specification MIL–C–2194B, in sections 3.8.3.2 and 4.6.18 and amendments thereto.

(H) *Dielectric strength.*—The electrical strength required to puncture a sample of known thickness. This property is expressed in terms of volts/mil thickness. The method used for testing is specified in Navy Specification MIL–C–915A in sections 4.8.3.4 and 4.8.19.2.

(I) *Compression set (ASTM D–395–52T).*—Degree of failure of a sample to return to its original size after removal of a deforming force.

Compression set tests are run by compressing a 1.129 inch diameter of 0.500 inch high cylindrical specimen either under a constant load (Method A) or at a definite fixed deflection (Method B). After the specimen has been compressed, it may be subjected to an elevated temperature for a fixed time (usually twenty-two hours at 70° C.), then the load is released; after a thirty minute rest, the permanent change in the height of the specimen is measured and the percent set calculated. A small value is desirable.

Compression set is expressed as percent of original deflection in Method B.

Compression set is expressed as percent of original thickness in Method A.

(J) *Percent set at break.*—The degree to which an elastomer subjected to a tensile force is deformed after removal of such force. It is determined by subtracting the original length of the necked-down portion of a specimen from the pieced-together length of the same portion after rupture and dividing the value by the original length.

Example 1

A relatively soft ethoxy-endblocked linear polysiloxane gum containing 99.65 percent by weight dimethylsiloxane units and 0.35 percent by weight ethylvinylsiloxane units was prepared by mixing 29,800 grams of octamethylcyclotetrasiloxane with 4 grams of tetramethyldiethoxydisiloxane and 300 grams of a low molecular weight polysiloxane containing 28 percent by weight ethylvinylsiloxane units and 72 percent by weight dimethylsiloxane units with stirring to thoroughly mix the components; heating the mixture to a temperature of 145° C.; adding to the mixture a solution of potassium silanolate as catalyst in an amount sufficient to provide 30 parts of potassium ion per million parts of the mixture; stirring the resulting mixture for 10 minutes, and then heating said mixture in a sealed pressure vessel at a temperature of 150° C. for one hour and forty-five minutes. After heating, the contents of the vessel were allowed to cool to room temperature. The linear polysiloxane gum obtained thereby had a hardness corresponding to a miniature penetrometer reading of 78 at room temperature.

An ethoxy-endblocked dimethylpolysiloxane oil having an average of one ethoxy group bonded to each of the terminal silicon atoms of the polysiloxane chains thereof was prepared by mixing 700 grams of dimethyldiethoxysilane and 2750 grams of a mixture of cyclic dimethylsiloxanes (including the cyclic trimer, tetramer and the like); heating the resulting mixture, with stirring, to a temperature of 80° C.; adding to the mixture 3.5 grams of tetramethyl ammonium hydroxide dispersed in 50 grams of a mixture of cyclic dimethylsiloxanes (equivalent to a potassium ion concentration of 20 parts per million parts of the overall mixture); and heating the newly formed mixture at a temperature of 85° C. for two and one-half hours, and then at a temperature of 200° C. for three hours and twenty minutes. The mixture was allowed to cool to room temperature and was then filtered. The product obtained thereby comprised 3065 grams of a monoethoxy-endblocked dimethylpolysiloxane oil having an average molecular weight of about 820 and an average ethoxy content of about 10 percent by weight.

Following this procedure, other ethoxy-endblocked dimethylpolysiloxane oils varying in average molecular weight from about 700 to about 1200 and having an average ethoxy content of from about 8 to 15 percent by weight were also prepared. In some instances, ethyltriethoxysilane was employed as the endblocking compound leading to the production of ethoxy-endblocked oils having an average of 1.5 ethoxy groups bonded to each of the terminal silicon atoms of the polysiloxane chains thereof.

To each of two 100 part by weigh portions of the above-prepared polysiloxane gum were added 40 parts by weight of highly-reinforcing, finely-divided silica 1.8 parts by weight of dichlorobenzoyl peroxide, and 12 parts by weight of an above-prepared monoethoxy-endblocked dimethylpolysiloxane oil (having a molecular weight of about 750 to about 850 and an average ethoxy content of about 12 percent by weight), while to one of these portions was added 1.0 part by weight of tetra-2-ethylhexyl titanate. All additions were made during one ethylpounding procedure conducted on a two-roll mill. The recipes of each of the formulations are listed below:

TABLE 1-1

| Formulation | A-1 | B-1 |
| --- | --- | --- |
| Parts Polysiloxane Gum | 100 | 100 |
| Parts Silica | 40 | 40 |
| Parts Dichlorobenzoyl Peroxide | 1.8 | 1.8 |
| Parts Ethoxy-Endblocked Dimethylpolysiloxane Oil | 12 | 12 |
| Parts Tetra-2-ethylhexyl Titanate | 0 | 1.0 |

While the formulation of recipe A-1 (containing no titanium-containing compound) was a soft, putty-like material which readily fell apart when pulled under tension, the formulation of recipe B-1 (containing a titanium-containing compound) was characterized by increased hardness, "build" and elasticity, and could be easily stretched without tearing. These properties when present in an elastomer-curable organopolysiloxane formulation are collectively termed "green strength" by those skilled in the rubber-compounding art.

These formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation and tear resistance properties of each of the postcured specimens were determined and the results obtained are recorded below:

TABLE 1-2

| Formulation | A-1 | B-1 |
| --- | --- | --- |
| Hardness (Shore A) | 52 | 50 |
| Tensile Strength (p.s.i.) | 1,000 | 1,025 |
| Elongation (percent) | 400 | 375 |
| Tear Resistance (lb./inch) | 95 | 105 |

*Example 2*

To each of two 100 part by weight portions of a polysiloxane gum identical with that employed and described in Example 1 were added 40 parts by weight of highly-reinforcing, finely-divided silica, 1.2 parts by weight of dichlorobenzoyl peroxide, and 12 parts by weight of a monoethoxy-endblocked dimethylpolysiloxane oil (having a molecular weight of about 750 to about 850 and an average ethoxy content of about 12 percent by weight), while to one of these portions was added 1.0 part by weight of tetraisopropyl titanate. All additions were made during one compounding procedure conducted on a two-roll mill. The recipes of each of the formulations are listed below:

TABLE 2-1

| Formulation | A-2 | B-2 |
| --- | --- | --- |
| Parts Polysiloxane Gum | 100 | 100 |
| Parts Silica | 40 | 40 |
| Parts Dichlorobenzoyl Peroxide | 1.2 | 1.2 |
| Parts Ethoxy-Endblocked Dimethylpolysiloxane Oil | 12 | 12 |
| Parts Tetraisopropyl Titanate | 0 | 1.0 |

While the formulation of recipe A-2 (containing no titanium-containing compound) was a soft, putty-like material which readily fell apart when pulled under tension, the formulation of recipe B-2 (containing a titanium-containing compound) was characterized by increased hardness, "build" and elasticity, and could be easily stretched without tearing. These properties when present in an elastomer-curable organopolysiloxane formulation are collectively termed "green strength" by those skilled in the rubber-compounding art.

These formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation and tear resistance properties of each of the postcured specimens were determined and the results obtained are recorded below:

TABLE 2-2

| Formulation | A-2 | B-2 |
| --- | --- | --- |
| Hardness (Shore A) | 55 | 58 |
| Tensile Strength (p.s.i.) | 1,000 | 900 |
| Elongation (percent) | 380 | 350 |
| Tear Resistance (lb./inch) | 95 | 100 |

*Example 3*

An organopolysiloxane formulation was prepared by compounding the following ingredients on a two-roll mill:

(A) 100 parts by weight of a linear polysiloxane gum containing 12 percent by weight diphenylsiloxane units, 0.35 percent by weight ethylvinylsiloxane units, and 87.65 percent by weight dimethylsiloxane units:

(B) 40 parts by weight of highly-reinforcing, finely-divided silica;

(C) 2 parts by weight of iron oxide;

(D) 1.2 parts by weight of dichlorobenzoyl peroxide;

(E) 22 parts by weight of a monoethoxy-endblocked dimethylpolysiloxane oil (having a molecular weight of about 750 to about 850 and an average ethoxy content of about 12 percent by weight).

This formulation was soft, putty-like material which readily feel apart when the rolls of the mill were adjusted to a 25 mil nip setting and an attempt was made to calender it through the space provided. Tetraisopropyl titanate was then slowly added to this non-calenderable formulation in a dropwise manner. After 1.5 ml. of tetraisopropyl titanate had been added, the green strength of the formulation improved to such an extent that when the rolls of the mill were adjusted to a 15 mil nip setting, the formulation could be easily calendered into a sheet through the space provided. At this point the formulation was characterized by increased hardness, "build" and elasticity.

Example 4

To each of three 100 part by weight portions of a polysiloxance gum identical with that employed and described in Example I were added 40 parts by weight of highly-reinforcing, finely-divided silica, 2 parts by weight of iron oxide, 1.8 parts by weight of dichlorobenzoyl peroxide, and 12 parts by weight of a monoethoxy-endblocked dimethylpolysiloxane oil (having a molecular weight of about 750 to about 850 and an average ethoxy content of about 12 percent by weight), while to one of these portions was added 1.0 part by weight of tetraisopropyl titanate, and to another was added 1.5 parts by weight of tetraisopropyl titanate. All additions was made during one compounding procedure conducted on a two-roll mill. The recipes of each of the formulations are listed below:

TABLE 4-1

| Formulation | A-4 | B-4 | C-4 |
|---|---|---|---|
| Parts Polysiloxane Gum | 100 | 100 | 100 |
| Parts Silica | 40 | 40 | 40 |
| Parts Iron Oxide | 2 | 2 | 2 |
| Parts Dichlorobenzoyl Peroxide | 1.8 | 1.8 | 1.8 |
| Parts Ethoxy-Endblocked Dimethylpolysiloxane Oil | 12 | 12 | 12 |
| Parts Tetraisopropyl Titanate | 0 | 1.0 | 1.5 |

While the formulation of recipe A-4 (containing no titanium-containing compound) was a soft, putty-like material which readily fell apart when pulled under tension, the formulations of recipes B-4 and C-4 (containing a titanium-containing compound) were characterized by increased hardness, "build" and elasticity, and could be easily stretched without tearing. These properties when present in an elastomer-curable organopolysiloxane formulation are collectively termed "green strength" by those skilled in the rubber-compounding art.

As the concentration of tetraisopropyl titanate was increased in each of the above formulations, the hardness and "build" of such formulations also increased. These formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation and tear resistance properties of each of the postcured specimens were determined and the results obtained are recorded below:

TABLE 4-2

| Formulation | A-4 | B-4 | C-4 |
|---|---|---|---|
| Hardness (Shore A) | 55 | 61 | 60 |
| Tensile Strength (p.s.i.) | 870 | 760 | 700 |
| Elongation (percent) | 365 | 455 | 605 |
| Tear Resistance (lb./inch) | 89 | 87 | 76 |

Formulations corresponding to recipes A-4, B-4 and C-4 (but free from dichlorobenzoyl peroxide catalyst) were allowed to age for a period of one week. Following this aging period, 1.8 grams of dichlorobenzoyl peroxide were incorporated into each of said formulations by remilling said formulations on a two-roll mill. The remill time necessary to disperse the catalyst within said formulations was less than 5 seconds in each instance. The remilled, catalyst-containing formulations were then cured and postcured in the same manner as the corresponding non-aged formulations described above. The hardness, tensile strength, elongation and tear resistance properties of each of the resulting specimens were determined and the results obtained are recorded below:

TABLE 4-3

| Formulation | A-4 | B-4 | C-4 |
|---|---|---|---|
| Hardness (Shore A) | 55 | 62 | 63 |
| Tensile Strength (p.s.i.) | 970 | 915 | 810 |
| Elongation (percent) | 400 | 455 | 450 |
| Tear Resistance (lb./inch) | 87 | 94 | 97 |

It will be obvious from a comparison of Table 4-2 and Table 4-3 that the overall physical properties of the elastomers prepared from the formulations described tended to improve with aging, and that the incorporation of a titanium-containing compound into such formulations did not serve to inhibit the improvement in such physical properties.

Example 5

A hydroxy-endblocked dimethylpolysiloxane oil having an average of one hydroxyl group bonded to each of the terminal silicon atoms of the polysiloxane chains thereof was prepared by mixing predetermined amounts of the cyclic tetramer of dimethylsiloxane and water, and heating the resulting mixture in a sealed pressure vessel at a temperature of about 300° C. for about 14 hours to obtain a linear oil having an average molecular weight of about 1050 and an average hydroxyl content of about 3.2 percent by weight. Following this procedure, other similar hydroxy-endblocked dimethylpolysiloxane oils were prepared.

To each of two 100 part by weight portions of a polysiloxane gum identical with that described in Example 1 were added 40 parts by weight of highly-reinforcing, finely-divided silica, 1.2 parts by weight of dichlorobenzoyl peroxide, and 12 parts by weight of an above-prepared monohydroxy-endblocked dimethylpolysiloxane oil (having a molecular weight of about 1100 to about 1300 and a hydroxyl content of about 2.5 percent to about 3.5 percent by weight), while to one of these portions was added 1.0 part by weight of tetra-2-ethylhexyl titanate. All additions were made during one compounding procedure conducted on a two-roll mill. The recipes of each of the formulations are listed below:

TABLE 5-1

| Formulation | A-5 | B-5 |
|---|---|---|
| Parts Polysiloxane Gum | 100 | 100 |
| Parts Silica | 40 | 40 |
| Parts Dichlorobenzoyl Peroxide | 1.2 | 1.2 |
| Parts Hydroxy-Endblocked Dimethylpolysiloxane Oil | 12 | 12 |
| Parts Tetra-2-ethylhexyl Titanate | 0 | 1.0 |

While the formulation of recipe A-5 (containing no titanium-containing compound) was a soft, putty-like material which readily fell apart when pulled under tension, the formulation of recipe B-5 (containing a titanium-containing compound) was characterized by increased hardness, "build" and elasticity, and could be easily stretched without tearing. These properties when present in an elastomer-curable organopolysiloxane formulation are collectively termed "green strength" by those skilled in the rubber-compounding art.

These formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation and tear resistance properties of each of the postcured specimens were determined and the results obtained are recorded below:

TABLE 5-2

| Formulation | A-5 | B-5 |
|---|---|---|
| Hardness (Shore A) | 46 | 50 |
| Tensile Strength (p.s.i.) | 950 | 960 |
| Elongation (percent) | 380 | 350 |
| Tear Resistance (lb./inch) | 90 | 100 |

*Example 6*

To each of two 100 part by weight portions of a polysiloxane gum identical with that employed in Example 5 were added 40 parts by weight of highly-reinforcing finely-divided silica, 1.2 parts by weight of dichlorobenzoyl peroxide, and 12 parts by weight of a monohydroxy-endblocked dimethylpolysiloxane oil (having a molecular weight of about 1100 to about 1300 and a hydroxyl content of about 2.5 percent to about 3.5 percent by weight), while to one of these portions was added 1.0 part by weight of tetra-n-butyl titanate. All additions were made during one compounding procedure conducted on a two-roll mill. The recipes of each of the formulations are listed below:

TABLE 6-1

| Formulation | A-6 | B-6 |
|---|---|---|
| Parts Polysiloxane Gum | 100 | 100 |
| Parts Silica | 40 | 40 |
| Parts Dichlorobenzoyl Peroxide | 1.2 | 1.2 |
| Parts Hydroxy-Endblocked Dimethylpolysiloxane Oil | 12 | 12 |
| Parts Tetra-n-butyl Titanate | 0 | 1.0 |

While the formulation of recipe A-6 (containing no titanium-containing compound) was a soft, putty-like material which readily fell apart when pulled under tension, the formulation of recipe B-6 (containing a titanium-containing compound) was characterized by increased hardness, "build" and elasticity, and could be easily stretched without tearing. These properties when present in an elastomer-curable organo-polysiloxane formulation are collectively termed "green strength" by those skilled in the rubber-compounding art.

These formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation and tear resistance properties of each of the postcured specimens were determined and the results obtained are recorded below:

TABLE 6-2

| Formulation | A-6 | B-6 |
|---|---|---|
| Hardness (Shore A) | 47 | 50 |
| Tensile Strength (p.s.i.) | 950 | 975 |
| Elongation (percent) | 370 | 340 |
| Tear Resistance (lb./inch) | 95 | 100 |

*Example 7*

To each of two 100 part by weight portions of a polysiloxane gum identical with that employed in Example 5 were added 40 parts by weight of highly-reinforcing, finely-divided silica, 1.2 parts by weight of dichlorobenzoyl peroxide, and 12 parts by weight of a monohydroxy-endblocked dimethylpolysiloxane oil (having a molecular weight of about 1100 to about 1300 and a hydroxyl content of about 2.5 percent to about 3.5 percent by weight), while to one of these portions was added 1.0 part by weight of tetraisopropyl titanate. All additions were made during one compounding procedure conducted on a two-roll mill. The recipes of each of the formulations are listed below:

TABLE 7-1

| Formulation | A-7 | B-7 |
|---|---|---|
| Parts Polysiloxane Gum | 100 | 100 |
| Parts Silica | 40 | 40 |
| Parts Dichlorobenzoyl Peroxide | 1.2 | 1.2 |
| Parts Hydroxy-Endblocked Dimethylpolysiloxane Oil | 12 | 12 |
| Parts Tetraisopropyl Titanate | 0 | 1.0 |

While the formulations or recipe A-7 (containing no titanium-containing compound) was a soft, putty-like material which readily fell apart when pulled under tension, the formulation of recipe B-7 (containing a titanium-containing compound) was characterized by increased hardness, "build" and elasticity, and could be easily stretched without tearing. These properties when present in an elastomer-curable organo-polysiloxane formulation are collectively termed "green strength" by those skilled in the rubber-compounding art. These formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation and tear resistance properties of each of the postcured specimens were determined and the results obtained are recorded below:

TABLE 7-2

| Formulation | A-7 | B-7 |
|---|---|---|
| Hardness (Shore A) | 47 | 50 |
| Tensile Strength (p.s.i.) | 950 | 975 |
| Elongation (percent) | 370 | 340 |
| Tear Resistance (lb./inch) | 95 | 100 |

*Example 8*

A relatively soft ethoxy-endblocked linear polysiloxane gum containing 99.65 percent by weight dimethylsiloxane units and 0.35 percent by weight ethylvinylsiloxane units was prepared by mixing 29,800 grams of octamethylcyclotetrasiloxane with 4 grams of tetramethyldiethoxydisiloxane and 300 grams of a low molecular weight polysiloxane containing 28 percent by weight ethylvinylsiloxane units and 72 percent by weight dimethylsiloxane units with stirring to thoroughly mix the components; heating the mixture to a temperature of 145° C.; adding to the mixture a solution of potassium silanolate as catalyst in an amount sufficient to provide 30 parts of potassium ion per millon parts of the mixture; stirring the resulting mixture for 10 minutes, and then heating said mixture in a sealed pressure vessel at a temperature of 150° C. for one hour and forty-five minutes. After heating, the contents of the vessel were allowed to cool to room temperature. The linear polysiloxane gum obtained thereby had a hardness corresponding to a miniature penetrometer reading of 78 at room temperature.

An ethoxy-endblocked dimethylpolysiloxane oil having an average of one ethoxy group bonded to each of the terminal silicon atoms of the polysiloxane chains thereof was prepared by mixing 700 grams of dimethyldiethoxysilane and 2750 grams of a mixture of cyclic dimethylsiloxanes (including the cyclic trimer, tetramer and the like); heating the resulting mixture, with stirring, to a temperature of 80° C.; adding to the mixture 3.5 grams of tetramethyl ammonium hydroxide dispersed in 50 grams of a mixture of cyclic dimethylsiloxane (equivalent to a potassium ion concentration of 20 parts per million parts of the overall mixture); and heating the newly formed mixture at a temperature of 85° C. for two and one-half hours, and then at a temperature of 200° C. for three hours and twenty minutes. The mixture was allowed to cool to room temperature and was then filtered. The product obtained thereby comprised 3065 grams of a monoethoxy-endblocked dimethylpolysiloxane oil having an average molecular weight of about 820 and an average ethoxy content of about 10 percent by weight.

Following this procedure, other ethoxy-endblocked dimethylpolysiloxane oils varying in average molecular weight from about 700 to about 1200 and having an average ethoxy content of from about 8 to about 15 percent by weight were also prepared. In some instances, ethyltriethoxysilane was employed as the endblocking compound leading to the production of ethoxy-endblocked oils having an average of 1.5 ethoxy groups bonded to each of the terminal silicon atoms of the polysiloxane chains thereof.

A hydroxy-endblocked dimethylpolysiloxane oil having an average of one hydroxyl group bonded to each of the terminal silicon atoms of the polysiloxane chains thereof was prepared by mixing predetermined amounts of the cyclic tetramer of dimethylsiloxane and water, and heating the resulting mixture in a sealed pressure vessel at a temperature of about 300° C. for about 14 hours to obtain a linear oil having an average molecular weight of about 1050 and an average hydroxyl content of about 3.2 percent by weight. Following this procedure, other similar hydroxy-endblocked dimethylpolysiloxane oils were prepared.

To each of three 100 part by weight portions of the above-prepared polysiloxane gum were added 40 parts by weight of highly-reinforcing, finely-divided silica (sold commercially as "Cab-O-Sil"), 1.2 parts by weight of dichlorobenzoyl peroxide, 12 parts by weight of an above-prepared monoethoxy-endblocked dimethylpolysiloxane oil (having a molecular weight of about 750 to about 850 and an average ethoxy content of about 12 percent by weight), and 1 part by weight of diphenylsilanediol, while to each of two of these portions was added 0.5 part by weight of boric acid, and to one of the portions containing boric acid was added 1 part by weight of tetraisopropyl titanate. All additions were made during one compounding procedure conducted on a two-roll mill. The recipes of each of the formulations are listed below:

TABLE 8-1

| Formulation | A-8 | B-8 | C-8 |
| --- | --- | --- | --- |
| Parts Polysiloxane Gum | 100 | 100 | 100 |
| Parts Silica | 40 | 40 | 40 |
| Parts Dichlorobenzoyl Peroxide | 1.2 | 1.2 | 1.2 |
| Parts Ethoxy-Endblocked Dimethylpolysiloxane Oil | 12 | 12 | 12 |
| Parts Diphenylsilanediol | 1 | 1 | 1 |
| Parts Boric Acid | 0 | 0.5 | 0.5 |
| Parts Tetraisopropyl Titanate | 0 | 0 | 1 |

While the formulations or recipes A-8 and B-8 (containing no titanium-containing compound) were soft, putty-like materials which readily fell apart when pulled under tension, the formulation of recipe C-8 (containing a titanium-containing compound) was characterized by increased hardness, "build" and elasticity, and could be easily stretched without tearing. These properties when present in an elastomer-curable organopolysiloxane formulation are collectively termed "green strength" by those skilled in the rubber-compounding art.

Each of the above formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation and tear resistance properties of each of the postcured specimens were determined and the results obtained are recorded below:

TABLE 8-2

| Formulation | A-8 | B-8 | C-8 |
| --- | --- | --- | --- |
| Hardness (Shore A) | 31 | 46 | 45 |
| Tensile Strength (p.s.i.) | 1,160 | 815 | 800 |
| Elongation (percent) | 665 | 435 | 595 |
| Tear Resistance (lb./inch) | 66 | 67 | 54 |

The ruptured portions of the dumbbell-shaped specimens employed in the tensile strength determinations were then used to determine whether the elastomers prepared from such formulations were pressure-sensitive adhesive materials by superimposing the wider portions of the ruptured specimens to an extent of at least one-half inch and applying pressure by means of a force exerted by the thumb and forefinger of a human hand. The ruptured portions of the specimen prepared from a formulation of recipe A-8 (containing no boron-containing compound or titanium-containing compound) exhibited no tendency to adhere to each other. Nor could this specimen be made to adhere to other materials. The ruptured portions of the specimen prepared from a formulation of recipe B-8 (containing a boron-containing compound but no titanium-containing compound) exhibited a strong tendency to adhere to each other and to other materials. The ruptured portions of the specimen prepared from a formulation of recipe C-8 (containing a boron-containing compound and a titanium-containing compound) exhibited an even stronger tendency to adhere to each other and to other materials; this tendency was particularly noticeable when adhesion was effected between the ruptured portions of such specimen, or between such specimen and such materials as paper, steel, aluminum, tin, bronze and the like. Oftentimes the bond effected was so adhesive that the elastomer prepared from a formulation of recipe C-8 could not be separated without damage thereto. After standing for 24 hours or more, the specimen prepared from a formulation of recipe C-8 exhibited even better adhesive and cohesive characteristics.

*Example 9*

An organopolysiloxane formulation was prepared by compounding the following ingredients on a two-roll mill:

(A) 100 parts by weight of a linear polysiloxane gum containing 12 percent by weight diphenylsiloxane units, 0.35 percent by weight ethylvinylsiloxane units, and 87.65 percent by weight dimethylsiloxane units;

(B) 50 parts by weight of highly-reinforcing, finely-divided silica;

(C) 1.2 parts by weight of dichlorobenzoyl peroxide;

(D) 12 parts weight of a monohydroxy-endblocked dimethylpolysiloxane oil (having a molecular weight of about 1100 to about 1300 and a hydroxyl content of about 2.5 percent to about 3.5 percent by weight);

(E) 1 part by weight of diphenyldiethoxysilane;

(F) 0.5 part by weight of boric acid; and (G) 0.5 part by weight of tetraisopropyl titanate.

This formulation was characterized by good "green strength" properties and could be easily stretched without tearing. This formulation was cured to an elastomer by heating in a mold at a temperature of 250° F. for a period of 15 minutes. The elastomer was subsequently postcured by heating at a temperature of 480° F. for a period of 24 hours. The elastomer obtained exhibited a strong tendency to adhere to itself and to other materials, including paper, steel, aluminum, tin, bronze and the like. Oftentimes the bond effected was so adhesive that the elastomer could not be separated without damage thereto. After standing for 24 hours or more, the elastomer exhibited even better adhesive and cohesive characteristics.

Example 10

An organopolysiloxane formulation was prepared by compounding the following ingredients on a two-roll mill:

(A) 100 parts by weight of a linear polysiloxane gum containing 99.65 percent by weight dimethylsiloxane units and 0.35 percent by weight ethylvinylsiloxane units;

(B) 40 parts by weight of carbon black;

(C) 8 parts by weight of highly-reinforcing, finely-divided silica;

(D) 2 parts by weight of dicumyl peroxide;

(E) 3 parts by weight of monoethoxy-endblocked dimethylpolysiloxane oil (having a molecular weight of about 750 to about 850 and an average ethoxy content of about 12 percent by weight);

(F) 3 parts by weight of monohydroxy-endblocked dimethylpolysiloxane oil (having a molecular weight of about 1100 to about 1300 and a hydroxyl content of about 2.5 percent to about 3.5 percent by weight); and (G) 0.5 part by weight of boric acid.

This formulation was a soft, putty-like material which readily fell apart when pulled under tension. When one part by weight of tetraisopropyl titanate was added to the formulation, a material characterized by good "green strength" properties was obtained. This material could be easily stretched when pulled under tension without tearing.

The formulation thus obtained was cured to an elastomer by heating in a mold at a temperature of 250° F. for a period of 20 minutes. The elastomer was subsequently post-cured by heating at a temperature of 480° F. for a period of 24 hours. The elastomer obtained was a conductive material which exhibited a very strong tendency to adhere to itself and to other materials including paper, steel, aluminum, tin, bronze and the like. Oftentimes the bond effected was so adhesive that the elastomer could not be separated without damage thereto. After standing for 24 hours or more, the elastomer exhibited even better adhesive and cohesive characteristics.

Example 11

To each of seven 100 part by weight portions of the polysiloxane gum prepared in Example 8 above were added 40 parts by weight of highly-reinforcing, finely-divided silica (sold commercially as "Cab-O-Sil"), 1.8 parts by weight of dichlorobenzoyl peroxide, and 12 parts by weight of an above-prepared monoethoxy-endblocked dimethylpolysiloxane oil (having a molecular weight of about 750 to about 850 and an average ethoxy content of about 12 percent by weight), while to each of six of these portions was added 0.5 part by weight of boric acid, and to each of five of the portions containing boric acid was added 1 to 3 parts by weight of tetra-2-ethyl-hexyl titanate, and to one of the portions containing tetra-2-ethylhexyl titanate was added 1 part by weight of diphenyldiethoxysilane while to another was added 1 part by weight of ethyltriethoxysilane. All additions were made during one compounding procedure conducted on a two-roll mill. The recipes of each of the formulations are listed below:

TABLE 11-1

| Formulation | A-11 | B-11 | C-11 | D-11 | E-11 | F-11 | G-11 |
|---|---|---|---|---|---|---|---|
| Parts Polysiloxane Gum | 100 | 100 | 100 | 100 | 100 | 100 | 100 |
| Parts Silica | 40 | 40 | 40 | 40 | 40 | 40 | 40 |
| Parts Dichlorobenzoyl Peroxide | 1.8 | 1.8 | 1.8 | 1.8 | 1.8 | 1.8 | 1.8 |
| Parts Ethoxy-Endblocked Dimethylpolysiloxane Oil | 12 | 12 | 12 | 12 | 12 | 12 | 12 |
| Parts Boric Acid | 0 | 0.5 | 0.5 | 0.5 | 0.5 | 0.5 | 0.5 |
| Parts Tetra-2-ethylhexyl Titanate | 0 | 0 | 1.0 | 2.0 | 3.0 | 3.0 | 3.0 |
| Parts Diphenyldiethoxysilane | 0 | 0 | 0 | 0 | 0 | 1.0 | 0 |
| Parts Ethyltriethoxysilane | 0 | 0 | 0 | 0 | 0 | 0 | 1.0 |

While the formulations of recipes A-11 and B-11 (containing no titanium-containing compound) were soft, putty-like materials which readily fell apart when pulled under tension, the formulations of recipes C-11, D-11, E-11, F-11, and G-11 (containing a titanium-containing compound) were characterized by increased hardness, "build" and elasticity, and could be easily stretched without tearing. These properties when present in an elastomer-curable organopolysiloxane formulation are collectively termed "green strength" by those skilled in the rubber-compounding art.

As the concentration of tetra-2-ethylhexyl titanate was increased in each of the above formulations, the hardness and "build" of such formulations also increased. These formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation, and tear resistance properties of each of the postcured specimens were determined and the results obtained are recorded below:

TABLE 11-2

| Formulation | A-11 | B-11 | C-11 | D-11 | E-11 | F-11 | G-11 |
|---|---|---|---|---|---|---|---|
| Hardness (Shore A) | 52 | 63 | 58 | 52 | 54 | 63 | 68 |
| Tensile Strength (p.s.i.) | 1,000 | 890 | 930 | 700 | 700 | 650 | 600 |
| Elongation (percent) | 400 | 345 | 300 | 305 | 330 | 275 | 225 |
| Tear Resistance (lb./inch) | 95 | 69 | 112 | 87 | 90 | 87 | 85 |

The ruptured portions of the dumbbell-shaped specimens employed in the tensile strength determinations were then used to determine whether the elastomers prepared from such formulations were pressure-sensitive adhesive materials by superimposing the wider portions of the ruptured specimens to an extent of at least one-half inch and applying pressure by means of a force exerted by the thumb and forefinger of a human hand. The ruptured portions of the specimen prepared from a formulation of recipe A-11 (containing no boron-containing compound or titanium-containing compound) exhibited no tendency to adhere to each other. Nor could this specimen be made to adhere to other materials. The ruptured portions of the specimen prepared from a formulation of recipe B-11 (containing a boron-containing compound but no titanium-containing compound) exhibited a strong tendency to adhere to each other and to other materials. The ruptured portions of the specimens prepared from formulations of recipes C-11, D-11, E-11, F-11, and G-11 (containing a boron-containing compound and a titanium-containing compound) exhibited an even stronger tendency to adhere to each other and to other materials; this tendency was particularly noticeable when adhesion was effected between the ruptured portions of such specimens, or between such specimens and such materials as paper, steel, aluminum, tin, bronze and the like. Oftentimes the bond effected was so adhesive that the elastomers prepared from formulations of recipes C-11, D-11, E-11, F-11, and G-11 could not be separated without damage thereto. After standing for 24 hours or more, the specimens prepared from formulations of recipes C-11, D-11, E-11, F-11, and G-11 exhibited even better adhesive and cohesive characteristics.

*Example 12*

To each of eight 100 part by weight portions of a polysiloxane gum identical with that employed in Example 11 were added 40 parts by weight of highly-reinforcing, finely-divided silica (sold commercially as "Cab-O-Sil"), 1.2 parts by weight of dichlorobenzoyl peroxide, and 12 parts by weight of a monoethoxy-endblocked dimethylpolysiloxane oil (having a molecular weight of about 750 to about 850 and an average ethoxy content of about 12 percent by weight), while to each of six of these portions was added 0.5 part by weight of boric acid, and to each of five of the portions containing boric acid was added 1 to 3 parts by weight of tetra-n-butyl titanate, and to one of the portions containing tetra-n-butyl titanate was added 1 part by weight of diphenyldiethoxysilane while to another was added 1 part by weight of ethyltriethoxysilane. All additions were made during one compounding procedure conducted on a two-roll mill. The recipes of each of the formulations are listed below:

The ruptured portions of the dumbbell-shaped specimens employed in the tensile strength determinations were then used to determine whether the elastomers prepared from such formulations were pressure-sensitive adhesive materials by superimposing the wider portions of the ruptured specimens to an extent of at least one-half inch and applying pressure by means of a force exerted by the thumb and forefinger of a human hand. The ruptured portions of the specimens prepared from formulations of recipes A-12 and B-12 (containing no boron-containing compound or titanium-containing compound) exhibited no tendency to adhere to each other. Nor could such specimens be made to adhere to other materials. The ruptured portions of the specimen prepared from a formulation of recipe C-12 (cotaining a boron-containing compound but no titanium-containing compound) exhibited a strong tendency to adhere to each other and to other materials. The ruptured portions of the specimens prepared from formulations of recipes D-12, E-12, F-12, G-12, and H-12 (containing a boron-containing compound and a titanium-containing compound) exhibited an even stronger tendency to adhere to each other and to other materials; this tendency was particularly noticeable when adhesion was effected between the ruptured portions of such specimens, or between such specimens and such materials as paper, steel, aluminum, tin, bronze, and the like. Oftentimes the bond

TABLE 12-1

| Formulation | A-12 | B-12 | C-12 | D-12 | E-12 | F-12 | G-12 | H-12 |
|---|---|---|---|---|---|---|---|---|
| Parts Polysiloxane Gum | 100 | 100 | 100 | 100 | 100 | 100 | 100 | 100 |
| Parts Silica | 40 | 40 | 40 | 40 | 40 | 40 | 40 | 40 |
| Parts Dichlorobenzoyl Peroxide | 1.2 | 1.2 | 1.2 | 1.2 | 1.2 | 1.2 | 1.2 | 1.2 |
| Parts Ethoxy-Endblocked Dimethylpolysiloxane Oil | 12 | 12 | 12 | 12 | 12 | 12 | 12 | 12 |
| Parts Boric Acid | 0 | 0 | 0.5 | 0.5 | 0.5 | 0.5 | 0.5 | 0.5 |
| Parts Tetra-n-butyl Titanate | 0 | 0 | 0 | 1.0 | 2.0 | 3.0 | 3.0 | 3.0 |
| Parts Diphenyldiethoxysilane | 0 | 0 | 0 | 0 | 0 | 0 | 1.0 | 0 |
| Parts Ethyltriethoxysilane | 0 | 0 | 0 | 0 | 0 | 0 | 0 | 1.0 |

While the formulations of recipes A-12, B-12, and C-12 (containing no titanium-containing compound) were soft, putty-like materials which readily fell apart when pulled under tension, the formulations of recipes D-12, E-12, F-12, and G-12 and H-12 (containing a titanium containing compound) were characterized by increased hardness, "build" and elasticity, and could be easily stretched without tearing. These properties when present in an elastomer-curable organopolysiloxane formulation are collectively termed "green strength" by those skilled in the rubber-compounding art.

As the concentration of tetra-n-butyl titanate was increased in each of the above formulations, the hardness and "build" of such formulations also increased. These formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation and tear resistance properties of each of the postcured specimens were determined and the results obtained are recorded below:

effected was so adhesive that the elastomers prepared from formulations of recipes D-12, E-12, F-12, G-12, and H-12 could not be separated without damage thereto. After standing for 24 hours or more, the specimens prepared from formulations of recipes D-12, E-12, F-12, G-12, and H-12 exhibited even better adhesive and cohesive characteristics.

*Example 13*

To each of seven 100 part by weight portions of a polysiloxane gum identical with that employed in Example 11 were added 40 parts by weight of highly-reinforcing, finely-divided silica (sold commercially as "Cab-O-Sil"), 1.2 parts by weight of dichlorobenzoyl peroxide, and 12 parts by weight of a monoethoxy-endblocked dimethylpolysiloxane oil (having a molecular weight of about 750 to about 850 and an average ethoxy content of about 12 percent by weight), while to each of six of these portions was added 0.5 part by weight of boric acid, and

TABLE 12-2

| Formulation | A-12 | B-12 | C-12 | D-12 | E-12 | F-12 | G-12 | H-12 |
|---|---|---|---|---|---|---|---|---|
| Hardness (Shore A) | 55 | 58 | 63 | 63 | 64 | 74 | 60 | 72 |
| Tensile Strength (p.s.i.) | 1,000 | 900 | 890 | 750 | 650 | 745 | 725 | 550 |
| Elongation (percent) | 385 | 320 | 345 | 255 | 240 | 255 | 320 | 210 |
| Tear Resistance (lb./inch) | 95 | 100 | 69 | 113 | 80 | 85 | 80 | 80 | to each of five of the portions containing boric acid was added 1 to 3 parts by weight of tetraisopropyl titanate, and to one of the portions containing tetraisopropyl titanate was added 1 part by weight of diphenyldiethoxysilane while to another was added 1 part by weight of ethyltriethoxysilane. All additions were made during one compounding procedure conducted on a two-roll mill. The recipes of each of the formulations are listed below:

portions of the specimen prepared from a formulation of recipe A-13 (containing no boron-containing compound or titanium-containing compound) exhibited no tendency to adhere to each other. Nor could this specimen be made to adhere to other materials. The ruptured portions of the specimen prepared from a formulation of recipe B-13 (containing a boron-containing compound but no titanium-containing compound) exhibited a strong

TABLE 13-1

| Formulation | A-13 | B-13 | C-13 | D-13 | E-13 | F-13 | G-13 |
|---|---|---|---|---|---|---|---|
| Parts Polysiloxane Gum | 100 | 100 | 100 | 100 | 100 | 100 | 100 |
| Parts Silica | 40 | 40 | 40 | 40 | 40 | 40 | 40 |
| Parts Dichlorobenzoyl Peroxide | 1.2 | 1.2 | 1.2 | 1.2 | 1.2 | 1.2 | 1.2 |
| Parts Ethoxy-Endblocked Dimethylpolysiloxane Oil | 12 | 12 | 12 | 12 | 12 | 12 | 12 |
| Parts Boric Acid | 0 | 0.5 | 0.5 | 0.5 | 0.5 | 0.5 | 0.5 |
| Parts Tetraisopropyl Titanate | 0 | 0 | 1.0 | 2.0 | 3.0 | 3.0 | 3.0 |
| Parts Diphenyl-Diethoxysilane | 0 | 0 | 0 | 0 | 0 | 1.0 | 0 |
| Parts Ethyltriethoxysilane | 0 | 0 | 0 | 0 | 0 | 0 | 1.0 |

While the formulations of recipes A-13 and B-13 (containing no titanium-containing compound) were soft, putty-like materials which readily fell apart when pulled under tension, the formulations of recipes C-13, D-13, E-13, F-13, and G-13 (containing a titanium-containing compound) were characterized by increased hardness, "build" and elasticity, and could be easily stretched without tearing. These properties when present in an elastomer-curable organopolysiloxane formulation are collectively termed "green strength" by those skilled in the rubber-compounding art.

As the concentration of tetraisopropyl titanate was increased in each of the above formulations, the hardness and "build" of such formulations also increased. These formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation and tear resistance properties of each of the postcured specimens were determined and the results obtained are recorded below:

tendency to adhere to each other and to other materials. The ruptured portions of the specimens prepared from formulations of recipes C-13, D-13, E-13, F-13, and G-13 (containing a boron-containing compound and a titanium-containing compound) exhibited an even stronger tendency to adhere to each other and to other materials; this tendency was particularly noticeable when adhesion was effected between the ruptured portions of such specimens, or between such specimens and such materials as paper, steel, aluminum, tin, bronze, and the like. Oftentimes the bond effected was so adhesive that the elastomers (prepared from formulations of recipes C-13, D-13, E-13, F-13, and G-13) could not be separated without damage thereto. After standing for 24 hours or more, the specimens prepared from formulations of recipes C-13, D-13, E-13, F-13, and G-13 exhibited even better adhesive and cohesive characteristics.

*Example 14*

To each of eleven 100 parts by weight portions of the polysiloxane gum prepared in Example 8 were added 40 parts by weight of highly-reinforcing, finely-divided

TABLE 13-2

| Formulation | A-13 | B-13 | C-13 | D-13 | E-13 | F-13 | G-13 |
|---|---|---|---|---|---|---|---|
| Hardness (Shore A) | 55 | 63 | 62 | 68 | 73 | 70 | 72 |
| Tensile Strength (p.s.i.) | 1,000 | 890 | 775 | 600 | 500 | 600 | 500 |
| Elongation (percent) | 380 | 345 | 250 | 225 | 210 | 210 | 175 |
| Tear Resistance (lb./inch) | 95 | 69 | 102 | 110 | 70 | 85 | 70 |

The ruptured portions of the dumbell-shaped specimens employed in the tensile strength determinations were then used to determine whether the elastomers prepared from such formulations were pressure-sensitive adhesive materials by superimposing the wider portions of the ruptured specimens to an extent of at least one-half inch and applying pressure by means of a force exerted by the thumb and forefinger of a human hand. The ruptured silica (sold commercially as "Cab-O-Sil"), 1.2 parts by weight of dichlorobenzoyl peroxide, and 12 parts by weight of an above-prepared monohydroxy-endblocked dimethylpolysiloxane oil (having a molecular weight of about 1100 to about 1300 and a hydroxyl content of about 2.5 percent to about 3.5 percent by weight), while to each of ten of these portions was added 0.5 to 1 part by weight of boric acid, and to each of nine of the portions containing boric acid was added 1 to 3 parts by weight of tetra-2-ethylhexyltitanate. All additions were made during one compounding procedure conducted on a two-roll mill. The recipes of each of the formulations are listed below:

tomers prepared from formulations of recipes C-14, D-14, E-14, F-14, G-14, H-14, I-14, J-14, and K-14 could not be separated without damage thereto. After standing for 24 hours or more, the specimens prepared

TABLE 14-1

| Formulation | A-14 | B-14 | C-14 | D-14 | E-14 | F-14 | G-14 | H-14 | I-14 | J-14 | K-14 |
|---|---|---|---|---|---|---|---|---|---|---|---|
| Parts Polysiloxane Gum | 100 | 100 | 100 | 100 | 100 | 100 | 100 | 100 | 100 | 100 | 100 |
| Parts Silica | 40 | 40 | 40 | 40 | 40 | 40 | 40 | 40 | 40 | 40 | 40 |
| Parts Dichlorobenzoyl | 1.2 | 1.2 | 1.2 | 1.2 | 1.2 | 1.2 | 1.2 | 1.2 | 1.2 | 1.2 | 1.2 |
| Parts Hydroxy-Endblocked Dimethylpolysiloxane Oil | 12 | 12 | 12 | 12 | 12 | 12 | 12 | 12 | 12 | 12 | 12 |
| Parts Boric Acid | 0 | 0.5 | 0.5 | 0.5 | 0.5 | 0.75 | 0.75 | 0.75 | 1.0 | 1.0 | 1.0 |
| Parts Tetra-2-ethylhexyl Titanate | 0 | 0 | 1.0 | 2.0 | 3.0 | 1.0 | 2.0 | 3.0 | 1.0 | 2.0 | 3.0 |

While the formulations of recipes A-14 and B-14 (containing no titanium-containing compound) were soft, putty-like materials which readily fell apart when pulled under tension, the formulations of recipes C-14, D-14, E-14, F-14, G-14, H-14, I-14, J-14, and K-14 (containing a titanium-containing compound) were characterized by increased hardness, "build" and elasticity, and could be easily stretched without tearing. These properties when present in an elastomer-curable organopolysiloxane formulation are collectively termed "green strength" by those skilled in the rubber-compounding art.

As the concentration of tetra-2-ethylhexyl titanate was increased in each of the above formulations, the hardness and "build" of such formulations also increased. These formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation and tear resistance properties of each of the postcured specimens were determined and the results obtained are recorded below:

from formulations of recipes C-14, D-14, E-14, F-14, G-14, H-14, I-14, J-14, and K-14 exhibited even better adhesive and cohesive characteristics.

Example 15

To each of five 100 part by weight portions of a polysiloxane gum identical with that employed in Example 14 were added 40 parts by weight of highly-reinforcing, finely-divided silica (sold commercially as "Cab-O-Sil"), 1.2 parts by weight of dichlorobenzoyl peroxide, and 12 parts by weight of a monohydroxy-endblocked dimethylpolysiloxane oil (having a molecular weight of about 1100 to about 1300 and a hydroxyl content of about 2.5 percent to about 3.5 percent by weight), while to each of four of these portions was added 0.5 to 1 part by weight of boric acid, and to each of three of the portions containing boric acid was added 1 to 3 parts by weight of tetra-n-butyl titanate. All additions were made during one compounding procedure conducted on a two-

TABLE 14-2

| Formulation | A-14 | B-14 | C-14 | D-14 | E-14 | F-14 | G-14 | H-14 | I-14 | J-14 | K-14 |
|---|---|---|---|---|---|---|---|---|---|---|---|
| Hardness (Shore A) | 46 | 60 | 51 | 57 | 58 | 58 | 60 | 58 | 63 | 65 | 63 |
| Tensile Strength (p.s.i.) | 950 | 900 | 700 | 500 | 510 | 675 | 620 | 585 | 675 | 600 | 575 |
| Elongation (Percent) | 380 | 300 | 300 | 230 | 240 | 250 | 230 | 250 | 220 | 190 | 185 |
| Tear Resistance (lb./inch) | 90 | 102 | 82 | 70 | 65 | 95 | 105 | 82 | 94 | 80 | 80 |

The ruptured portions of the dumbbell-shaped specimens employed in the tensile strength determinations were then used to determine whether the elastomers prepared from such formulations were pressure-sensitive adhesive materials by superimposing the wider portions of the ruptured specimens to an extent of at least one-half inch and applying pressure by means of a force exerted by the thumb and forefinger of a human hand. The ruptured portions of the specimen prepared from a formulation of recipe A-14 (containing no boron-containing compound or titanium-containing compound) exhibited no tendency to adhere to each other. Nor could this specimen be made to adhere to other materials. The ruptured portions of the specimen prepared from a formulation of recipe B-14 (containing a boron-containing compound but no titanium-containing compound) exhibited a strong tendency to adhere to each other and to other materials. The ruptured portions of the specimens prepared from formulations of recipes C-14, D-14, E-14, F-14, G-14, H-14, I-14, J-14, and K-14 (containing a boron-containing compound and a titanium-containing compound) exhibited an even stronger tendency to adhere to each other and to other materials; this tendency was particularly noticeable when adhesion was effected between the ruptured portions of such specimens, or between such specimens and such materials as paper, steel, aluminum, tin, bronze, and the like. Oftentimes the bond effected was so adhesive that the elasroll mill. The recipes of each of the formulations are listed below:

TABLE 15-1

| Formulation | A-15 | B-15 | C-15 | D-15 | E-15 |
|---|---|---|---|---|---|
| Parts Polysiloxane Gum | 100 | 100 | 100 | 100 | 100 |
| Parts Silica | 40 | 40 | 40 | 40 | 40 |
| Parts Dichlorobenzoyl Peroxide | 1.2 | 1.2 | 1.2 | 1.2 | 1.2 |
| Parts Hydroxy-Endblocked Dimethylpolysiloxane Oil | 12 | 12 | 12 | 12 | 12 |
| Parts Boric Acid | 0 | 0.5 | 0.5 | 0.75 | 1.0 |
| Parts Tetra-n-butyl Titanate | 0 | 0 | 1.0 | 2.0 | 3.0 |

While the formulations of recipes A-15 and B-15 (containing no titanium-containing compound) were soft, putty-like materials which readily fell apart when pulled under tension, the formulations of recipes C-15, D-15, and E-15 (containing a titanium-containing compound) were characterized by increased hardness, "build" and elasticity, and could be easily stretched without tearing. These properties when present in an elastomer-curable organopolysiloxane formulation are collectively termed "green strength" by those skilled in the rubber-compound art.

As the concentration of tetra-n-butyl titanate was increased in each of the above formulations, the hardness and "build" of such formulations also increased. These formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation and tear resistance properties of each of the post-cured specimens were determined and the results obtained are recorded below:

weight of boric acid, and to each of nine of the portions containing boric acid was added 1 to 3 parts by weight of tetraisopropyl titanate. All additions were made during one compounding procedure conducted on a two-roll mill. The recipes of each of the formulations are listed below:

TABLE 16-1

| Formulation | A-16 | B-16 | C-16 | D-16 | E-16 | F-16 | G-16 | H-16 | I-16 | J-16 | K-16 |
|---|---|---|---|---|---|---|---|---|---|---|---|
| Parts Polysiloxane Gum | 100 | 100 | 100 | 100 | 100 | 100 | 100 | 100 | 100 | 100 | 100 |
| Parts Silica | 40 | 40 | 40 | 40 | 40 | 40 | 40 | 40 | 40 | 40 | 40 |
| Parts Dichlorobenzoyl Peroxide | 1.2 | 1.2 | 1.2 | 1.2 | 1.2 | 1.2 | 1.2 | 1.2 | 1.2 | 1.2 | 1.2 |
| Parts Hydroxy-Endblocked Dimethylpolysiloxane Oil | 12 | 12 | 12 | 12 | 12 | 12 | 12 | 12 | 12 | 12 | 12 |
| Parts Boric Acid | 0 | 0.5 | 0.5 | 0.5 | 0.5 | 0.75 | 0.75 | 0.75 | 0.75 | 1 | 1 |
| Parts Tetraisopropyl titanate | 0 | 1 | 1 | 2 | 3 | 1 | 2 | 3 | 3 | 1 | 2 |

TABLE 15-2

| Formulation | A-15 | B-15 | C-15 | D-15 | E-15 |
|---|---|---|---|---|---|
| Hardness (Shore A) | 47 | 60 | 53 | 58 | 67 |
| Tensile Strength (p.s.i.) | 950 | 900 | 700 | 750 | 620 |
| Elongation (percent) | 370 | 300 | 300 | 330 | 250 |
| Tear Resistance (lb./inch) | 95 | 102 | 82 | 92 | 88 |

The ruptured portions of the dumbbell-shaped specimens employed in the tensile strength determinations were then used to determine whether the elastomers prepared from such formulations were pressure-sensitive adhesive materials by super-imposing the wider portions of the ruptured specimens to an extent of at least one-half inch and applying pressure by means of a force exerted by the thumb and forefinger of a human hand. The ruptured portions of the specimen prepared from a formulation of recipe A-15 (containing no boron-containing compound or titanium-containing compound) exhibited no tendency to adhere to each other. Nor could this specimen be made to adhere to other materials. The ruptured portions of the specimen prepared from formulations of recipes C-15, D-15 and E-15 (containing a boron-containing compound and a titanium-containing compound) exhibited an even stronger tendency to adhere to each other and to other materials; this tendency was particularly noticeable when adhesion was effected between the ruptured portions of such specimens, or between such specimens and such materials as paper, steel, aluminum, tin, bronze, and the like. Oftentimes the bond effected was so adhesive that the elastomers (prepared from formulations of recipes C-15, D-15, and E-15) could not be separated without damage thereto. After standing for 24 hours or more, the specimens prepared from formulations of recipes C-15, D-15, and E-15 exhibited even better adhesive and cohesive characteristics.

*Example 16*

To each of eleven 100 part by weight portions of a polysiloxane gum identical with that employed in Example 14 were added 40 parts by weight of highly-reinforcing, finely-divided silica (sold commercially as "Cab-O-Sil"), 1.2 parts by weight of dichlorobenzoyl peroxide, and 12 parts by weight of a monohydroxy-endblocked dimethylpolysiloxane oil (having a molecular weight of about 1100 to about 1300 and a hydroxyl content of about 2.5 percent to about 3.5 percent by weight) while to each of ten of these portions was added 0.5 to 1 part by While the formulations of recipes A-16 and B-16 (containing no titanium-containing compound) were soft, putty-like materials which readily fell apart when pulled under tension, the formulations of recipes C-16, D-16, E-16, F-16, G-16, H-16, I-16, J-16, and K-16 (containing a titanium-containing compound (were characterized by increased hardness, "build" and elasticity, and could be easily stretched without tearing. These properties when present in an elastomer-curable organopolysiloxane formulation are collectively termed "green strength" by those skilled in the rubber-compounding art.

As the concentration of tetraisopropyl titanate was increased in each of the above formulations, the hardness and "build" of such formulations also increased. These formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation and tear resistance properties of each of the postcured specimens were determined and the results obtained were recorded below:

TABLE 16-2

| Formulation | A-16 | B-16 | C-16 | D-16 | E-16 | F-16 | G-16 | H-16 | I-16 | J-16 | K-16 |
|---|---|---|---|---|---|---|---|---|---|---|---|
| Hardness (Shore A) | 47 | 60 | 55 | 60 | 67 | 57 | 62 | 65 | 67 | 58 | 64 |
| Tensile Strength (p.s.i.) | 950 | 900 | 770 | 500 | 450 | 890 | 675 | 460 | 400 | 770 | 700 |
| Elongation (percent) | 370 | 300 | 290 | 210 | 180 | 310 | 295 | 245 | 220 | 290 | 270 |
| Tear Resistance (lb./inch) | 95 | 102 | 86 | 72 | 60 | 96 | 93 | 80 | 86 | 89 | 60 |

The ruptured portions of the dumbbell-shaped specimens employed in the tensile strength determinations were then used to determine whether the elastomers prepared from such formulations were pressure-sensitive adhesive materials by superimposing the wider portions of the ruptured specimens to an extent of at least one-half inch and applying pressure by means of a force exerted by the thumb and forefinger of a human hand. The ruptured portions of the specimen prepared from a formulation of recipe A-16 (containing no boron-containing compound or titanium-containing compound) exhibited no tendency to adhere to each other. Nor could this specimen be made to adhere to other materials. The ruptured portions of the specimen prepared from a formulation of recipe B-16 (containing a boron-containing compound but no titanium-containing compound) exhibited a strong tendency to adhere to each other and to other materials. The ruptured portions of the specimens prepared from formulations of recipes C-16, D-16, E-16, F-16, G-16, H-16, I-16, J-16, and K-16 (containing a boron-containing compound and titanium-containing compound) exhibited an even stronger tendency to adhere to each other and to other materials; this tendency was particularly noticeable when adhesion was effected between the ruptured portions of such specimens, or between such specimens and such materials as paper, steel, aluminum, tin, bronze, and the like. Oftentimes the bond effected was so adhesive that the elastomers prepared from formulations of recipes C-16, D-16, E-16, F-16, G-16, H-16, I-16, J-16, and K-16 could not be separated without damage thereto. After standing for 24 hours or more, the specimens prepared from formulations of recipes C-16, D-16, E-16, F-16, G-16, H-16, I-16, J-16, and K-16 exhibited even better adhesive and cohesive characteristics.

*Example 17*

To each of six 100 part by weight portions of a polysiloxane gum identical with that employed in Example 14 were added 40 parts by weight of highly-reinforcing, finely-divided silica (sold commercially as "Cab-O-Sil"), 1.2 parts by weight of dichlorobenzoyl peroxide, and 12 parts by weight of a monohydroxy-endblocked dimethylpolysiloxane oil (having a molecular weight of about 1100 to about 1300 and a hydroxyl content of about 2.5 percent to about 3.5 percent by weight), while to each of three of these portions was added 0.5 part by weight of boric acid, and to each of two of the portions free from boric acid was added 1 and 5 parts by weight of diphenylsilanediol respectively, and to one of the portions containing boric acid was added 1 part by weight diphenylsilanediol while to another were added 1 part by weight of diphenylsilanediol and 1 part by weight of tetraisopropyl titanate. All additions were made during one compounding procedure conducted on a two-roll mill. The recipes of each of the formulations are listed below:

TABLE 17-1

| Formulation | A-17 | B-17 | C-17 | D-17 | E-17 | F-17 |
|---|---|---|---|---|---|---|
| Parts Polysiloxane Gum | 100 | 100 | 100 | 100 | 100 | 100 |
| Parts Silica | 40 | 40 | 40 | 40 | 40 | 40 |
| Parts Dichlorobenzoyl Peroxide | 1.2 | 1.2 | 1.2 | 1.2 | 1.2 | 1.2 |
| Parts Hydroxy-Endblocked Dimethylpolysiloxane Oil | 12 | 12 | 12 | 12 | 12 | 12 |
| Parts Boric Acid | 0 | 0.5 | 0 | 0 | 0.5 | 0.5 |
| Parts Diphenyl silanediol | 0 | 0 | 1 | 5 | 1 | 1 |
| Parts Tetraisopropyl Titanate | 0 | 0 | 0 | 0 | 0 | 1 |

While the formulations of recipes A-17, B-17, C-17, D-17, and E-17 (containing no titanium-containing compound) were soft, putty-like materials which readily fell apart when pulled under tension, the formulation of recipe F-17 (containing a titanium-containing compound) was characterized by increased hardness, "build" and elasticity, and could be easily stretched without tearing. These properties when present in an elastomer-curable organopolysiloxane formulation are collectively termed "green strength" by those skilled in the rubber-compounding art.

Each of the above formulations were cured to elastomers by heating in a mold at a temperature of 250° F. for a period of 15 minutes. The elastomers were subsequently postcured by heating at a temperature of 480° F. for a period of 24 hours. The hardness, tensile strength, elongation, and tear resistance properties of each of the postcured specimens were determined and the results obtained are recorded below:

TABLE 17-2

| Formulation | A-17 | B-17 | C-17 | D-17 | E-17 | F-17 |
|---|---|---|---|---|---|---|
| Hardness (Shore A) | 52 | 60 | 47 | 39 | 63 | 56 |
| Tensile Strength (p.s.i.) | 860 | 900 | 755 | 540 | 660 | 610 |
| Elongation (percent) | 650 | 300 | 690 | 725 | 375 | 445 |
| Tear Resistance (lb./inch) | 73 | 102 | 73 | 60 | 69 | 105 |

The ruptured portions of the dumbbell-shaped specimens employed in the tensile strength determinations were then used to determine whether the elastomers prepared from such formulations were pressure-sensitive adhesive materials by superimposing the wider portions of the ruptured specimens to an extent of at least one-half inch and applying pressure by means of a force exerted by the thumb and forefinger of a human hand. The ruptured portions of the specimens prepared from formulations of recipes A-17, C-17, and D-17 (containing no boron-containing compound or titanium-containing compound) exhibited no tendency to adhere to each other. Nor could these specimens be made to adhere to other materials. The ruptured portions of the specimens prepared from the formulations of recipes B-17 and E-17 (containing a boron-containing compound but no titanium-containing compound) exhibited a strong tendency to adhere to each other and to other materials. The ruptured portions of the specimen prepared from a formulation of recipe F-17 (containing a boron-containing compound and a titanium-containing compound) exhibited an even stronger tendency to adhere to each other and to other materials; this tendency was particularly noticeable when adhesion was effected between the ruptured portions of such specimen, or between such specimen and such materials as paper, steel, aluminum, tin, bronze, and the like. Oftentimes the bond effected was so adhesive that the elastomer prepared from a formulation of recipe F-17 could not be separated without damage thereto. After standing for 24 hours or more, the specimen prepared from a formulation of recipe F-17 exhibited even better adhesive and cohesive characteristics.

*Example 18*

An organopolysiloxane formulation was prepared by compounding the following ingredients on a two-roll mill:
(A) 100 parts by weight of a linear polysiloxane gum containing 12 percent by weight diphenylsiloxane units, 0.35 percent by weight ethylvinylsiloxane units, and 87.65 percent by weight dimethylsiloxane units;
(B) 40 parts by weight of highly-reinforcing finely-divided silica;
(C) 2 parts by weight of iron oxide;
(D) 1.2 parts by weight of dichlorobenzoyl peroxide;
(E) 12 parts by weight of a monohydroxy-endblocked dimethylpolysiloxane oil (having a molecular weight of about 1100 to about 1300 and a hydroxyl content of about 2.5 percent to about 3.5 percent by weight);
(F) 0.5 part by weight of boric acid; and
(G) 0.5 part by weight of tetraisopropyl titanate.

This formulation was characterized by good "green strength" properties and could be easily stretched without tearing. This formulation was cured to an elastomer by heating in a mold at a temperature of 250° F. for a period of 15 minutes. The elastomer was subsequently postcured by heating at a temperature of 480° F. for a period of 25 hours. The elastomer obtained exhibited a strong tendency to adhere to itself and to other materials, including paper, steel, aluminum, tin, bronze, and the like. Oftentimes the bond effected was so adhesive that the elastomer could not be separated without damage thereto. After standing for 24 hours, or more, the elastomer exhibited even better adhesive and cohesive characteristics.

*Example 19*

An organopolysiloxane formulation was prepared by compounding the following ingredients on a two-roll mill:
(A) 100 parts by weight of a linear polysiloxane gum containing 12 percent by weight diphenylsiloxane units, 0.35 percent by weight ethylvinylsiloxane units, and 87.65 percent by weight dimethylsiloxane units;
(B) 50 parts by weight of highly-reinforcing, finely-divided silica;
(C) 1.2 parts by weight of dichlorobenzoyl peroxide;
(D) 12 parts by weight of a monohydroxy-endblocked dimethylpolysiloxane oil (having a molecular weight of about 1100 to about 1300 and a hydroxyl content of about 2.5 percent to about 3.5 percent by weight);
  (E) 1 part by weight of diphenylsilanediol;
  (F) 0.5 part by weight of boric acid; and
  (G) 0.5 part by weight of tetraisopropyl titanate.

This formulation was characterized by excellent "green strength" properties and could be easily stretched without tearing. This formulation was cured to an elastomer by heating in a mold at a temperature of 250° F. for a period of 15 minutes. The elastomer was subsequently postcured by heating at a temperature of 480° F. for a period of 24 hours. The elastomer obtained exhibited a very strong tendency to adhere to itself and to other materials, including paper, steel, aluminum, tin, bronze, and the like. Oftentimes the bond effected was so adhesive that the elastomer could be separated without damage thereto. After standing for 24 hours or more, the elastomer exhibited even better adhesive and cohesive characteristics.

*Example 20*

To each of five 100-part by weight portions of the polysiloxane gum prepared in Example 8 where added 35 parts by weight of highly-reinforcing, finely-divided silica (sold commercially as "Cab-O-Sil") and 2 parts by weight of iron oxide, while to each of four of these portions was added 15 parts by weight of an ethoxy-endblocked dimethylpolysiloxane oil (having an average molecular weight of about 750 and an average ethoxy content of about 12 percent by weight), and to each of three of the portions containing the dimethylpolysiloxane oil was added 1.0 part by weight of diphenyldiethoxysilane, and to one of the three portions containing diphenyldiethoxysilane was added 0.5 part by weight of boric acid while to another were added 0.5 part by weight of boric acid and 1.0 part by weight of tetraisopropyl titanate. All additions were made during one compounding procedure conducted on a two-roll mill. The recipes of each of the formulations are listed below:

TABLE 20-1

| Formulation | A-20 | B-20 | C-20 | D-20 | E-20 |
|---|---|---|---|---|---|
| Parts Polysiloxane Gum | 100 | 100 | 100 | 100 | 100 |
| Parts Silica | 35 | 35 | 35 | 35 | 35 |
| Parts Iron Oxide | 2 | 2 | 2 | 2 | 2 |
| Parts Ethoxy-Endblocked Dimethylpolysiloxane Oil | 0 | 15 | 15 | 15 | 15 |
| Parts Diphenyldiethoxysilane | 0 | 0 | 1.0 | 1.0 | 1.0 |
| Parts Boric Acid | 0 | 0 | 0 | 0.5 | 0.5 |
| Parts Tetraisopropyl Titanate | 0 | 0 | 0 | 0 | 1.0 |

While the formulations of recipes B-20, C-20, and D-20 (containing an alkoxy-endblocked polysiloxane oil but no titanium-containing compound) were soft, putty-like materials which readily fell apart when pulled under tension, the formulation of recipe E-20 (containing an alkoxy-endblocked polysiloxane oil and a titanium-containing compound) was characterized by increased hardness, "build" and elasticity, and could be easily stretched without tearing. These properties when present in an elastomer-curable organopolysiloxane formulation are collectively termed "green strength" by those skilled in the rubber-compounding art.

Each of the above formulations was added to sufficient toluene to provide dispersions containing from about 28 to about 35 percent by weight dispersed solids. To each of the dispersions was added three parts by weight (per 100 parts gum) of crystalline benzoyl peroxide.

Several pieces of No. 116 glass cloth, prevously heat cleaned, were dipped into the respective dispersions and then heated at a temperature of about 300° F. for a period of about one-half hour. An organopolysiloxane elastomer coating of approximately 3 mils was deposited on each of the glass cloths as a result of the treatment. When the coated cloths were once again dipped into their respective solutions and the organopolysiloxane formulations cured thereon in a manner similar to that described above, the overall thickness of the organopolysiloxane elastomer coating on each of the glass cloths was found to be approximately 11 mils. Each of the coated glass cloths were then cut into smaller specimens and the crease strength (a measure of elastomer to glass cloth bond) and dielectric strength of the specimens evaluated. The results of the tests are listed below:

TABLE 20-2

| Recipe | Crease Strength, lb./inch | Dielectric Strength, volts/mil |
|---|---|---|
| A-20 | 40-50 | 750-850 |
| B-20 | 95 | 950 |
| C-20 | 85 | 975 |
| D-20 | 100 | 1,180 |
| E-20 | 105 | 1,100 |

Pieces of commercially obtained No. 116 glass cloth (having a coating of starch or other material thereon as applied by the manufacturer) were dipped into the dispersions prepared from formulations of recipes A-20, D-20, and E-20 and cured in a manner similar to that described above. The coated glass cloths were then tested for crease strength and dielectric strength. The results of these tests are listed below:

TABLE 20-3

| Recipe | Crease Strength, lb./inch | Dielectric Strength, volts/mil |
|---|---|---|
| A-20 | 40-50 | 750-850 |
| D-20 | 145 | 1,100 |
| E-20 | 135 | 1,150 |

It will be obvious from the results obtained that glass cloths coated with the improved pressure-sensitive organopolysiloxane elastomers of this invention (recipe E-20) are characterized by crease strength and dielectric strength properties which are generally as good as or better than those obtained with glass cloths coated with conventional organopolysiloxane elastomers (recipe A-20), or glass cloths coated with elastomers modified with alkoxy-containing silicon compounds (recipes B-20 and C-20), or glass cloths coated with elastomers which I have previously employed in preparing composite articles (recipe D-20). As the surfaces of the elastomers prepared from formulations of recipes D-20 and E-20 are adhesive in nature, the glass cloths coated with such elastomers can be made to adhere to a wide variety of materials, as well as to each other. While the glass cloths coated with elastomers prepared from a formulation of recipe D-20 exhibit a strong tendency to adhere to each other and to other materials, the glass cloths coated with elastomers prepared from a formulation of recipe E-20 exhibit an even stronger tendency to adhere to each other and to other materials; this tendency is particularly noticeable when adhesion is effected between the coated glass cloths themselves, or between such coated glass cloths and such materials as paper, steel, aluminum, tin, bronze, and the like. Oftentimes the bond effected is so adhesive that the elastomer (prepared from a formulation of recipe E-20) cannot be separated without damage thereto. Elastomers prepared from a formulation of recipe E-20 retain their adhesive properties even after postcures of 24 hours at 250° C.

*Example 21*

Following the procedure described in Example 20, organopolysiloxane formulations of recipes A-20 and E-20 were coated and cured on glass tapes one inch in width.

The glass cloth-supported tapes thus prepared were spirally wound in overlapping fashion, under tension, about circular steel bars which were wrapped with a film of polytetrafluoroethylene (in order to prevent adhesion of the elastomer to the steel). The tape having an elastomer coating prepared from a formulation of recipe E–20 remained firmly in place without any external force to hold it in place. The tape having an elastomer coating prepared from a formulation of recipe A–20 could not be made to remain in place about the bar without the application of external pressure to hold it in place, and the ends of this tape had to be secured to the bar in order to maintain a firm overwrap.

The two bars thus wrapped in elastomer-coated tapes were heated in an air oven at a temperature of 480° F. for a period of 30 minutes. Upon examination of the two specimens, it was found that the overlapped elastomer portions of the tape prepared with a formulation of recipe E–20 had fused together into an essentially homogeneous cylindrical mass and could not be separated without damage to the elastomer. Since the steel bar was wrapped with polytetrafluoroethylene, the fused cylindrical body thus formed could be removed therefrom by the application of a pulling force. Upon examination, this duct-like structure was found to be quite rigid and strong.

On the other hand, there was no fusion of the overlapped elastomer portion of the tape prepared with a formulation of recipe A–20 (conventional organopolysiloxane elastomer), and the overlapped portions of said tape were readily separated.

*Example 22*

Following the procedure described in Example 20, dispersions of organopolysiloxane formulations of recipes A–20 and E–20 and benzoyl peroxide in toluene were prepared. Two electrical transformers were dipped into the respective dispersions, allowed to air dry for a period of 10 minutes, and then heated at a temperature of about 300° F. for a period of 15 minutes in order to cure the organopolysiloxane formulation deposited thereon to an elastomer. This procedure was repeated seven times in order to provide a homogeneous coating about the transformers. The cured elastomer coatings on the transformers were then postcured by heating at a temperature of 480° F. for a period of 4 hours.

Upon examination of the two specimens, it was found that the elastomer coating prepared from a formulation of recipe E–20 was firmly bonded to the metal parts of the transformer. On the other hand, the elastomer coating prepared from a formulation of recipe A–20 did not adhere well to the metal parts of the transformer.

*Example 23*

Following the procedure described in Example 20, dispersions of organopolysiloxane formulations of recipes A–20 and E–20 and benzoyl peroxide in toluene were prepared. Strips of cotton, wool, nylon (the condensation polymer of hexamethylenediamine with adipic acid), and Dacron (the condensation polymer of methyl terephthalate with ethylene glycol) cloth were dipped into the respective dispersions, air dried, and then heated at a temperature of about 300° F. for a period of 15 minutes in order to cure the organopolysiloxane formulations deposited thereon to an elastomer. This procedure was repeated until the overall thickness of the organopolysiloxane elastomer coating on the cloths was approximately 11 mils. The elastomer coated strips thus prepared were spirally wound in overlapping fashion, under tension, about hollow aluminum conduits. The strips having elastomer coatings prepared from a formulation of recipe E–20 readily adhered to each other and to the aluminum conduits without any external force to hold them in place. The strips having elastomer coatings prepared from a formulation of recipe A–20 could not be made to adhere to each other or to the aluminum conduits without the application of external pressure to hold them in place, and the ends of these strips had to be secured to the conduits in order to maintain a firm overwrap.

The conduits thus wrapped in elastomer-coated strips were heated for periods of time ranging from 30 minutes to 2 hours at temperatures ranging from 325° F. to 480° F. Upon examination of the specimens, it was found that the overlapped elastomer portions of the strips prepared with a formulation of recipe E–20 had fused together into an essentially homogeneous cylindrical mass, and that the elastomer surfaces in contact with the outer surfaces of the aluminum conduits had become strongly adhered thereto. On the other hand, there was no fusion or adherence of the elastomer surfaces of the strips prepared with a formulation of recipe A–20 (conventional organopolysiloxane elastomer), and the overlapped portions of said strips were readily separated from each other and from the aluminum conduits.

*Example 24*

To each of the formulations of recipes A–20 and E–20 of Example 20 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of 15 minutes.

These elastomer strips were used to prepare a series of 3-ply laminates by superimposing two elastomer strips prepared from each of the above formulations on either side of strips of cloth, wool, cotton, and nylon and applying a pressure of approximately 300 pounds per square inch to the outer surfaces of the superimposed elastomer strips while heating at a temperature in a range of from 250° F. to 340° F.

The laminates thus prepared were spirally wound in overlapping fashion, under tension, about hollow aluminum conduits. The laminates having elastomer coating prepared from a formulation of recipe E–20 readily adhered to each other and to the aluminum conduits without any external force to hold them in place. The laminates having elastomer coatings prepared from a formulation of recipe A–20 could not be made to hold together or to adhere to the aluminum conduits without the application of external pressure to hold them in place, and the ends of these laminates had to be secured to the conduits in order to maintain a firm overlap.

The wrapped conduits thus prepared were then heated at a temperature of about 350° F. for a period of about 1 hour. Upon examination of the specimens, it was found that the overlapped elastomer portions of the laminates prepared with a formulation of recipe E–20 had fused together into a essentially homogeneous cylindrical mass, and that the elastomer surfaces in contact with the outer surfaces of the aluminum conduits had become strongly adhered thereto. On the other hand, there was no fusion or adherence of the elastomer surfaces of the laminates prepared with a formulation of recipe A–20 (conventional organopolysiloxane elastomer), and the overlapped portions of said laminates were readily separated from each other and from the aluminum conduits.

*Example 25*

To each of the formulations of recipes A–20 and E–20 of Example 20 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of 15 minutes.

These elastomer strips were used to prepare a series of 3-ply laminates by superimposing strips of steel, phosphatized steel, aluminum, anodized aluminum, and copper on either side of said elastomer strips, and applying a pressure of approximately 1000 pounds per square inch to the outer surfaces of the superimposed metal strips while heating at a temperature of 480° F. for a period of 30 minutes.

Upon examination of the specimens, it was found that the various metal strips were firmly bonded to the elastomer interlayers prepared from a formulation of recipe E–20 and could not be separated therefrom without damaging the elastomer. On the other hand, the various metal strips did not adhere to the elastomer interlayers prepared from a formulation of recipe A–20 (conventional organopolysiloxane elastomer), and were readily separated therefrom.

*Example 26*

To each of the formulations of recipes A–20 and E–20 of Example 20 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of 15 minutes.

These elastomer strips were used to prepare a series of 3-ply laminates by superimposing strips of glass sheet 3/16 of an inch in width on either side of said elastomer strips, and applying a pressure of approximately 50 pounds per square inch to the outer surfaces of the superimposed glass strips while heating at a temperature of about 480° F. for a period of about 10 hours.

Upon examination of the specimens, it was found that the glass strips were firmly bonded to the elastomer interlayers prepared from a formulation of recipe E–20, and could not be separated therefrom by manual force. The bond effected between the glass strips and such elastomers was such that when the laminates were subjected to a blow by a hammer, the glass shattered but was held in place by the elastomer interlayer.

On the other hand, the glass strips did not adhere to the elastomer interlayers prepared from a formulation of recipe A–20 (conventional organopolysiloxane elastomer), and were readily separated therefrom.

*Example 27*

To a formulation of recipe E–20 of Example 20 was added 1.5 parts of dichlorobenzoyl peroxide during a compounding procedure conducted on a two-roll mill. The catalyzed formulation was mold-cured into a thin elastomer strip in a thin section mold by heating at a temperature of 250° F. for a period of 15 minutes.

The elastomer strip was used to prepare a 3-ply laminate by superimposing strips of aluminum foil on either side of said elastomer strip, and applying pressure to the outer surfaces of the superimposed aluminum foil while heating at a temperature of 480° F. for a period of about 20 hours. The resulting laminate was quite flexible and exhibited an excellent aluminum foil-to-elastomer bond.

*Example 28*

To each of five 100-part by weight portions of the polysiloxane gum prepared in Example 8 were added 35 parts by weight of highly-reinforcing, finely-divided silica (sold commercially as "Cab-O-Sil") and 2 parts by weight of iron oxide, while to each of four of these portions was added 15 parts by weight of a hydroxy-endblocked dimethylpolysiloxane oil (having an average molecular weight of about 1080 and an average hydroxyl content of about 3 percent by weight), and to each of three of the portions containing the dimethylpolysiloxane oil was added 1.0 part by weight of diphenylsilanediol, and to one of the three portions containing diphenylsilanediol was added 0.5 part by weight of boric acid while to another were added 0.5 part by weight of boric acid and 1.0 part by weight of tetraisopropyl titanate. All additions were made during one compounding procedure conducted on a two-roll mill. The recipes of each of the formulations are listed below:

TABLE 28–1

| Formulation | A–28 | B–28 | C–28 | D–28 | E–28 |
|---|---|---|---|---|---|
| Parts Polysiloxane Gum | 100 | 100 | 100 | 100 | 100 |
| Parts Silica | 35 | 35 | 35 | 35 | 35 |
| Parts Iron Oxide | 2 | 2 | 2 | 2 | 2 |
| Parts Hydroxy-Endblocked Dimethylpolysiloxane Oil | 0 | 15 | 15 | 15 | 15 |
| Parts Diphenylsilanediol | 0 | 0 | 1.0 | 1.0 | 1.0 |
| Parts Boric Acid | 0 | 0 | 0 | 0.5 | 0.5 |
| Parts Tetraisopropyl Titanate | 0 | 0 | 0 | 0 | 1.0 |

While the formulation of recipes B–28, C–28, and D–28 (containing a hydroxy-endblocked polysiloxane oil but no titanium-containing compound) were soft, putty-like materials which readily fell apart when pulled under tension, the formulation of recipe E–28 (containing a hydroxy-endblocked polysiloxane oil and a titanium-containing compound) was characterized by increased hardness, "build" and elasticity, and could be easily stretched without tearing. These properties when present in an elastomer-curable organopolysiloxane formulation are collectively termed "green strength" by those skilled in the rubber-compounding art.

Each of the above formulations was added to sufficient toluene to provide dispersions containing from about 28 to about 35 percent by weight dispersed solids. To each of the dispersions was added three parts by weight (per 100 parts gum) of crystalline benzoyl peroxide.

Several pieces of No. 116 glass cloth, previously heat cleaned, were dipped into the respective dispersions and then heated at a temperature of about 300° F. for a period of about one-half hour. An organopolysiloxane elastomer coating of approximately 3 mils was deposited on each of the glass cloths as a result of the treatment. When the coated cloths were once again dipped into their respective solutions and the organopolysiloxane formulations cured thereon in a manner similar to that described above, the overall thickness of the organopolysiloxane elastomer coating on each of the glass cloths was found to be approximately 11 mils. Each of the coated glass cloths were then cut into smaller specimens and the crease strength (a measure of elastomer to glass cloth bond) and dielectric strength of the specimens evaluated. The results of the test are listed below:

TABLE 28–2

| Recipe | Crease Strength, lb./inch | Dielectric Strength, volts/mil |
|---|---|---|
| A–28 | 40–50 | 750–850 |
| B–28 | 95 | 975 |
| C–28 | 90 | 1000 |
| D–28 | 100 | 1150 |
| E–28 | 110 | 1100 |

Pieces of commercially obtained No. 116 glass cloth (having a coating of starch or other material thereon as applied by the manufacturer) were dipped into the dispersions prepared from formulations of recipes A–28, B–28, D–28, and E–28, and cured in a manner similar to that described above. The coated glass cloths were then tested for crease strength and dielectric strength. The results of these tests are listed below:

TABLE 28-3

| Recipe | Crease Strength, lb./inch | Dielectric Strength volts/mil |
|---|---|---|
| A-28 | 40-50 | 750-850 |
| B-28 | 90 | 1000 |
| D-28 | 135 | 1130 |
| E-28 | 140 | 1100 |

It will be obvious from the results obtained that glass cloths coated with the improved pressure-sensitive organopolysiloxane elastomers of this invention (recipe E-28) are characterized by crease strength and dielectric strength properties which are generally as good as or better than those obtained with glass cloths coated with conventional organopolysiloxane elastomers (recipe A-28), or glass cloths coated with elastomers modified with hydroxy-containing silicon compounds (recipes B-28 and C-28), or glass cloths coated with elastomers which I have previously employed in preparing composite articles (recipe D-28). As the surfaces of the elastomers prepared from formulations of recipes D-28 and E-28 are adhesive in nature, the glass cloths coated with such elastomers can be made to adhere to a wide variety of materials, as well as to each other. While the glass cloths coated with elastomers prepared from a formulation of recipe D-28 exhibit a strong tendency to adhere to each other and to other materials, the glass cloths coated with elastomers prepared from a formulation of recipe E-28 exhibit an even stronger tendency to adhere to each other and to other materials; this tendency is particularly noticeable when adhesion is affected between the coated glass cloths themselves, or between such coated glass cloths and such materials as paper, steel, aluminum, tin, bronze, and the like. Oftentimes the bond effected is so adhesive that the elastomer (prepared from a formulation of recipe E-28) cannot be separated without damage thereto. Elastomers prepared from a formulation of recipe E-28 retain their adhesive properties even after postcures of 24 hours at 250° C.

*Example 29*

Following the procedure described in Example 28, organopolysiloxane formulations of recipes A-28 and E-28 were coated and cured on glass tapes one inch in width. The glass cloth-supported tapes thus prepared were spirally wound in overlapping fashion under tension, about circular steel bars which were wrapped with a film of polytetrafluoroethylene (in order to prevent adhesion of the elastomer to the steel). The tape having an elastomer coating prepared from a formulation of recipe E-28 remained firmly in place without any external force to hold it in place. The tape having an elastomer coating prepared from a formulation of recipe A-28 could not be made to remain in place about the bar without the application of external pressure to hold it in place, and the ends of this tape had to be secured to the bar in order to maintain a firm overwrap.

The two bars thus wrapped in elastomer-coated tapes were heated in an air oven at a temperature of 480° F. for a period of 30 minutes. Upon examination of the two specimens, it was found that the overlapped elastomer portions of the tape prepared with a formulation of recipe E-28 had fused together into an essentially homogeneous cylindrical mass and could not be separated without damage to the elastomer. Since the steel bar was wrapped with polytetrafluoroethylene, the fused cylindrical body thus formed could be removed therefrom by the application of a pulling force. Upon examination, this duct-like structure was found to be quite rigid and strong. On the other there was no fusion of the overlapped elastomer portions of the tape prepared with a formulation of recipe A-28 (conventional organopolysiloxane elastomer), and the overlapped portions of said tape were readily separated.

*Example 30*

Following the procedure described in Example 28, dispersions of organopolysiloxane formulations of recipes A-28 and E-28 and benzoyl peroxide in toluene were prepared. Two electrical transformers were dipped into the respective dispersions, allowed to air dry for a period of 10 minutes, and then heated at a temperature of about 300° F. for a period of 15 minutes in order to cure the organopolysiloxane formulation deposited thereon to an elastomer. This procedure was repeated seven times in order to provide a homogeneous coating about the transformers. The cured elastomer coatings on the transformers were then postcured by heating at a temperature of 480° F. for a period of 4 hours.

Upon examination of the two specimens, it was found that the elastomer coating prepared from a formulation of recipe E-28 was firmly bonded to the metal parts of the transformer. On the other hand, the elastomer coating prepared from a formulation of recipe A-28 did not adhere well to the metal parts of the transformer.

*Example 31*

Following the procedure described in Example 28, dispersions of organopolysiloxane formulations of recipes A-28 and E-28 and benzoyl peroxide in toluene were prepared. Strips of cotton, wool, nylon (the condensation polymer of hexamethylenediamine with adipic acid) and Dacron (the condensation polymer of methyl terephthalate with ethylene glycol) cloth were dipped into the respective dispersions, air dried, and then heated at a temperature of about 300° F. for a period of 15 minutes in order to cure the organopolysiloxane formulations deposited thereon to an elastomer. This procedure was repeated until the overall thickness of the organopolysiloxane elastomer coating on the cloths was approximately 11 mils. The elastomer-coated strips thus prepared were spirally wound in overlapping fashion, under tension, about hollow aluminum conduits. The strips having elastomer coatings prepared from a formulation of recipe E-28 readily adhered to each other and to the aluminum conduits without any external force to hold them in place. The strips having elastomer coatings prepared from a formulation of recipe A-28 could not be made to adhere to each other or to the aluminum conduits without the application of external pressure to hold them in place, and the ends of these strips had to be secured to the conduits in order to maintain a firm overwrap.

The conduits thus wrapped in elastomer-coated strips were heated for periods of time ranging from 30 minutes to 2 hours at temperature ranging from 325° F. to 480° F. Upon examination of the specimens, it was found that the overlapped elastomer portions of the strips prepared with a formulation of recipe E-28 had fused together into an essentially homogeneous cylindrical mass, and that the elastomer surfaces in contact with the outer surfaces of the aluminum conduits had become strongly adhered thereto. On the other hand, there was no fusion or adherence of the elastomer surfaces of the strips prepared with a formulation of recipe A-28 (conventional organopolysiloxane elastomer), and the overlapped portions of said strips were readily separated from each other and from the aluminum conduits.

*Example 32*

To each of the formulations of recipes A-28 and E-28 of Example 28 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of 15 minutes.

These elastomer strips used to prepare a series of 3-ply laminates by superimposing two elastomer strips prepared from each of the above formulations on either side of strips of cloth, wool, cotton, and nylon and applying a pressure of approximately 300 pounds per square inch to the outer surfaces of the superimposed elastomer strips while heating at a temperature in a range of from 250° F. to 340° F.

The laminates thus prepared were spirally wound in overlapping fashion, under tension, about hollow aluminum conduits. The laminates having elastomer coatings prepared from a formulation of recipe E-28 readily adhered to each other and to the aluminum conduits without any external force to hold them in place. The laminates having elastomer coatings prepared from a formulation of recipe A-28 could not be made to hold together or to adhere to the aluminum conduits without the application of external pressure to hold them in place, and the ends of these laminates had to be secured to the conduits in order to maintain a firm overlap.

The wrapped conduits thus prepared were then heated at a temperature of about 350° F. for a period of about 1 hour. Upon examination of the specimens, it was found that the overlapped elastomer portions of the laminates prepared with a formulation of recipe E-28 had fused together into an essentially homogeneous cylindrical mass, and that the elastomer surfaces in contact with the outer surfaces of the aluminum conduits had become strongly adhered thereto. On the other hand, there was no fusion or adherence of the elastomer surfaces of the laminates prepared with a formulation of recipe A-28 (conventional organopolysiloxane elastomer), and the overlapped portions of said laminates were readily separated from each other and from the aluminum conduits.

*Example 33*

To each of the formulations of recipes A-28 and E-28 of Example 28 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of 15 minutes.

These elastomer strips were used to prepare a series of 3-ply laminates by superimposing strips of steel, phosphatized steel, aluminum, anodized aluminum, and copper on either side of said elastomer strips, and applying a pressure of approximately 1000 pounds per square inch to the outer surfaces of the superimposed metal strips while heating at a temperature of 480° F. for a period of 30 minutes.

Upon examination of the specimens, it was found that the various metal strips were firmly bonded to the elastomer interlayers prepared from a formulation of recipe E-28, and could not be separated therefrom without damaging the elastomer. On the other hand, the various metal strips did not adhere to the elastomer interlayers prepared from a formulation of recipe A-28 (conventional organopolysiloxane elastomer), and were readily separated therefrom.

*Example 34*

To each of the formulations of recipes A-28 and E-28 of Example 28 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of 15 minutes.

These elastomer strips were used to prepare a series of 3-ply laminates by superimposing strips of glass sheet 3/16 of an inch in width on either side of said elastomer strips, and applying a pressure of approximately 50 pounds per square inch to the outer surfaces of the superimposed glass strips while heating at a temperature of about 480° F. for a period of about 10 hours.

Upon examination of the specimens, it was found that the glass strips were firmly bonded to the elastomer interlayers prepared from a formulation of recipe E-28, and could not be separated therefrom by manual force. The bond effected between the glass strips and such elastomers was such that when the laminates were subjected to a blow by a hammer the glass shattered but was held in place by the elastomer interlayer.

On the other hand, the glass strips did not adhere to the elastomer interlayers prepared from a formulation of recipe A-28 (conventional organopolysiloxane elastomer), and were readily separated therefrom.

*Example 35*

To a formulation of recipe E-28 of Example 28 was added 1.5 parts of dichlorobenzoyl peroxide during a compounding procedure conducted on a two-roll mill. The catalyzed formulation was mold-cured into a thin elastomer strip in a thin section mold by heating at a temperature of 250° F. for a period of 15 minutes.

The elastomer strip was used to prepare a 3-ply laminate by superimposing strips of aluminum foil on either side of said elastomer strip, and applying pressure to the outer surfaces of the superimposed aluminum foil while heating at a temperature of 480° F. for a period of about 20 hours. The resulting laminate was quite flexible and exhibited an excellent aluminum foil-to-elastomer bond.

*Example 36*

To each of six 100 parts by weight portions of the polysiloxane gum prepared in Example 8 were added 35 parts by weight of highly-reinforcing, finely-divided silica (sold commercially as "Cab-O-Sil") and 2 parts by weight of iron oxide, while to each of five of these portions was added a combination of 7.5 parts by weight of an ethoxy-endblocked dimethylpolysiloxane oil (having an average molecular weight of about 750 and an average ethoxy content of about 12 percent by weight) and 7.5 parts by weight of a hydroxy-endblocked dimethylpolysiloxane oil (having an average molecular weight of about 1080 and an average hydroxyl content of about 3 percent by weight), and to each of four of the portions containing the dimethylpolysiloxane oils was added 1 part by weight of diphenyldiethoxysilane, and to each of three of the portions containing diphenyldiethoxysilane was added 0.5 part by weight of boric acid, and to one of the three portions containing boric acid was added 1 part by weight of tetraisopropyl titanate while to another were added 1 part by weight of tetraisopropyl titanate and 1.0 part by weight of diphenylsilanediol. All additions were made during one compounding procedure conducted on a two-roll mill. The recipes of the formulations are listed below:

TABLE 36-1

| Formulation | A-36 | B-36 | C-36 | D-36 | E-36 | F-36 |
|---|---|---|---|---|---|---|
| Parts Polysiloxane Gum | 100 | 100 | 100 | 100 | 100 | 100 |
| Parts Silica | 35 | 35 | 35 | 35 | 35 | 35 |
| Parts Iron Oxide | 2 | 2 | 2 | 2 | 2 | 2 |
| Parts Ethoxy-Endblocked Dimethylpolysiloxane Oil | 0 | 7.5 | 7.5 | 7.5 | 7.5 | 7.5 |
| Parts Hydroxy-Endblocked Dimethylpolysiloxane Oil | 0 | 7.5 | 7.5 | 7.5 | 7.5 | 7.5 |
| Parts Diphenyldiethoxysilane | 0 | 0 | 1.0 | 1.0 | 1.0 | 1.0 |
| Parts Diphenylsilanediol | 0 | 0 | 0 | 0 | 0 | 1.0 |
| Parts Boric Acid | 0 | 0 | 0 | 0.5 | 0.5 | 0.5 |
| Parts Tetraisopropyl Titanate | 0 | 0 | 0 | 0 | 1.0 | 1.0 |

While the formulations of recipes B-36, C-36, and D-36 (containing a combination of an alkoxy-endblocked polysiloxane oil and a hydroxy-endblocked polysiloxane oil but no titanium containing compound) were soft, furry-like materials which readily fell apart when pulled under tension, the formulations of recipes E-36 and F-36 (containing a combination of alkoxy-endblocked polysiloxane oil and a hydroxy-endblocked polysiloxane oil and a titanium-containing compound) were characterized by increased hardness, "build" and elasticity, and could be easily stretched without tearing. These properties when present in an elastomer-curable organo-polysiloxane formulation are collectively termed "green strength" by those skilled in the rubber-compounding art.

Each of the above formulations was added to sufficient toluene to provide dispersions containing from about 28 to about 35 percent by weight dispersed solids. To each of the dispersions was added three parts by weight (per 100 parts gum) of crystalline benzoyl peroxide.

Several pieces of No. 116 glass cloth, previously heat cleaned, were dipped into the respective dispersions and then heated at a temperature of about 300° F. for a period of about one-half hour. An organopolysiloxane elastomer coating of approximately 3 mils was deposited on each of the glass cloths as a result of the treatment. When the coated cloths were once again dipped into their respective solutions and the organopolysiloxane formulations cured thereon in a manner similar to that described above, the overall thickness of the organopolysiloxane elastomer coating on each of the glass cloths was found to be approximately 11 mils. Each of the coated glass cloths were then cut into smaller specimens and the crease strength (a measure of elastomer to glass cloth bond) and dielectric strength of the specimens evaluated. The results of the tests are listed below:

TABLE 36-2

| Recipe | Crease Strength, lb./inch | Dielectric Strength, volts/mil |
| --- | --- | --- |
| A-36 | 40-50 | 750-850 |
| B-36 | 80 | 1,000 |
| C-36 | 85 | 1,025 |
| D-36 | 120 | 1,100 |
| E-36 | 125 | 1,125 |
| F-36 | 120 | 1,150 |

Pieces of commercially obtained No. 116 glass cloth (having a coating of starch or other material thereon as applied by the manufacturer) were dipped into the dispersions prepared from formulations of recipes A-36, B-36, D-36, E-36, and F-36, and cured in a manner similar to that described above. The coated glass cloths were then tested for crease strength and dielectric strength. The results of these tests are listed below:

TABLE 36-3

| Recipe | Crease Strength, lb./inch | Dielectric Strength, volts/mil |
| --- | --- | --- |
| A-36 | 40-50 | 750-850 |
| B-36 | 90 | 975 |
| D-36 | 135 | 1,120 |
| E-36 | 145 | 1,150 |
| F-36 | 140 | 1,140 |

It will be obvious from the results obtained that glass cloths coated with the improved pressure-sensitive organopolysiloxane elastomers used in this invention (recipes E-36 and F-36) are characterized by crease strength and dielectric strength properties which are generally as good as or better than those obtained with glass cloths coated with conventional organopolysiloxane elastomers (recipe A-36), or glass cloths coated with elastomers modified with alkoxy-containing silicon compounds and hydroxy-containing silicon compounds (recipes B-36 and C-36), or glass cloths coated with elastomers which I have previously employed in preparing composite articles (recipe D-36). As the surfaces of the elastomers prepared from formulations of recipes D-36, E-36, and F-36 are adhesive in nature, the glass cloths coated with such elastomers can be made to adhere to a wide variety of materials, as well as to each other. While the glass cloths coated with elastomers prepared from a formulation of recipe D-36 exhibit a strong tendency to adhere to each other and to other materials, the glass cloths coated with elastomers prepared from formulations of recipes E-36 and F-36 exhibit an even stronger tendency to adhere to each other and to other materials; this tendency is particularly noticeable when adhesion is effected between the coated glass cloths themselves, or between such coated glass cloths and such materials as paper, steel, aluminum, tin, bronze, and the like. Oftentimes the bond effected is so adhesive that the elastomers (prepared from formulations of recipes E-36 and F-36) cannot be separated without damage thereto. Elastomers prepared from formulations of recipes E-36 and F-36 retain their adhesive properties even after postcures of 24 hours at 250° C.

*Example 37*

Following the procedure described in Example 36, organopolysiloxane formulations of recipes A-36, E-36, and F-36 were coated and cured on glass tapes one inch in width. The glass cloth-supported tapes thus prepared were spirally wound in overlapping fashion, under tension, about circular steel bars which were wrapped with a film of polytetrafluoroethylene (in order to prevent adhesion of the elastomer to the steel). The tapes having elastomer coatings prepared from formulations of recipes E-36 and F-36 remained firmly in place without any external force to hold them in place. The tape having an elastomer coating prepared from a formulation of recipe A-36 could not be made to remain in place about the bar without the application of external pressure to hold it in place, and the ends of this tape had to be secured to the bar in order to maintain a firm overwrap.

The three bars thus wrapped in elastomer-coated tapes were heated in an air oven at a temperature of 480° F. for a period of 30 minutes. Upon examination of the three specimens, it was found that the overlapped elastomer portions of the tapes prepared with formulations of recipes E-36 and F-36 had fused together into an essentially homogeneous cylindrical mass and could not be separated without damage to the elastomer. Since the steel bars were wrapped with polytetrafluoroethylene, the fused cylindrical bodies thus formed could be removed therefrom by the application of a pulling force. Upon examination these duct-like structures were found to be quite rigid and strong.

On the other hand, there was no fusion of the overlapped elastomer portions of the tape prepared with a formulation of recipe A-36 (conventional organopolysiloxane elastomer), and the overlapped portions of said tape were readily separated.

*Example 38*

Following the procedure described in Example 36, dispersions of organopolysiloxane formulations of recipes A-36, E-36, and F-36 and benzoyl peroxide in toluene were prepared. Three electrical transformers were dipped into the respective dispersions, allowed to air dry for a period of 10 minutes, and then heated at a temperature of about 300° F. for a period of 15 minutes in order to cure the organopolysiloxane formulation deposited thereon to an elastomer. This procedure was repeated seven times in order to provide a homogeneous coating about the transformers. The cured elastomer coatings on the transformers were then postcured by heating at a temperature of 480° F. for a period of 4 hours.

Upon examination of the three specimens, it was found that the elastomer coatings prepared from formulations of recipes E-36 and F-36 were firmly bonded to the metal parts of the transformers. On the other hand, the elastomer coating prepared from a formulation of recipe A-36 did not adhere well to the metal parts of the transformer.

*Example 39*

Following the procedure described in Example 36, dispersions of organopolysiloxane formulations or recipes A-36, E-36, and F-36 and benzoyl peroxide in toluene were prepared. Strips of cotton, wool, nylon (the condensation polymer of hexamethylenediamine with adipic acid) and Dacron (the condensation polymer of methylterephthalate with ethylene glycol) cloth were dipped into the respective dispersions, air dried, and then heated at a temperature of about 300° F. for a period of 15 minutes in order to cure the organopolysiloxane formulations deposited thereon to an elastomer. This procedure was repeated until the overall thickness of the organopolysiloxane elastomer coating on the cloths was approximately 11 mils. The elastomer-coated strips thus prepared were spirally wound in overlapping fashion, under tension, about hollow aluminum conduits. The strips having elastomer coatings prepared from formulations of recipes E–36 and F–36 readily adhered to each other and to the aluminum conduits without any external force to hold them in place. The strips having elastomer coatings prepared from a formulation of recipe A–36 could not be made to adhere to each other or to the aluminum conduits without the application of external pressure to hold them in place, and the ends of these strips had to be secured to the conduits in order to maintain a firm overwrap.

The conduits thus wrapped in elastomer-coated strips were heated for periods of time ranging from 30 minutes to 2 hours at temperatures ranging from 325° F. to 480° F. Upon examination of the specimens, it was found that the overlapped elastomer portions of the strips prepared with formulations of recipes E–36 and F–36 had fused together into an essentially homogeneous cylindrical mass, and that the elastomer surfaces in contact with the outer surfaces of the aluminum conduits had become strongly adhered thereto. On the other hand, there was no fusion or adherence of the elastomer surfaces of the strips prepared with a formulation of recipe A–36 (conventional organopolysiloxane elastomer), and the overlapped portions of said strips were readily separated from each other and from the aluminum conduits.

*Example 40*

To each of the formulations of recipes A–36, E–36, and F–36 of Example 36 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of 15 minutes.

These elastomer strips were used to prepare a series of 3-ply laminates by superimposing two elastomer strips prepared from each of the above formulations on either side of strips of cloth, wool, cotton, and nylon, and applying a pressure of approximately 300 pounds per square inch to the outer surfaces of the superimposed elastomer strips while heating at a temperature in a range of from 250° F. to 340° F.

The laminates thus prepared were spirally wound in overlapping fashion, under tension, about hollow aluminum conduits. The laminates having elastomer coatings prepared from formulations of recipes E–36 and F–36 readily adhered to each other and to the aluminum conduits without any external force to hold them in place. The laminates having elastomer coatings prepared from a formulation of recipe A–36 could not be made to hold together or to adhere to the aluminum conduits without the application of external pressure to hold them in place, and the ends of these laminates had to be secured to the conduits in order to maintain a firm overlap.

The wrapped conduits thus prepared were then heated at a temperature of about 350° F. for a period of about 1 hour. Upon examination of the specimens, it was found that the overlapped elastomer portions of the laminates prepared with formulations of recipes E–36 and F–36 had fused together into an essentially homogeneous cylindrical mass, and that the elastomer surfaces in contact with the outer surfaces of the aluminum conduits had become strongly adhered thereto. On the other hand, there was no fusion or adherence of the elastomer surfaces of the laminates prepared with a formulation of recipe A–36 (conventional organopolysiloxane elastomer), and the overlapped portions of said laminates were readily separated from each other and from the aluminum conduits.

*Example 41*

To each of the formulations of recipes A–36, E–36, and F–36 of Example 36 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of 15 minutes.

These elastomer strips were used to prepare a series of 3-ply laminates by superimposing strips of steel, phosphatized steel, aluminum, anodized aluminum, and copper on either side of said elastomer strips, and applying a pressure of approximately 1000 pounds per square inch to the outer surfaces of the superimposed metal strips while heating at a temperature of 480° F. for a period of 30 minutes.

Upon examination of the specimens, it was found that the various metal strips were firmly bonded to the elastomer interlayers prepared from formulations of recipes E–36 and F–36 and could not be separated therefrom without damaging the elastomer. On the other hand, the various metal strips did not adhere to the elastomer interlayers prepared from a formulation of recipe A–36 (conventional organopolysiloxane elastomer), and were readily separated therefrom.

*Example 42*

To each of the formulations of recipes A–36, E–36, and F–36 of Example 36 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of 15 minutes.

These elastomer strips were used to prepare a series of 3-ply laminates by superimposing strips of glass sheet $3/16$ inch in width on either side of said elastomer strips, and applying a pressure of approximately 50 pounds per square inch to the outer surfaces of the superimposed glass strips while heating at a temperature of about 480° F. for a period of about 10 hours.

Upon examination of the specimens, it was found that the glass strips were firmly bonded to the elastomer interlayers prepared from formulations or recipes E–36 and F–36, and could not be separated therefrom by manual force. The bond effected between the glass strips and such elastomers was such that when the laminates were subjected to a blow by a hammer, the glass shattered but was held in place by the elastomer interlayer.

On the other hand, the glass strips did not adhere to the elastomer interlayers prepared from a formulation of recipe A–36 (conventional organopolysiloxane elastomer), and were readily separated therefrom.

*Example 43*

To each of the formulations of recipes E–36 and F–36 of Example 36 were added 1.5 parts of dichlorobenzoyl peroxide during compounding procedures conducted on a two-roll mill. The catalyzed formulations were mold-cured into thin elastomer strips in a thin section mold by heating at a temperature of 250° F. for a period of 15 minutes.

The elastomer strips were used to prepare a series of 3-ply laminates by superimposing strips of aluminum foil on either side of said elastomer strips, and applying pressure to the outer surfaces of the superimposed aluminum foil while heating at a temperature of 480° F. for a period of about 20 hours. The resulting laminates were quite flexible and exhibited excellent aluminum foil-to-elastomer bonds.

Example 44

An organopolysiloxane formulation was prepared by compounding the following ingredients on a two-roll mill:

(A) 100 parts by weight of a linear polysiloxane gum containing 99.65 percent by weight dimethylsiloxane units and 0.35 percent by weight ethylvinylsiloxane units;

(B) 35 parts by weight of highly-reinforcing, finely-divided silica;

(C) 2 parts by weight of iron oxide;

(D) 15 parts by weight of an ethoxy-endblocked dimethylpolysiloxane oil (having an average molecular weight of about 750 and an average ethoxy content of about 12 percent by weight);

(E) 1 part by weight of diphenyldiethoxysilane;

(F) 1 part by weight of diphenylsilanediol;

(G) 0.5 part by weight of boric acid; and (H) 1 part by weight of tetraisopropyl titanate.

This formulation was characterized by good "green strength" properties and could be easily stretched without tearing. This formulation was added to sufficient toluene to provide a dispersion containing from about 28 to about 35 percent by weight dispersed solids. To the dispersion was added 3 parts by weight of crystalline benzoyl peroxide.

Several pieces of No. 116 glass cloth, previously heat cleaned, were dipped into the dispersion and then heated at a temperature of about 300° F. for a period of about one-half hour. An organopolysiloxane elastomer coating of approximately 3 mils was deposited on each of the glass cloths as a result of the treatment. When the coated cloths were once again dipped into the dispersion and the organopolysiloxane formulation cured thereon in a manner similar to that described above, the overall thickness of the organopolysiloxane elastomer coating on each of the glass cloths was found to be approximately 11 mils. The coated glass cloths were then cut into smaller specimens and the crease strength (a measure of elastomer to glass cloth bond) and dielectric strength of the specimens evaluated. The crease strength was found to be 120 lb./inch and the dielectric strength was found to be 1150 volts/mil.

Pieces of commercially obtained No. 116 glass cloth (having a coating of starch or other material thereon as applied by the manufacturer) was dipped into the dispersion and cured in a manner similar to that described above. The coated glass cloths were then tested for crease strength and dielectric strength. The crease strength was found to be 145 lb./inch and the dielectric strength was found to be 1170 volts/mil.

Glass cloths coated with the improved pressure-sensitive organopolysiloxane elastomers of this invention are characterized by crease strength and dielectric strength properties which are generally as good as or better than those obtained with glass cloths coated with conventional organopolysiloxane elastomers, or glass cloths coated with elastomers modified with alkoxy-containing silicon compounds and hydroxy-containing silicon compounds, or glass cloths coated with elastomers which I have previously employed in preparing composite articles. Glass cloths coated with elastomers prepared from the above formulation exhibit a strong tendency to adhere to each other and to other materials; this tendency is particularly noticeable when adhesion is effected between the coated glass cloths themselves, or between such coated glass cloths and such materials as paper, steel, aluminum, tin, bronze, and the like. Oftentimes the bond effected is so adhesive that the elastomers connot be separated without damage thereto. Elastomers prepared from the above formulation retain their adhesive properties even after postcures of 24 hours at 250° C.

Example 45

A glass cloth-supported tape was prepared in accordance with the procedure described in Example 44, and spirally wound in overlapping fashion, under tension about a circular steel bar which was wrapped with a film of polytetrafluoroethylene (in order to prevent adhesion of the elastomer to the steel). The tape remained firmly in place without any external force to hold it in place.

The bar thus wrapped in elastomer-coated tape was heated in an air oven at a temperature of 480° F. for a period of 30 minutes. Upon examination of the specimen, it was found that the overlapped elastomer portions of the tape had fused together into an essentially homogeneous cylindrical mass and could not be separated without damage to the elastomer. Since the steel bar was wrapped with polytetrafluoroethylene, the fused cylindrical body thus formed could be removed therefrom by the application of a pulling force. Upon examination, this duct-like structure was found to be quite rigid and strong.

Example 46

An electrical transformer was dipped into a dispersion prepared in accordance with the procedure described in Example 44, allowed to air dry for a period of 10 minutes, and then heated at a temperature of about 300° F. for a period of 15 minutes in order to cure the organopolysiloxane formulation deposited thereon to an elastomer. This procedure was repeated seven times in order to provide a homogeneous coating about the transformer. The cured elastomer coating on the transformer was then postcured by heating at a temperature of 480° F. for a period of 4 hours. Upon examination of the specimen, it was found that the elastomer coating was firmly bonded to the metal parts of the transformer.

Example 47

An organopolysiloxane formulation identical with that employed and described in Example 44 was added to sufficient toluene to provide a dispersion containing from about 28 to about 35 percent by weight dispersed solids. To the dispersion was added 3 parts by weight (per 100 parts gum) of crystalline benzoyl peroxide.

Strips of cotton, wool, nylon (the condensation polymer of hexamethylenediamine with adipic acid) and Dacron (the condensation polymer of methylterephthalate with ethylene glycol) cloth were dipped into the dispersion, air dried, and then heated at a temperature of about 300° F. for a period of 15 minutes in order to cure the organopolysiloxane formulation deposited thereon to an elastomer. This procedure was repeated until the overall thickness of the organopolysiloxane elastomer coating on the cloths was approximately 11 mils. The elastomer-coated strips thus prepared were spirally wound in overlapping fashion, under tension, about hollow aluminum conduits. The strips readily adhered to each other and to the aluminum conduits without any external force to hold them in place.

The conduits thus wrapped in elastomer-coated strips were heated for periods of time ranging from 30 minutes to 2 hours at temperatures ranging from 325° F. to 480° F. Upon examination of the specimens, it was found that the overlapped elastomer portions of the strips had fused together into an essentially homogeneous cylindrical mass, and that the elastomer surfaces in contact with the outer surfaces of the aluminum conduits had become strongly adhered thereto.

Example 48

To an organopolysiloxane formulation identical with that employed and described in Example 44 was added 1.5 parts of dichlorobenzoyl peroxide during a compounding procedure conducted on a two-roll mill. The catalyzed formulation was mold-cured into thin elastomer strips in a thin section mold by heating at a temperature of 250° F. for a period of 15 minutes.

These elastomer strips were used to prepare a series of 3-ply laminates by superimposing two elastomer strips on either side of strips of cloth, wool, cotton, and nylon and applying a pressure of approximately 300 pounds per square inch to the outer surfaces of the superimposed elastomer strips while heating at a temperature in a range of from 250° F. to 340° F.

The laminates thus prepared were spirally wound in overlapping fashion, under tension, about hollow aluminum conduits. The laminates readily adhered to each other and to the aluminum conduits without any external force to hold them in place.

The wrapped conduits thus prepared were then heated at a temperature of about 350° F. for a period of about 1 hour. Upon examination of the specimens, it was found that the overlapped elastomer portions of the laminates had fused together into an essentially homogeneous cylindrical mass, and that the elastomer surfaces in contact with the outer surfaces of the aluminum conduits has become strongly adhered thereto.

Example 49

To an organopolysiloxane formulation identical with that employed and described in Example 44 was added 1.5 parts of dichlorobenzoyl peroxide during a compounding procedure conducted on a two-roll moll. The catalyzed formulation was mold-cured into thin elastomer strips in a thin section mold by heating at a temperature of 250° F. for a period of 15 minutes.

These elastomer strips were used to prepare a series of 3-ply laminates by superimposing strips of steel, phosphatized steel, aluminum, anodized aluminum, and copper on either side of said elastomer strips, and applying a pressure of approximately 1000 pounds per square inch to the outer surfaces of the superimposed metal strips while heating at a temperature of 480° F. for a period of 30 minutes. Upon examination of the specimens, it was found that the various metal strips were firmly bonded to the elastomer interlayers and could not be separated therefrom without damaging the elastomer.

Example 50

To an organopolysiloxane formulation identical with that employed and described in Example 44 was added 1.5 parts of dichlorobenzoyl peroxide during a compounding procedure conducted on a two-roll mill. The catalyzed formulation was mold-cured into a thin elastomer strip in a thin section mold by heating at a temperature of 250° F. for a period of 15 minutes.

This elastomer strip was used to prepare a 3-ply laminate by superimposing strips of glass sheet 3/16 of an inch in width on either side of said elastomer strip, and applying a pressure of approximately 50 pounds per square inch to the outer surfaces of the superimposed glass strips while heating at a temperature of about 480° F. for a period of about 10 hours. Upon examination of the specimen, it was found that the glass strips were firmly bonded to the elastomer interlayer and could not be separated therefrom by manual force. The bond effected between the glass strips and such elastomer was such that when the laminate was subjected to a blow by a hammer, the glass shattered but was held in place by the elastomer interlayer.

Example 51

To an organopolysiloxane formulation identical with that employed and described in Example 44 was added 1.5 parts of dichlorobenzoyl peroxide during a compounding procedure conducted on a two-roll mill. The catalyzed formulation was mold-cured into a thin elastomer strip in a thin section mold by heating at a temperature of 250° F. for a period of 15 minutes.

The elastomer strip was used to prepare a 3-ply laminate by superimposing strips of aluminum foil on either side of said elastomer strip, and applying pressure to the outer surfaces of the superimposed aluminum foil while heating at a temperature of 480° F. for a period of about 20 hours. The resulting laminate was quite flexible and exhibited an excellent aluminum foil-to-elastomer bond.

Example 52

An organopolysiloxane formulation was prepared by compounding the following ingredients on a two-roll mill:

(A) 100 parts by weight of a linear polysiloxane gum containing 99.65 percent by weight dimethylsiloxane units and 0.35 percent by weight ethylvinylsiloxane units;
(B) 35 parts by weight of highly-reinforcing, finely-divided silica;
(C) 2 parts by weight of iron oxide;
(D) 15 parts by weight of a hydroxy-endblocked dimethylpolysiloxane oil (having an average molecular weight of about 1080 and an average hydroxyl content of about 3 percent by weight);
(E) 1 part by weight of diphenyldiethoxysilane;
(F) 1 part by weight of diphenylsilanediol;
(G) 0.5 part by weight of boric acid; and
(H) 1 part by weight of tetraisopropyl titanate.

This formulation was characterized by good "green strength" properties and could be easily stretched without tearing. This formulation was added to sufficient toluene to provide a dispersion containing from about 28 to about 35 percent by weight dispersed solids. To the dispersion was added 3 parts by weight of crystalline benzoyl peroxide.

Several pieces of No. 116 glass cloth, previously heat cleaned, were dipped into the dispersion and then heated at a temperature of about 300° F. for a period of about one-half hour. An organopolysiloxane elastomer coating of approximately 3 mils was deposited on each of the glass cloths as a result of the treatment. When the coated cloths were once again dipped into the dispersion and the organopolysiloxane formulation cured thereon in a manner similar to that described above, the overall thickness of the organopolysiloxane elastomer coating on each of the glass cloths was found to be approximately 11 mils. The coated glass cloths were then cut into smaller specimens and the crease strength (a measure of elastomer to glass cloth bond) and dielectric strength of the specimens evaluated. The crease strength was found to be 120 lb./inch and the dielectric strength was found to be 1125 volts/mil.

Pieces of commercially obtained No. 116 glass cloth (having a coating of starch or other material thereon as applied by the manufacturer) were dipped into the dispersion and cured in a manner similar to that described above. The coated glass cloths were then tested for crease strength and dielectric strength. The crease strength was found to be 135 lb./inch and the dielectric strength was found to be 1150 volts/mil.

Glass cloths coated with the improved pressure-sensitive organopolysiloxane elastomers of this invention are characterized by crease strength and dielectric strength properties which are generally as good as or better than those obtained with glass cloths coated with conventional organopolysiloxane elastomers, or glass cloths coated with elastomers modified with alkoxy-containing silicon compounds and hydroxy-containing silicon compounds, or glass cloths coated with elastomers which I have previously employed in preparing composite articles. Glass cloths coated with elastomers prepared from the above formulation exhibit a strong tendency to adhere to each other and to other materials; this tendency is particularly noticeable when adhesion is effected between the coated glass cloths themselves, or between the coated glass cloths and such materials as paper, steel, aluminum, tin, bronze and the like. Oftentimes the bond effected is so adhesive that the elastomer cannot be separated without damage thereto. Elastomers prepared from the above formulation retain their adhesive properties even after postcures of 24 hours at 250° C.

Example 53

A glass cloth-supported tape was prepared in accordance with the procedure described in Example 52 and spirally wound in overlapping fashion, under tension, about a circular steel bar which was wrapped with a film of polytetrafluoroethylene (in order to prevent adhesion of the elastomer to the steel). The tape remained firmly in place without any external force to hold it in place.

The bar thus wrapped in elastomer-coated tape was heated in an air oven at a temperature of 480° F. for a period of 30 minutes. Upon examination of the specimen, it was found that the overlapped elastomer portions of the tape had fused together into an essentially homogeneous cylindrical mass and could not be separated without damage to the elastomer. Since the steel bar was wrapped with polytetrafluoroethylene, the fused cylindrical body thus formed could be removed therefrom by the application of a pulling force. Upon examination, this duct-like structure was found to be quite rigid and strong.

*Example 54*

An electrical transformer was dipped into a dispersion prepared in accordance with the procedure described in Example 52, allowed to air dry for a period of 10 minutes, and then heated at a temperature of about 300° F. for a period of 15 minutes in order to cure the organopolysiloxane formulation deposited thereon to an elastomer. This procedure was repeated seven times in order to provide a homogeneous coating about the transformer. The cured elastomer coating on the transformer was then postcured by heating at a temperature of 480° F. for a period of 4 hours. Upon examination of the specimen, it was found that the elastomer coating was firmly bonded to the metal parts of the transformer.

*Example 55*

An organopolysiloxane formulation identical with that employed and described in Example 52 was added to sufficient toluene to provide a dispersion containing from about 28 to about 35 percent by weight dispersed solids. To the dispersion was added 3 parts by weight (per 100 parts gum) of crystalline benzoyl peroxide.

Strips of cotton, wool, nylon (the condensation polymer of hexamethylenediamine with adipic acid) and dacron (the condensation polymer of methylterephthalate with ethylene glycol) cloth were dipped into the dispersion, air dried, and then heated at a temperature of about 300° F. for a period of 15 minutes in order to cure the organopolysiloxane formulation deposited thereon to an elastomer. This procedure was repeated until the overall thickness of the organopolysiloxane elastomer coating on the cloths was approximately 11 mils. The elastomer-coated strips thus prepared were spirally wound in overlapping fashion, under tension, about hollow aluminum conduits. The strips readily adhered to each other and to the aluminum conduits without any external force to hold them in place.

The conduits thus wrapped in elastomer-coated strips were heated for periods of time ranging from 30 minutes to 2 hours at temperatures ranging from 325° F. to 480° F. Upon examination of the specimens, it was found that the overlapped elastomer portions of the strips had fused together into an essentially homogeneous cylindrical mass, and that the elastomer surfaces in contact with the outer surfaces of the aluminum conduits had become strongly adhered thereto.

*Example 56*

To an organopolysiloxane formulation identical with that employed and described in Example 52 was added 1.5 parts of dichlorobenzoyl peroxide during a compounding procedure conducted on a two-roll mill. The catalyzed formulation was mold-cured into thin elastomer strips in a thin section mold by heating at a temperature of 250° F. for a period of 15 minutes.

These elastomer strips were used to prepare a series of 3-ply laminates by superimposing two elastomer strips on either side of strips of cloth, wool, cotton and nylon and applying a pressure of approximately 300 pounds per square inch to the outer surfaces of the superimposed elastomer strips while heating at a temperature in a range of from 250° F. to 340° F.

The laminates thus prepared were spirally wound in overlapping fashion, under tension, about hollow aluminum conduits. The laminates readily adhered to each other and to the aluminum conduits without any external force to hold them in place.

The wrapped conduits thus prepared were then heated at a temperature of about 350° F. for a period of about 1 hour. Upon examination of the specimens, it was found that the overlapped elastomer portions of the laminates had fused together into an essentially homogeneous cylindrical mass, and that the elastomer surfaces in contact with the outer surfaces of the aluminum conduits had become strongly adhered thereto.

*Example 57*

To an organopolysiloxane formulation identical with that employed and described in Example 52 was added 1.5 parts of dichlorobenzoyl peroxide during a compounding procedure conducted on a two-roll mill. The catalyzed formulation was mold-cured into thin elastomer strips in a thin section mold by heating at a temperature of 250° F. for a period of 15 minutes.

These elastomer strips were used to prepare a series of 3-ply laminates by superimposing strips of steel, phosphatized steel, aluminum, anodized aluminum, and copper on either side of said elastomer strips, and applying a pressure of approximately 1000 pounds per square inch to the outer surfaces of the superimposed metal strips while heating at a temperature of 480° F. for a period of 30 minutes. Upon examination of the specimens, it was found that the various metal strips were firmly bonded to the elastomer interlayers and could not be separated therefrom without damaging the elastomer.

*Example 58*

To an organopolysiloxane formulation identical with that employed and described in Example 52 was added 1.5 parts of dichlorobenzoyl peroxide during a compounding procedure conducted on a two-roll mill. The catalyzed formulation was mold-cured into a thin elastomer strip in a thin section mold by heating at a temperature of 250° F. for a period of 15 minutes.

This elastomer strip was used to prepare a 3-ply laminate by superimposing strips of glass sheet 3/16 of an inch in width on either side of said elastomer strip, and applying a pressure of approximately 50 pounds per square inch to the outer surfaces of the superimposed glass strips while heating at a temperature of about 480° F. for a period of about 10 hours. Upon examination of the specimen, it was found that the glass strips were firmly bonded to the elastomer interlayer and could not be separated therefrom by manual force. The bond effected between the glass strips and such elastomer was such that when the laminate was subjected to a blow by a hammer, the glass shattered but was held in place by the elastomer interlayer.

*Example 59*

To an organopolysiloxane formulation identical with that employed and described in Example 52 was added 1.5 parts of dichlorobenzoyl peroxide during a compounding procedure conducted on a two-roll mill. The catalyzed formulation was mold-cured into a thin elastomer strip in a thin section mold by heating at a temperature of 250° F. for a period of 15 minutes.

The elastomer strip was used to prepare a 3-ply laminate by superimposing strips of aluminum foil on either side of said elastomer strip, and applying pressure to the outer surfaces of the superimposed aluminum foil while heating at a temperature of 480° F. for a period of about 20 hours. The resulting laminate was quite flexible and exhibited an excellent aluminum foil-to-elastomer bond.

Example 60

Thin organopolysiloxane elastomer tapes were prepared by compounding (by means of a two-roll mill), and heating in a thin section mold, at a temperature of 350° F. for a period of 15 minutes, a formulation comprising:

(A) 100 parts by weight of a linear polysiloxane gum containing 12 percent by weight diphenylsiloxane units, 0.35 percent by weight ethylvinylsiloxane units, and 87.65 percent by weight dimethylsiloxane units;

(B) 3 parts by weight of an ethoxy-endblocked polysiloxane oil containing dimethylsiloxane units, methylphenylsiloxane units, and methylvinylsiloxane units, and having an average of 1.5 ethoxy groups bonded to each of the terminal silicon atoms;

(C) 3 parts by weight of hydroxy-endblocked polysiloxane oil containing dimethylsiloxane units, methylphenylsiloxane units, and methylvinylsiloxane units, and having an average of 1 hydroxyl group bonded to each of the terminal silicon atoms;

(D) 0.5 part by weight of diphenyldiethoxysilane;
(E) 0.5 part by weight of diphenylsilanediol;
(F) 0.5 part by weight of boric acid;
(G) 1 part by weight tetraisopropyl titanate;
(H) 35 parts by weight of highly-reinforcing, finely-divided silica; and
(I) 1.8 parts by weight of dichlorobenzoyl peroxide.

These elastomer strips were used to prepare a series of 3-ply laminates similar in structure to those of Examples 12, 13, 14, and 15 (except for the composition of the elastomer) with the aid of pressure at temperatures ranging from 250° F. to 480° F. The resulting laminates exhibited excellent elastomer-to-metal, elastomer-to-glass, and elastomer-to-cloth bonds.

Example 61

An organopolysiloxane formulation was prepared by compounding the following ingredients on a two-roll mill:

(A) 100 parts by weight of a linear polysiloxane gum containing 50 percent by weight gamma-cyanopropylmethylsiloxane units and 50 percent by weight dimethylsiloxane units;

(B) 3 parts by weight of an ethoxy-endblocked polysiloxane oil containing dimethylsiloxane units, methylphenylsiloxane units, and methylvinylsiloxane units, and having an average of 1.5 ethoxy groups bonded to each of the terminal silicon atoms;

(C) 3 parts by weight of a hydroxy-endblocked polysiloxane oil containing dimethylsiloxane units, methylphenylsiloxane units, and methylvinylsiloxane units, and having an average of 1 hydroxyl group bonded to each of the terminal silicon atoms;

(D) 0.5 part by weight of methylphenyldiethoxysilane;
(E) 0.5 part by weight of diphenylsilanediol;
(F) 0.5 part by weight of boric acid;
(G) 1 part by weight of tetraisopropyl titanate;
(H) 40 parts by weight of highly-reinforcing, finely-divided silica; and
(I) 2 parts by weight of iron oxide.

This formulation was characterized by good "green strength" properties and could be easily stretched without tearing. This formulation was added to sufficient toluene to provide a dispersion containing about 30 percent by weight dispersed solids. To the dispersion was added 3.5 parts by weight of crystalline benzoyl peroxide.

A strip of No. 116 glass cloth, previously heat cleaned, was dipped into the dispersion, allowed to air dry, and then heated at a temperature of about 300° F. for a period of 15 minutes in order to cure the organopolysiloxane formulation deposited thereon to an elastomer. This procedure was repeated until the overall thickness of the organopolysiloxane elastomer coating was approximately 10 mils.

When the glass cloth-supported tape thus prepared was spirally wound in overlapping fashion, under tension, about an electric cable, it readily adhered to itself and to the electric cable without any external force to hold it in place.

The cable thus wrapped in elastomer-coated tape was heated at a temperature of 300° F. for a period of 4 hours. Upon examination of the specimen, it was found that the overlapped portions of the tape had fused in an essentially homogeneous cylindrical mass, and that the elastomer surfaces in contact with the surface of the cable had become strongly adhered thereto.

Example 62

An organopolysiloxane formulation was prepared by compounding the following ingredients on a two-roll mill:

(A) 100 parts by weight of a linear polysiloxane gum containing 0.35 percent by weight methylvinylsiloxane units and 99.65 percent by weight dimethylsiloxane units;

(B) 3 parts by weight of an ethoxy-endblocked polysiloxane oil containing dimethylsiloxane units, methylphenylsiloxane units, and methylvinylsiloxane units, and having an average of 1 ethoxy group bonded to each of the terminal silicon atoms;

(C) 3 parts by weight of a hydroxy-endblocked polysiloxane oil containing dimethylsiloxane units, methylphenylsiloxane units, and methylvinylsiloxane units, and having an average of 1 hydroxyl group bonded to each of the terminal silicon atoms;

(D) 0.5 part by weight of diphenyldiethoxysilane;
(E) 0.5 part by weight of diphenylsilanediol;
(F) 0.5 part by weight of boric acid;
(G) 1 part by weight of tetraisopropyl titanate;
(H) 50 parts by weight of carbon black; and
(I) 8 parts by weight of highly-reinforcing, finely-divided silica.

This formulation was characterized by good "green strength" properties and could be easily stretched without tearing. This formulation was added to sufficient toluene to provide a dispersion containing about 30 percent by weight dispersed solids. To the dispersion was added 3 parts by weight of dicumyl peroxide.

Several strips of No. 116 glass cloth, previously heat cleaned, were dipped into the dispersion, allowed to air dry, and then heated at a temperature of about 300° F. for a period of 15 minutes in order to cure the organopolysiloxane formulation deposited thereon to an elastomer. This procedure was repeated until the overall thickness of the organopolysiloxane elastomer coating was approximately 8 mils.

The glass cloth-supported tapes thus prepared readily adhered to glass plates, steel sheets, and nylon film. When such materials were superimposed on either side of said tapes and pressure applied to the outer surfaces of the superimposed materials while heating at a temperature of about 300° F., relatively strong bonds were obtained.

What is claimed is:

1. A heat-curable composition of matter suitable for use in the production of diorganopolysiloxane elastomers which comprises (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount of from about one part by weight to about 100 parts by weight to 100 parts by weight of said gum, said silicon compounds being selected from the class consisting of silanes, silicates, polysilicates and organopolysiloxane oils (3) a reinforcing amount of a filler selected from the class consisting of finely-divided silica fillers, reinforcing carbon black fillers, and mixtures of said silica and said carbon black fillers, (4) a titanium ortho ester having the formula $Ti(OR')_4$ wherein $R'$ is an alkyl group containing from 1 to 18 carbon atoms, and (5) an organic peroxide curing catalyst.

2. A heat-curable composition of matter suitable for use in the production of diorganopolysiloxane elastomers which comprises (1) a linear diorganopolysiloxane gum, (2) at least one compound selected from the class consisting of silicon compounds containing at least one silicon-bonded alkoxy group and silicon compounds containing at least one silicon-bonded hydroxy group in a total amount of from about one part by weight to about 100 parts by weight per 100 parts by weight of said gum, said silicon compounds being selected from the class consisting of silanes, silicates, polysilicates and organopolysiloxane oils, (3) a reinforcing amount of a filler selected from the class consisting of finely-divided silica fillers, reinforcing carbon black fillers, and mixtures of said silica and said carbon black fillers, (4) a titanium ortho ester having the formula Ti(OR')$_4$ wherein R' is an alkyl group containing from 1 to 18 carbon atoms, (5) a boron-containing compound selected from the group consisting of the boric acids, the esters of boric acid, boron anhydride, the boron hydrides, complexes of the boron hydrides with ammonia, alkali metal derivatives of boric acids, and (6) an organic peroxide curing catalyst.

3. A heat-curable composition of matter suitable for use in the production of diorganopolysiloxane elastomers which comprises (1) a linear diorganopolysiloxane gum containing hyrocarbon groups free of aliphatic unsaturation and olefinically unsaturated hydrocarbon groups, said hydrocarbon groups free of aliphatic unsaturation being selected from the class consisting of methyl, ethyl, and phenyl groups, and said olefinically-unsaturated hydrocarbon groups being selected from the class consisting of vinyl, allyl and cyclohexenyl groups and wherein from 0.037 to 0.70 percent of the silicon atoms present in the diorganopolysiloxane gum are bonded to olefinically-unsaturated groups (2) at least one polysiloxane oil selected from the class consisting of dihydrocarbon-substituted alkoxyendblocked polysiloxane oils and dihydrocarbon-substituted hydroxyendblocked polysiloxane oils in a total amount of from about one part by weight to about 100 parts by weight per 100 parts by weight of said gum, said hydrocarbon substituents being selected from the class consisting of methyl, ethyl, vinyl, allyl, cyclohexenyl and phenyl groups (3) a reinforcing amount of a finely-divided silica filler, (4) a titanium ortho ester having the formula Ti(OR')$_4$ wherein R' is an alkyl group containing from 1 to 18 carbon atoms, in an amount between about 0.1 part by weight and about 10 parts by weight per 100 parts by weight of said gum, and (5) an organic peroxide curing catalyst.

4. A heat-curable composition of matter suitable for use in the production of diorganopolysiloxane elastomers which comprises (1) a linear diorganopolysiloxane gum (2) at least one polysiloxane oil selected from the class consisting of dihydrocarbon-substituted, alkoxy-endblocked polysiloxane oils and dihydrocarbon-substituted, hydroxy-endblocked polysiloxane oils in an amount between about one part by weight and about 100 parts by weight per 100 parts by weight of said gum, (3) a boron-containing compound selected from the group consisting of the boric acids, the esters of boric acid, boron anhydride, the boron hydrides, complexes of the boron hydrides with ammonia, alkali metal derivatives of boric acids and alkaline earth metal derivatives of boric acids in an amount between about 0.05 part by weight and about 10 parts by weight of said gum, (4) titanium ortho ester having the formula Ti(OR')$_4$ wherein R' is an alkyl group containing from 1 to 18 carbon atoms in an amount between about 0.1 part by weight and about 10 parts by weight per 100 parts by weight of said gum, (5) a reinforcing amount of a filler selected from the class consisting of finely-divided silica fillers, reinforcing carbon black fillers, mixtures of said silica and said carbon black fillers, and mixtures of said silica fillers and iron oxide, and (6) an organic peroxide curing catalyst.

5. A heat-curable composition of matter suitable for use in the production of diorganopolysiloxane elastomers which comprises (1) a linear diorganopolysiloxane gum containing dimethylsiloxane units and ethylvinylsiloxane units wherein from 0.037 to 0.70 percent of the silicon atoms present in the siloxane gum are bonded to olefincially unsaturated hydrocarbon groups; (2) from about one part by weight to about 100 parts by weight per 100 parts by weight of said gum of an ethoxy-endblocked dimethylpolysiloxane oil containing from 2 to about 35 silicon atoms per molecule and from about 5 weight percent to about 25 weight percent of ethoxy groups per molecule; (3) a reinforcing amount of a finely-divided silica filler, (4) tetraisopropyl titanate; and (5) dichlorobenzoyl peroxide.

6. A heat-curable composition of matter suitable for use in the production of diorganopolysiloxane elastomers which comprises (1) a linear diorganopolysiloxane gum containing dimethylsiloxane units and ethylvinylsiloxane units wherein from 0.037 to 0.70 percent of the silicon atoms present in the siloxane gum are bonded to olefinically-unsaturated hydrocarbon groups; (2) from about one part by weight to about 100 parts by weight per 100 parts by weight of said gum of an ethoxy-endblocked dimethylpolysiloxane oil containing from 2 to about 35 silicon atoms per molecule and from about 5 weight percent to about 25 weight percent of ethoxy groups per molecule; (3) a reinforcing amount of a finely-divided silica filler; (4) tetraisopropyl titanate; and (5) dichlorobenzoyl peroxide.

7. A heat-curable composition of matter suitable for use in the production of diorganopolysiloxane elastomers which comprises (1) a linear diorganopolysiloxane gum containing dimethylsiloxane units and ethylvinylsiloxane units wherein from 0.037 to 0.70 percent of the silicon atoms present in the siloxane gum are bonded to olefinically-unsaturated hydrocarbon groups; (2) from about 1 part by weight to about 100 parts by weight per 100 parts by weight of said gum of a hyroxy-endblocked dimethylpolysiloxane oil containing from 4 to about 20 silicon atoms per molecule and containing silicon-bonded hydroxyl groups in an amount up to about 3.5 percent by weight of said oil; (3) a reinforcing amount of a finely-divided silica filler; (4) tetra-2-ethylhexyl titanate and (5) dichlorobenzoyl peroxide.

8. A heat-curable composition of matter suitable for use in the production of diorganopolysiloxane elastomers which comprises (1) a linear diorganopolysiloxane gum containing dimethylsiloxane units and ethylvinylsiloxane units wherein from 0.037 to 0.70 percent of the silicon atoms present in the siloxane gum are bonded to olefinically-unsaturated hydrocarbon groups; (2) from about one part by weight to about 100 parts by weight per 100 parts by weight of said gum of a hydroxy-endblocked dimethylpolysiloxane oil containing from 4 to about 20 silicon atoms per molecule and containing silicon-bonded hydroxyl groups in an amount up to about 3.5 percent by weight of said oil; (3) a reinforcing amount of a finely-divided silica filler; (4) tetraisopropyl titanate and (5) dichlorobenzoyl peroxide.

9. A heat-curable composition of matter suitable for use in the production of diorganopolysiloxane elastomers which comprises (1) a linear diorganopolysiloxane gum containing dimethylsiloxane units and ethylvinylsiloxane units wherein from 0.037 to 0.70 percent of the silicon atoms present in the siloxane gum are bonded to olefinically-unsaturated hydrocarbon groups; (2) from about one part by weight to about 100 parts by weight per 100 parts by weight of said gum of a hydroxy-endblocked dimethylpolysiloxane oil containing from 4 to about 20 silicon atoms per molecule and containing silicon-bonded hydroxyl groups in an amount up to about 3.5 percent by weight of said oil; (3) a reinforcing amount of a finely-divided silica filler; (4) tetra-n-butyl titanate; and (5) dichlorobenzoyl peroxide.

10. A process for preparing an organopolysiloxane elastomer which comprises forming a formulation comprising (1) a linear diorganopolysiloxane gum containing hydrocarbon groups free of aliphatic unsaturation and olefinically unsaturated hydrocarbon groups, said hydrocarbon groups free of aliphatic unsaturation being selected from the class consisting of methyl, ethyl and phenyl groups, and said olefinically-unsaturated hydrocarbon groups being selected from the class consisting of vinyl, allyl and cyclohexenyl groups and wherein from 0.037 to 0.70 percent of the slicon atoms present in the diorganopolysiloxane gum are bonded to olefinically-unsaturated groups, (2) at least one polysiloxane oil selected from the class consisting of dihydrocarbon-substituted alkoxy-endblocked polysiloxane oils and dihydrocarbon-substituted hydroxy-endblocked polysiloxane oils in a total amount of from about one part by weight to about 100 parts by weight per 100 parts by weight of said gum, said hydrocarbon substituents being selected from the class consisting of methyl, ethyl, vinyl, allyl, cyclohexenyl and phenyl groups, (3) a reinforcing amount of a finely-divided silica filler, (4) a hydrolyzable titanium-containing compound represented by the formula $R_nTi(OR')_{4-n}$, where R is a monovalent organic group containing from 1 to 18 carbon atoms, R' contains from 1 to 18 carbon atoms and is selected from the class consisting of hydrogen atoms, R groups and

groups, and $n$ is zero or an integer of from 1 to 3, in an amount between about 0.1 parts by weight and about 10 parts by weight per 100 parts by weight of said gum, (5) an organic peroxide curing catalyst and heating the formulation to a temperature sufficiently elevated to cure said formulation to an organopolysiloxane elastomer.

11. A process for preparing an organopolysiloxane elastomer which comprises forming a formulation comprising (1) a linear diorganopolysiloxane gum (2) at least one polysiloxane oil selected from the class consisting of dihydrocarbon - substituted alkoxy - endblocked polysiloxane oils and dihydrocarbon-substituted hydroxy-endblocked polysiloxane oils in an amount between about one part by weight and about 100 parts by weight per 100 parts by weight of said gum, (3) a boron-containing compound selected from the group consisting of the boric acids, the esters of boric acid, boron anhydride, the boron hydrides, complexes of the boron hydrides with ammonia, alkali metal derivatives of boric acids and alkaline earth metal derivatives of boric acids in an amount between about 0.05 part by weight and about 10 parts by weight of said gum, (4) a hydrolyzable titanium-containing compound represented by the formula $R_nTi(OR')_{4-n}$, wherein R is a monovalent organic group containing from 1 to 18 carbon atoms, R' contains from 1 to 18 carbon atoms and is selected from the class consisting of hydrogen atoms, R groups and

groups, and $n$ is zero or an integer of from 1 to 3, in an amount between about 0.1 parts by weight and about 10 parts by weight per 100 parts by weight of said gum, (5) a reinforcing amount of a filler selected from the class consisting of finely-divided silica fillers, reinforcing carbon black fillers, mixtures of said silica and said carbon black fillers, and mixtures of said silica fillers and iron oxide, and (6) an organic peroxide curing catalyst and heating the formulation to a temperature sufficiently elevated to cure said formulation to an organopolysiloxane elastomer.

12. An elastomer which comprises the heat-cured product of a formulation comprising (1) a linear diorganopolysiloxane gum containing hydrocarbon groups free of aliphatic unsaturation and olefinically unsaturated hydrocarbon groups, said hydrocarbon groups free of aliphatic unsaturation being selected from the class consisting of methyl, ethyl and phenyl groups, and said olefinically-unsaturated hydrocarbon groups being selected from the class consisting of vinyl, allyl and cyclohexenyl groups, and wherein from 0.037 to 0.70 percent of the silicon atoms present in the diorganopolysiloxane gum are bonded to olefinically-unsaturated groups, (2) at least one polysiloxane oil selected from the class consisting of dihydrocarbon-substituted alkoxy-endblocked polysiloxane oils and dihydrocarbon-substituted hydroxy-endblocked polysiloxane oils in a total amount of from about one part by weight to about 100 parts by weight per 100 parts by weight of said gum, said hydrocarbon substituents being selected from the class consisting of methyl, ethyl, vinyl, allyl, cyclohexenyl and phenyl groups, (3) a reinforcing amount of a finely-divided silica filler, (4) a titanium ortho ester having the formula $Ti(OR')_4$ wherein R' is an alkyl group containing from 1 to 18 carbon atoms, in an amount between about 0.1 part by weight and about 10 parts by weight per 100 parts by weight of said gum, (5) an organic peroxide curing catalyst.

13. An elastomer which comprises the heat-cured produtc of a formulation comprising (1) a linear diorganopolysiloxane gum, (2) at least one polysiloxane oil selected from the class consisting of dihydrocarbon-substituted alkoxy-endblocked polysiloxane oils and di-hydrocarbon-substituted hydroxy-endblocked polysiloxane oils in an amount between about one part by weight and about 100 parts by weight per 100 parts by weight of said gum, (3) a boron-containing compound selected from the group consisting of the boric acids, the esters of boric acid, boron anhydride, the boron hydrides, complexes of the boron hydrides with ammonia, alkali metal derivatives of boric acids and alkaline earth metal derivatives of boric acids in an amount between about 0.05 part by weight and about 10 parts by weight of said gum, (4) a titanium ortho ester having the formula $Ti(OR')_4$ wherein R' is an alkyl group containing from 1 to 18 carbon atoms in an amount between about 0.1 part by weight and about 10 parts by weight per 100 parts by weight of said gum, (5) a reinforcing amount of a filler selected from the class consisting of finely-divided silica fillers, reinforcing carbon black fillers, mixtures of said silica and said carbon black fillers, and mixtures of said silica fillers and iron oxide and (6) an organic peroxide curing catalyst.

14. An elastomer which comprises the heat-cured product of a formulation comprising (1) a linear diorganopolysiloxane gum containing dimethylsiloxane units and ethylvinylsiloxane units wherein from 0.037 to 0.70 percent of the silicon atoms present in the siloxane gum are bonded to olefinically unsaturated hydrocarbon groups; (2) from about one part by weight to about 100 parts by weight per 100 parts by weight of said gum of an ethoxy-endblocked dimethylpolysiloxane oil containing from 2 to about 35 silicon atoms per molecule and from about 5 weight percent to about 25 weight percent of ethoxy groups per molecule; (3) a reinforcing amount of a finely-divided silica filler; (4) tetra-2-ethylhexyl titanate; and (5) dichlorobenzoyl peroxide.

15. An elastomer which comprises the heat-cured product of a formulation comprising (1) a linear diorganopolysiloxane gum containing dimethylsiloxane units and ethylvinylsiloxane units wherein from 0.037 to 0.70 percent of the silicon atoms present in the siloxane gum are bonded to olefinically unsaturated hydrocarbon groups; (2) from about one part by weight to about 100 parts by weight per 100 parts by weight of said gum of an ethoxy-endblocked dimethylpolysiloxane oil containing from 2 to about 35 silcon atoms per molecule and from about 5 weight percent to about 25 weight percent of ethoxy groups per molecule; (3) a reinforcing amount of a finely-divided silica filler; (4) tetraisopropyl titanate; and (5) dichlorobenzoyl peroxide.

16. An elastomer which comprises the heat-cured product of a formulation comprising (1) a linear diorganopolysiloxane gum containing dimethylsiloxane units and ethylvinylsiloxane units wherein from 0.037 to 0.70 percent of the silicon atoms present in the siloxane gum are bonded to olefinically-unsaturated hydrocarbon groups; (2) from about one part by weight to about 100 parts by weight per 100 parts by weight of said gum of a hydroxy-endblocked dimethylpolysiloxane oil containing from 4 to about 20 silicon atoms per molecule and containing silicon-bonded hydroxyl groups in an amount up to about 3.5 percent by weight of said oil; (3) a reinforcing amount of a finely-divided silica filler; (4) tetra-2-ethylhexyl titanate; and (5) dichlorobenzoyl peroxide.

17. An elastomer which comprises the heat-cured product of a formulation comprising (1) a linear diorganopolysiloxane gum containing dimethylsiloxane units and ethylvinylsiloxane units wherein from 0.037 to 0.70 percent of the silicon atoms present in the siloxane gum are bonded to olefinically-unsaturated hydrocarbon groups; (2) from about one part by weight to about 100 parts by weight per 100 parts by weight of said gum of a hydroxy-endblocked dimethylpolysiloxane oil containing from 4 to about 20 silicon atoms per molecule and containing silicon-bonded hydroxyl groups in an amount up to about 3.5 percent by weight of said oil; (3) a reinforcing amount of a finely-divided silica filler; (4) tetra-isopropyl titanate; and (5) dichlorobenzoyl peroxide.

18. An elastomer which comprises the heat-cured product of a formulation comprising (1) a linear diorganopolysiloxane gum containing dimethylsiloxane units and ethylvinylsiloxane units wherein from 0.037 to 0.70 percent of the silicon atoms present in the siloxane gum are bonded to olefinically-unsaturated hydrocarbon groups; (2) from about one part by weight to about 100 parts by weight per 100 parts by weight of said gum of a hydroxy-endblocked dimethylpolysiloxane oil containing from 4 to about 20 silicon atoms per molecule and containing silicon-bonded hydroxyl groups in an amount up to about 3.5 percent by weight of said oil; (3) a reinforcing amount of a finely-divided silica filler; (4) tetra-n-butyl titanate; and (5) dichlorobenzoyl peroxide.

19. The combination which comprises a layer of unsupported pressure-sensitive, adhesive elastomer having at least one surface thereof in contact with a layer of a material toward which said elastomer exhibits a limited degree of adhesion and from which said elastomer can be readily stripped away, said elastomer being the heat-cured product of an organopolysiloxane formulation comprising (1) a linear diorganopolysiloxane gum, (2) at least one polysiloxane oil selected from the class consisting of dihydrocarbon-substituted, alkoxy-endblocked polysiloxane oils and dihydrocarbon-substituted, hydroxy-endblocked polysiloxane oils in an amount between about one part by weight and about 100 parts by weight per 100 parts by weight of said gum, (3) a boron-containing compound selected from the group consisting of the boric acids, the esters of boric acid, boron anhydride, the boron hydrides, complexes of the boron hydrides with ammonia, alkali metal derivatives of boric acids and alkaline earth metal derivatives of boric acids in an amount between about 0.05 part by weight and about 10 parts by weight per 100 parts by weight of said gum, (4) a titanium ortho ester having the formula $Ti(OR')_4$ wherein $R'$ is an alkyl group containing from 1 to 18 carbon atoms in an amount between about 0.1 part by weight and about 10 parts by weight per 100 parts by weight of said gum, (5) a reinforcing amount of a filler selected from the class consisting of finely-divided silica fillers, reinforcing carbon black fillers, mixtures of said silica and said carbon black fillers, and mixtures of said silica fillers and iron oxide, and (6) an organic peroxide catalyst.

20. A tape roll which comprises a right circular cylindrical core, an unsupported pressure-sensitive adhesive tape wound in concentric overlapping layers around said core, and an interlayer material toward which said tape exhibits a limited degree of adhesion and from which said tape can be readily stripped away separating said layers of tape, said interlayer material being selected from the group consisting of paper, wax coated paper, nylon, cellophane, polymers and copolymers of vinyl chloride and vinylidene chloride, polyethylene terephthalate resin and polyolefins, and said adhesive tape being the heat-cured product of an organopolysiloxane formulation comprising (1) a linear diorganopolysiloxane gum, (2) at least one polysiloxane oil selected from the class consisting of dihydrocarbon-substituted, alkoxy-endblocked polysiloxane oils and dihydrocarbon-substituted, hydroxy-endblocked polysiloxane oils in an amount between about one part by weight and about 100 parts by weight per 100 parts by weight of said gum, (3) a boron-containing compound selected from the group consisting of the boric acids, the esters of boric acid, boron anhydride, the boron hydrides, complexes of the boron hydrides with ammonia, alkali metal derivatives of boric acids and alkaline earth metal derivatives of boric acids in an amount between about 0.05 part by weight and about 10 parts by weight per 100 parts by weight of said gum, (4) a titanium ortho ester having the formula $Ti(OR')_4$ wherein $R'$ is an alkyl group containing from 1 to 18 carbon atoms in an amount between about 0.1 part by weight and about 10 parts by weight per 100 parts by weight of said gum, (5) a reinforcing amount of a filler selected from the class consisting of finely-divided silica fillers, reinforcing carbon black fillers, mixtures of said silica and said carbon black fillers, and mixtures of said silica fillers and iron oxide, and (6) an organic peroxide catalyst.

21. A composite article comprising a solid material having bonded to a surface thereof a pressure-sensitive organopolysiloxane elastomer, said elastomer being the cured product of an organopolysiloxane formulation comprising (1) a linear diorganopolysiloxane gum, (2) at least one polysiloxane oil selected from the class consisting of dihydrocarbon-substituted, alkoxy-endblocked polysiloxane oils and dihydrocarbon-substituted, hydroxy-endblocked polysiloxane oils in an amount between about one part by weight and about 100 parts by weight per 100 parts by weight of said gum, (3) a boron-containing compound selected from the group consisting of the boric acids, the esters of boric acid, boron anhydride, the boron hydrides, complexes of the boron hydrides with ammonia, alkali metal derivatives of boric acids and alkaline earth metal derivatives of boric acids in an amount between about 0.05 part by weight and about 10 parts by weight per 100 parts by weight of said gum, (4) a titanium ortho ester having the formula $Ti(OR')_4$ wherein $R'$ is an alkyl group containing from 1 to 18 carbon atoms in an amount between about 0.1 part by weight and about 10 parts by weight per 100 parts by weight of said gum, (5) a reinforcing amount of a filler selected from the class consisting of finely-divided silica fillers, reinforcing carbon black fillers, mixtures of said silica and said carbon black fillers, and mixtures of said silica fillers and iron oxide, and (6) an organic peroxide catalyst.

22. A duct structure comprising a conduit member of solid material, said conduit having bonded directly to the surfaces thereof a heat-cured elastomer, said elastomer prior to curing comprising (1) a linear diorganopolysiloxane gum, (2) at least one polysiloxane oil selected from the class consisting of dihydrocarbon-substituted, alkoxy-enblocked polysiloxane oils and dihydrocarbon-substituted, hydroxy-endblocked polysiloxane oils in an amount between about one part by weight and about 100 parts by weight per 100 parts by weight of said gum, (3) a boron-containing compound selected from the group consisting of the boric acids, the esters of boric acid, boron anhydride, the boron hydrides, complexes of the boron hydrides with ammonia, alkali metal derivatives of boric acids and alkaline earth metal derivatives of boric acids in an amount between about 0.05 part by weight and about 10 parts by weight per 100 parts by weight of said gum, (4) a titanium ortho ester having the formula $Ti(OR')_4$ wherein $R'$ is an alkyl group containing from 1 to 18 carbon atoms in an amount between about 0.1 part by weight and about 10 parts by weight per 100 parts by weight of said gum, (5) a reinforcing amount of a filler selected from the class consisting of finely-divided silica fillers, reinforcing carbon black fillers, mixtures of said silica and said carbon black fillers, and mixtures of said silica fillers and iron oxide, and (6) an organic peroxide catalyst.

23. A process for preparing a composite article, said composite article comprising a solid material having bonded directly to a surface thereof a pressure-sensitive organopolysiloxane elastomer, which process comprises applying to the surface of said solid material an organopolysiloxane formulation comprising (1) a linear diorganopolysiloxane gum, (2) at least one polysiloxane oil selected from the class consisting of dihydrocarbon-substituted, alkoxy-endblocked polysiloxane oils and dihydrocarbon-substituted, hydroxy-endblocked polysiloxane oils in an amount between about one part by weight and about 100 parts per 100 parts by weight of said gum, (3) a boron-containing compound selected from the group consisting of the boric acids, the esters of boric acid, boron anhydride, the boron hydrides, complexes of the boron hydrides with ammonia, alkali metal derivatives of boric acids and alkaline earth metal derivatives of boric acids in an amount between about 0.05 part by weight and about 10 parts by weight per 100 parts by weight of said gum, (4) a titanium ortho ester having the formula Ti(OR')$_4$ wherein R' is an alky group containing from 1 to 18 carbon atoms in an amount between about 0.1 part by weight and about 10 parts by weight per 100 parts by weight of said gum, (5) a reinforcing amount of a filler selected from the class consisting of finely-divided silica fillers, reinforcing carbon black fillers, mixtures of said silica and said carbon black fillers, and mixtures of said silica fillers and iron oxide, and (6) an organic peroxide catalyst, and heating the resulting composite to a temperature sufficiently devoted to cure said formulation to an elastomer and at the same time firmly adhere said cured elastomer to said solid material.

24. The combination which comprises a layer of supported pressure sensitive adhesive elastomer having at least one surface thereof in contact with a layer of a material toward which said elastomer exhibits a limited degree of adhesion and from which said elastomer can be readily stripped away, said supported elastomer comprising a solid flexible base member having bonded directly to a surface thereof a pressure-sensitive organopolysiloxane elastomer, said elastomer being the cured product of an organopolysiloxane formulation comprising (1) a linear diorganopolysiloxane gum, (2) at least one polysiloxane oil selected from the class consisting of dihydrocarbon-substituted, alkoxy-endblocked polysiloxane oils and dihydrocarbon-substituted, hydroxy-endblocked polysiloxane oils in an amount between about one part by weight and about 100 parts by weight per 10 parts by weight of said gum, (3) a boron-containing compound selected from the group consisting of the boric acids, the esters of boric acids, boron anhydride, the boron hydrides, complexes of the boron hydrides with ammonia, alkali metal derivatives of boric acids and alkaline earth metal derivatives of boric acids in an amount between about 0.5 part by weight and about 10 parts by weight per 100 parts by weight of said gum, (4) a titanium ortho ester having the formula Ti(OR')$_4$ wherein R' is an alkyl group containing from 1 to 18 carbon atoms in an amount between about 0.1 part by weight and about 10 parts by weight per 100 parts by weight of said gum, (5) a reinforcing amount of a filler selected from the class consisting of finely-divided silica fillers, reinforcing carbon black fillers, mixtures of said silica and said carbon black fillers, and mixtures of said silica fillers and iron oxide, and (6) an organic peroxide catalyst.

25. A tape roll which comprises a right circular cylindrical core, a pressure-sensitive adhesive tape wound in concentric overlapping layers around said core, and an interlayer material toward which said tape exhibits a limited degree of adhesion and from which said tape can be readily stripped away separating said layers of tape, said interlayer material being selected from the group consisting of paper, wax coated paper, nylon, cellophane, polymers and copolymers of vinyl chloride and vinylidene chloride, polyethylene terephthalate resin and polyolefins, and said tape comprising a solid flexible base member having bonded directly to a surface thereof a pressure-sensitive organopolysiloxane elastomer, said elastomer being the cured product of an organopolysiloxane formulation comprising (1) a linear diorganopolysiloxane gum, (2) at least one polysiloxane oil selected from the class consisting of dihydrocarbon-substituted, alkoxy-endblocked polysiloxane oils and dihydrocarbon-substituted, hydroxy-endblocked polysiloxane oils in an amount between about one part by weight and about 100 parts by weight per 100 parts by weight of said gum, (3) a boron-containing compound selected from the group consisting of the boric acids, the esters of boric acid, boron anhydride, the boron hydrides, complexes of the boron hydrides with ammonia, alkali metal derivatives of boric acids and alkaline earth metal derivatives of boric acids in an amount between about 0.05 part by weight and about 10 parts by weight per 100 parts by weight of said gum, (4) a titanium ortho ester having the formula Ti(OR')$_4$ wherein R' is an alkyl group containing from 1 to 18 carbon atoms in an amount between about 0.01 part by weight and about 10 parts by weight per 100 parts by weight of said gum, (5) a reinforcing amount of a filler selected from the class consisting of finely-divided silica fillers, reinforcing carbon black fillers, mixtures of said silica and said carbon black fillers, and mixtures of said silica fillers and iron oxide, and (6) an organic peroxide catalyst.

References Cited by the Examiner
UNITED STATES PATENTS

| | | | |
|---|---|---|---|
| 2,736,721 | 2/1956 | Dexter | 260—46.5 |
| 2,870,181 | 1/1959 | Shacklett | 260—45.75 |
| 2,983,697 | 5/1961 | Brown et al. | 260—27 |
| 3,024,214 | 3/1962 | Fenner | 260—45.75 |
| 3,127,363 | 3/1964 | Nitzsche et al. | 260—18 |

OTHER REFERENCES

Appln. 696,623 filed November 11, 1957, Harper et al., now abandoned, mentioned in U.S. Patent 2,983,697.

S. Fordham: "Silicones," George Newnes Ltd., London (1960), pp. 161–62 relied upon.

G. G. Freeman: "Silicones," Iliffe Books Ltd., London (1962), pp. 79–80 relied upon.

MORRIS LIEBMAN, *Primary Examiner.*

J. E. CALLAGHAN, *Assistant Examiner.*

UNITED STATES PATENT OFFICE
CERTIFICATE OF CORRECTION

Patent No. 3,296,182　　　　　　　　　　　　　　January 3, 1967

Frank Fekete

It is hereby certified that error appears in the above numbered patent requiring correction and that the said Letters Patent should read as corrected below.

Column 64, line 64, for "to" read -- per --; column 66, line 11, for "tetraisopropyl" read -- tetra-2-ethylhexyl --; column 68, line 21, for "produtc" read -- product --.

Signed and sealed this 24th day of October 1967.

(SEAL)
Attest:

Edward M. Fletcher, Jr.
Attesting Officer

EDWARD J. BRENNER
Commissioner of Patents